United States Patent
Suzuki et al.

(10) Patent No.: US 9,724,604 B2
(45) Date of Patent: *Aug. 8, 2017

(54) COMPUTER READABLE STORAGE MEDIUM HAVING GAME PROGRAM STORED THEREON AND GAME APPARATUS

(71) Applicant: NINTENDO CO., LTD., Kyoto (JP)

(72) Inventors: Ichiro Suzuki, Kyoto (JP); Takayuki Shimamura, Kyoto (JP); Katsuhisa Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/217,776

(22) Filed: Jul. 22, 2016

(65) Prior Publication Data

US 2016/0332076 A1 Nov. 17, 2016

Related U.S. Application Data

(63) Continuation of application No. 12/539,957, filed on Aug. 12, 2009, now Pat. No. 9,427,657.

(30) Foreign Application Priority Data

Mar. 30, 2009 (JP) .................................. 2009-083032
Apr. 10, 2009 (JP) .................................. 2009-096501

(51) Int. Cl.
*A63F 13/428* (2014.01)
*A63F 13/44* (2014.01)
(Continued)

(52) U.S. Cl.
CPC ............ *A63F 13/428* (2014.09); *A63F 13/00* (2013.01); *A63F 13/02* (2013.01); *A63F 13/211* (2014.09);
(Continued)

(58) Field of Classification Search
None
See application file for complete search history.

(56) References Cited

U.S. PATENT DOCUMENTS 5,435,554 A 7/1995 Lipson
6,217,444 B1 4/2001 Kataoka et al.
(Continued)

FOREIGN PATENT DOCUMENTS

EP 1 947 549 7/2008
JP 8-173632 7/1996
(Continued)

OTHER PUBLICATIONS

U.S. Appl. No. 12/539,843, filed Aug. 12, 2009, Computer Readable Storage Medium Having Information Processing Program Stored Thereon and Information Processing Apparatus.
(Continued)

*Primary Examiner* — Dmitry Suhol
*Assistant Examiner* — Ankit Doshi
(74) *Attorney, Agent, or Firm* — Nixon & Vanderhye PC

(57) ABSTRACT

Based on posture/motion information obtained from predetermined detection means for detecting a posture or a motion of an input device operated by a user, a virtual plane is calculated at a predetermined timing and set as reference plane. Then, based on motion information, the posture of the input device is calculated as necessary. In accordance with the posture of the input device with respect to the reference plane, predetermined game processing such as moving an object in a virtual space or the like is executed.

23 Claims, 40 Drawing Sheets

(51) Int. Cl.
A63F 13/211 (2014.01)
A63F 13/812 (2014.01)
A63F 13/00 (2014.01)
A63F 13/98 (2014.01)

(52) U.S. Cl.
CPC ............ *A63F 13/44* (2014.09); *A63F 13/812* (2014.09); *A63F 2300/105* (2013.01); *A63F 2300/1006* (2013.01)

(56) References Cited

U.S. PATENT DOCUMENTS

| | | | |
|---|---|---|---|
| 6,382,025 | B1 | 5/2002 | Hunter |
| 6,394,894 | B1 | 5/2002 | Okitsu et al. |
| 6,394,896 | B2 | 5/2002 | Sugimoto |
| 6,626,756 | B2 | 9/2003 | Sugimoto |
| 6,688,974 | B2 | 2/2004 | Fujioka et al. |
| 7,270,601 | B2 | 9/2007 | Takahashi et al. |
| 7,297,056 | B2 | 11/2007 | Takahashi et al. |
| 7,549,918 | B2 | 6/2009 | Kang et al. |
| 7,782,298 | B2 | 8/2010 | Smith et al. |
| 7,828,641 | B2 | 11/2010 | Imaeda et al. |
| 7,938,725 | B2 | 5/2011 | Okamura |
| 2005/0113158 | A1 | 5/2005 | Sterchi et al. |
| 2006/0128468 | A1 | 6/2006 | Yoshikawa et al. |
| 2007/0254738 | A1* | 11/2007 | Sato .................... A63F 13/06 463/31 |
| 2008/0015031 | A1 | 1/2008 | Koizumi et al. |
| 2008/0132335 | A1 | 6/2008 | Yamaguichi |
| 2008/0134784 | A1 | 6/2008 | Jeng et al. |
| 2008/0242385 | A1 | 10/2008 | Miyamoto |
| 2009/0009471 | A1 | 1/2009 | Yamamoto et al. |
| 2009/0209343 | A1 | 8/2009 | Foxlin et al. |
| 2009/0247254 | A1 | 10/2009 | Schlottmann et al. |
| 2010/0004896 | A1 | 1/2010 | Yen et al. |
| 2010/0007528 | A1 | 1/2010 | Urata et al. |
| 2010/0103096 | A1 | 4/2010 | Yamamoto et al. |
| 2010/0113153 | A1 | 5/2010 | Yen et al. |
| 2010/0203969 | A1 | 8/2010 | Takahashi et al. |
| 2010/0292007 | A1 | 11/2010 | Rabin et al. |
| 2011/0021274 | A1 | 1/2011 | Sato et al. |
| 2011/0212779 | A1 | 9/2011 | Koizumi et al. |
| 2011/0212781 | A1 | 9/2011 | Koizumi et al. |
| 2013/0165227 | A1 | 6/2013 | Koizumi et al. |

FOREIGN PATENT DOCUMENTS

| | | |
|---|---|---|
| JP | 2000-157745 | 6/2000 |
| JP | 2002-58873 | 2/2002 |
| JP | 2003-180896 | 7/2003 |
| JP | 2005-46422 | 2/2005 |
| JP | 2006-158882 | 6/2006 |
| JP | 2008-136694 | 6/2006 |
| JP | 2007-296173 | 11/2007 |
| WO | 2007/143755 | 12/2007 |
| WO | 2008/109299 | 9/2008 |
| WO | 2009/008372 | 1/2009 |
| WO | 2009/020080 | 2/2009 |

OTHER PUBLICATIONS

U.S. Appl. No. 12/539,957, filed Aug. 12, 2009, Computer Readable Storage Medium Having Game Program Stored Thereon and Game Apparatus.
U.S. Appl. No. 12/539,866, filed Aug. 12, 2009, Computer Readable Storage Medium Having Game Program Stored Thereon and Game Apparatus.
U.S. Appl. No. 12/540,656, filed Aug. 12, 2009, Computer Readable Storage Medium Having Game Program Stored Thereon and Game Apparatus.
U.S. Appl. No. 12/541,412, filed Aug. 12, 2009, Computer Readable Storage Medium Having Game Program Stored Thereon and Game Apparatus.
Mario Golf Manual, copyright 2003, 22 pages.
Notice of Allowance mailed May 11, 2016 for U.S. Appl. No. 12/539,957, 10 pages.
Office Action mailed Oct. 20, 2011 for co-pending U.S. Appl. No. 12/541,412, 13 pages.
Office Action mailed Oct. 20, 2011 for co-pending U.S. Appl. No. 12/540,656, 13 pages.
Office Action mailed Oct. 8, 2015 for U.S. Appl. No. 12/539,957, eight pages.
Office Action mailed Jan. 29, 2015 for U.S. Appl. No. 12/539,957, 13 pages.
Office Action mailed May 12, 2014 for U.S. Appl. No. 12/539,957, 12 pages.
Office Action mailed Nov. 7, 2013 for U.S. Appl. No. 12/539,957, 12 pages.
Office Action mailed May 6, 2013 for U.S. Appl. No. 12/539,957, 14 pages.
Super Swing Golf Manual copyright 2006, 23 pages.
Tiger Woods PGA Tour Manual, copyright 2007, 6 pages.
WarioWare Twisted, release date Oct. 14, 2004, Wikipedia page, 3 pages.
WarioWare Twisted Manual, copyright 2004-2005, 23 pages.
We Love Golf (release date Dec. 13, 2007, Wikipedia, 2 pages.
We Love Golf Manual, copyright 2007, 20 pages.
We Love Golf, CAPCOM Co., Ltd., with partial English translation, pp. 6-7, 16-17 and 22-23.

* cited by examiner

F I G. 16
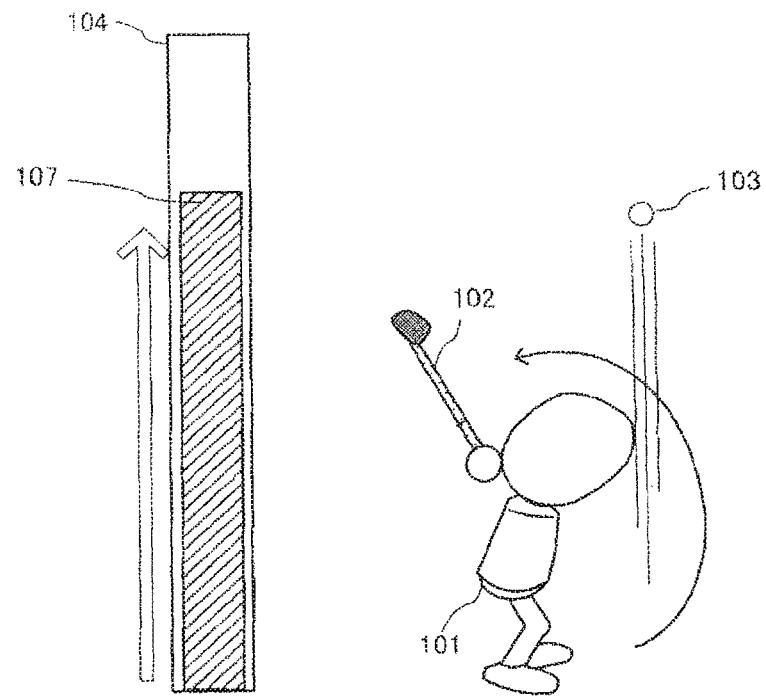
F I G. 17
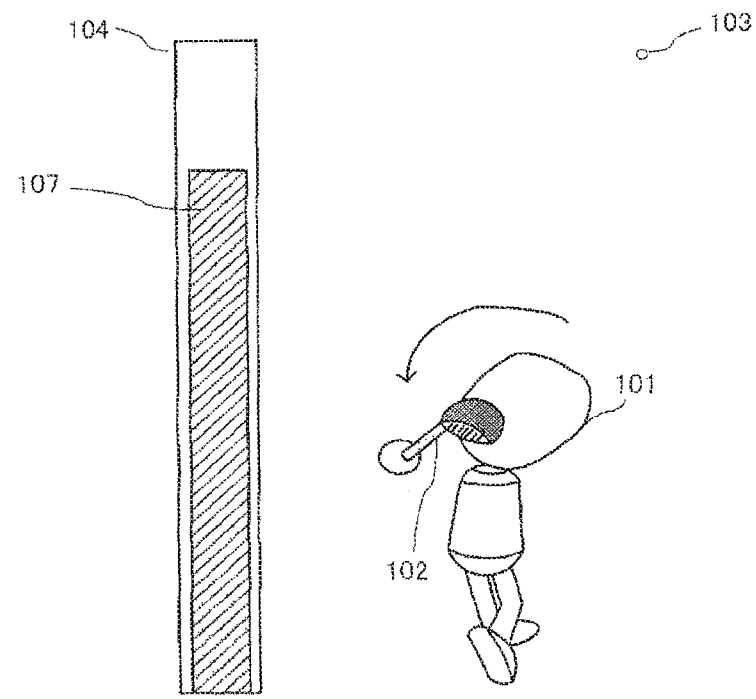

FIG. 26
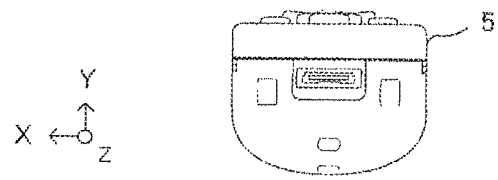
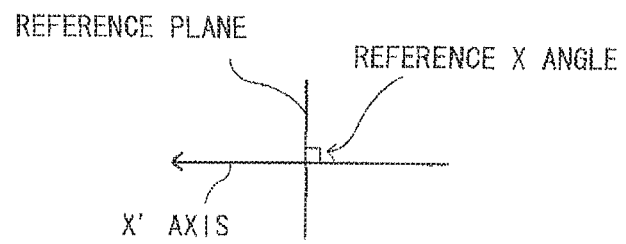
FIG. 27
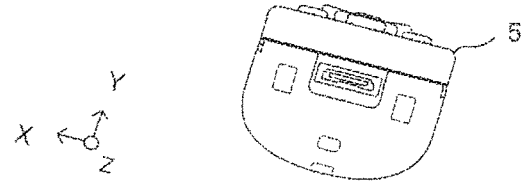
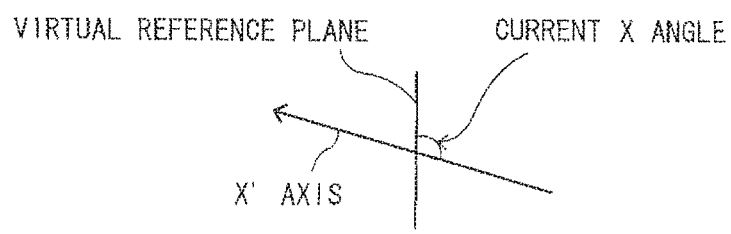

F I G. 3 4

| GAME PROCESSING DATA | 128 |
|---|---|
| INPUT DEVICE POSTURE DATA | 141 |
| REFERENCE PLANE DATA | 142 |
| REFERENCE X ANGLE DATA | 143 |
| VIRTUAL REFERENCE PLANE DATA | 144 |
| CURRENT X ANGLE DATA | 145 |
| TWISTING ANGLE DATA | 146 |
| SWING-UP AMOUNT DATA | 147 |
| (L) COORDINATE SYSTEM DATA | 148 |
| VECTOR D DATA | 149 |
| FIRST CANDIDATE PLANE DATA | 150 |
| SECOND CANDIDATE PLANE DATA | 151 |
| IMMEDIATELY PREVIOUS SWING-UP ANGLE DATA | 152 |
| IMMEDIATELY PREVIOUS FOLLOW-UP ANGLE DATA | 153 |
| IMMEDIATELY PREVIOUS BENDING ANGLE DATA | 154 |
| GUIDE DISPLAY COUNTER | 155 |
| STRUCK BALL POWER DATA | 156 |
| BACKSPIN RATIO DATA | 157 |
| STRUCK BALL PARAMETERS | 158 |
| CURRENT STATE DATA | 159 |
| IMAGE DATA | 160 |
| SHOT FLAG | 161 |
| IN-FLIGHT FLAG | 162 |
| BACKSPIN FLAG | 163 |
| TERMINATION FLAG | 164 |

F I G. 5 4
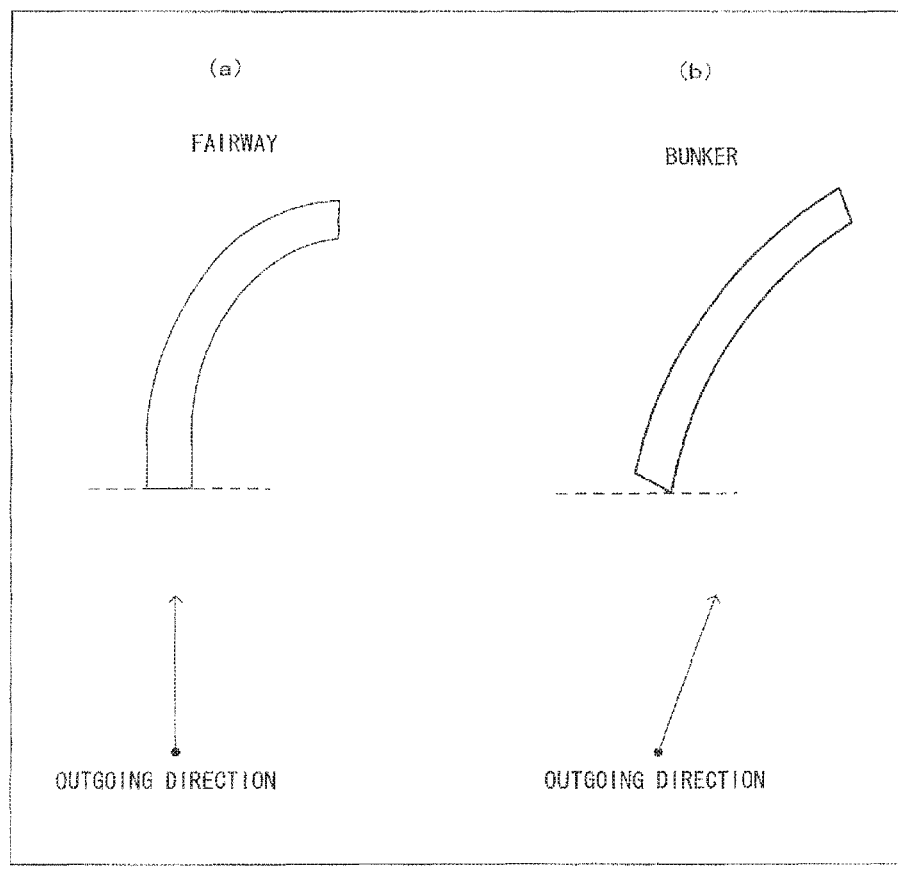

COMPUTER READABLE STORAGE MEDIUM HAVING GAME PROGRAM STORED THEREON AND GAME APPARATUS

CROSS REFERENCE TO RELATED APPLICATION

This application is a continuation of application Ser. No. 12/539,957, filed Aug. 12, 2009, which claims priority to Japanese Patent Application Nos. 2009-96501, filed on Apr. 10, 2009 and 2009-83032, filed on Mar. 30, 2009 the entire contents of which are incorporated herein by reference.

BACKGROUND OF THE INVENTION

Field of the Invention

The present invention relates to a computer readable storage medium having a game program stored thereon for executing game processing based on posture/motion information obtained from predetermined detection means for detecting a posture or a motion of an input device operated by a user, and a game apparatus for such a game program; and more specifically to a computer readable storage medium having a game program stored thereon for moving an object in a virtual space based on posture/motion information, and a game apparatus for such a game program.

Description of the Background Art

Conventionally, as a so-called golf game, a golf game which is enjoyed by a player by swinging up and down a wireless controller to operate a golf club (to make a golf swing) in a virtual game space (for example, the users manual of "WE LOVE GOLF!", CAPCOM Co., Ltd., pp. 6-7, 16-17 and 22-23). In this golf game, an operation for making a swing is performed as follows. First, a gauge as shown in FIG. 58 is displayed on the screen. In the gauge, a remote control cursor 901, a club head cursor 902, and an impact zone 903 are displayed. The player swings up a controller while pressing an A button of the controller. Then, in association with this motion, the remote control cursor 901 moves along the gauge (moves rightward in FIG. 58). In accordance with this, the club head cursor 902 moves as following the remote control cursor 901. The club head cursor 902, when catching up with the remote control cursor 901, is inverted to return to the original position thereof. When the club head cursor 902 reaches back to the impact zone 903, the player swings down the controller. Thus, a shot motion of golf can be made.

However, the above-described game has the following problems. The above-described golf game is played with a premise that the manner of holding the controller and the direction of swinging up the controller are predetermined (in other words, the manner of holding the controller and the direction of swinging up the controller are fixed). Processing of making a determination on the shot in the impact zone 903 is executed with a premise that the motion is made in accordance with the predetermined particulars. However, the manner of holding the controller and the direction of swinging up the controller are varied player by player. Therefore, there may be a case where a player does not make a motion conformed to the predetermined particulars although considering he/she follows the predetermined particulars. As a result, there are problems that the shot is not recognized or erroneously recognized.

SUMMARY OF THE INVENTION

Therefore, an object of the present invention is to provide a computer readable storage medium having a game program stored thereon capable of decreasing erroneous determinations and erroneous recognitions on a golf shot or the like in a golf game, and a game apparatus for such a game program.

The present invention has the following features to attain the objects mentioned above. The reference numerals, additional descriptions and the like in parentheses in this section of the specification indicate an example of the correspondence with the embodiments described later for easier understanding of the present invention, and do not limit the present invention in any way.

A first aspect of the present invention is directed to a computer readable storage medium having stored thereon a game program to be executed by a computer of a game apparatus, the game program being for moving an object in a virtual space based on posture/motion information obtained from predetermined detection means for detecting a posture or a motion of an input device operated by a user. The game program causes the computer to function as posture/motion information obtaining means (S2), posture calculation means (S31), reference plane setting means (S32), and processing means (S17). The posture/motion information obtaining means obtains posture/motion information detected by the detection means. The posture calculation means calculates the posture of the input device based on the posture/motion information. The reference plane setting means virtually sets a predetermined plane as a reference plane in an actual space at a predetermined timing based on the posture/motion information. The processing means executes predetermined processing in accordance with the posture of the input device with respect to the reference plane.

According to the first aspect, erroneous recognitions and erroneous determinations on the operation made by the player can be decreased.

In a second aspect based on the first aspect, the predetermined detection means is a predetermined motion sensor included in the input device.

According to the second aspect, the posture of the input device can be calculated more accurately.

In a third aspect based on the first aspect, the reference plane setting means sets the reference plane based on the posture of the input device calculated by the posture calculation means.

According to the third aspect, the reference plane is set based on the posture of the input device held by the player ready to swing. Therefore, erroneous recognitions and erroneous determinations on the operation made by the player can be further decreased.

In a fourth aspect based on the third aspect, the reference plane setting means sets the reference plane based on the posture of the input device obtained when the user operates the input device.

According to the fourth aspect, the player is allowed to make an operation to set the reference plane at an arbitrary timing.

In a fifth aspect based on the third aspect, the game program causes the computer to further function as angle calculation means and determination means. The angle calculation means calculates an angle made by the posture of the input device and the reference plane. The determination means determines whether or not the angle made by the posture of the input device and the reference plane fulfills a predetermined condition. When the determination means determines that the predetermined condition is fulfilled, the processing means executes predetermined processing.

In a sixth aspect based on the fifth aspect, the determination means determines whether or not the posture of the input device and the reference plane have become horizontal based on the angle calculated by the angle calculation means.

In a seventh aspect based on the fifth aspect, the game program repeatedly executes processing by the posture/motion information obtaining means, the posture calculation means, the angle calculation means, and the determination means until the determination means determines that the angle made by the posture of the input device and the reference plane fulfills the predetermined condition.

In an eighth aspect based on the seventh aspect, the determination means determines whether or not a sign of the angle made by the posture of the input device and the reference plane has been inverted based on the angle calculated by the angle calculation means.

According to the fifth through eighth aspects, when, for example, the player is made to perform a motion like a golf swing, the operation intended by the player can be reflected on the game processing more accurately.

In a ninth aspect based on the eighth aspect, regarding the input device, three axes perpendicular to one another are defined. The reference plane setting means sets the reference plane based on postures of the input device calculated by the posture calculation means along directions of predetermined two axes among the defined three axes.

In a tenth aspect based on the ninth aspect, the reference plane setting means includes candidate plane calculation means (S41, S43) for calculating two planes usable for setting the reference plane, based on the postures along the directions of the predetermined two axes respectively. The reference plane setting means sets the reference plane based on the two planes calculated by the candidate plane calculation means.

According to the ninth and tenth aspects, the reference plane can be calculated based on a multiple points of view.

In an eleventh aspect based on the tenth aspect, the candidate plane calculation means calculates a plane including one predetermined axis among the defined three axes and a gravity direction as one of the two planes.

In a twelfth aspect based on the eleventh aspect, the candidate plane calculation means calculates, as one of the two planes, a plane including an axis defined as a longitudinal direction axis of the input device among the defined three axes and the gravity direction.

In a thirteenth aspect based on the tenth aspect, the candidate plane calculation means calculates, as one of the two planes, a plane including an axis defined as an up-down direction axis of the input device among the defined three axes and the gravity direction.

In a fourteenth aspect based on the tenth aspect, the candidate plane calculation means calculates, as one of the two planes, a plane including the gravity direction and a virtual axis calculated by applying a rotation, which directs an axis defined as a longitudinal direction axis of the input device among the defined three axes to the gravity direction, to an axis defined as an up-down direction axis of the input device among the defined three axes.

In a fifteenth aspect based on the tenth aspect, the reference plane setting means applies weights to the two planes calculated by the candidate plane calculation means based on respective conditions, calculates a plane which corresponds to a weighted average of these two planes, and sets the obtained plane as the reference plane.

In a sixteenth aspect based on the fifteenth aspect, reference plane setting means applies a heavier weight to a plane, among the two planes calculated by the candidate plane calculation means, which is located closer to the reference plane immediately previously set.

In a seventeenth aspect based on the fifteenth aspect, the reference plane setting means applies a heavier weight to a plane, among the two planes calculated by the candidate plane calculation means, which is calculated based on an axis located farther from the gravity direction.

According to the eleventh through seventeenth aspects, the reference plane can be calculated based on a multiple points of view using two planes. The calculation for finding the reference plane can be avoided from becoming unstable due to the difference in the manner in which the controller is held.

In an eighteen aspect based on the ninth aspect, the reference plane setting means selects, as an axis for calculation, an axis located farther from the gravity direction among the predetermined two axes defined regarding the input device, and sets the reference plane based on the posture of the input device along the axis for calculation.

In a nineteenth aspect based on the eighteenth aspect, the reference plane setting means sets an axial plane for calculation based on the axis for calculation, and sets the reference plane based on the axial plane for calculation.

In a twentieth aspect based on the nineteenth aspect, the reference plane setting means sets the reference plane based on a previous reference plane, which is a reference plane immediately previously set, and the axial plane for calculation.

In a twenty-first aspect based on the twentieth aspect, the reference plane setting means applies weights to the previous reference plane and the axial plane for calculation based on respective predetermined conditions, calculates a plane which corresponds to a weighted average of these two planes, and sets the obtained plane as the reference plane.

In a twenty-second aspect based on the twenty-first aspect, the reference plane setting means applies a heavier weight to the previous reference plane.

In a twenty-third aspect based on the twenty-first aspect, the reference plane setting means applies a heavier weight on the axial plane for calculation as the axis for calculation is located farther from the gravity direction.

According to the eighteenth through twenty-third aspects, the reference plane is set based on an axis located farther from the gravity direction. Therefore, a reference plane that does not make the player feel unnatural can be set.

In a twenty-fourth aspect based on the tenth aspect, the reference plane setting means sets the reference plane based on a plane, among the two planes calculated by the candidate plane calculation means, which is closer to a previous reference plane, which is a reference plane immediately previously set.

In a twenty-fifth aspect based on the tenth twenty-fourth aspect, the reference plane setting means applies weights to the plane closer to the previous reference plane and to the previous reference plane based on respective predetermined conditions, calculates a plane which corresponds to a weighted average of these two planes, and sets the obtained plane as the reference plane.

In a twenty-sixth aspect based on the tenth twenty-fifth aspect, the reference plane setting means applies a heavier weight to the previous reference plane.

According to the twenty-fourth through twenty-sixth aspects, a new reference plane is set with the reference plane immediately previously set being relied on more heavily. Therefore, a reference plane that does not make the player feel unnatural can be set.

A twenty-seventh aspect of the present invention is directed to a computer readable storage medium having stored thereon a game program to be executed by a computer of a game apparatus, the game program being for moving an object in a virtual space based on posture/motion information obtained from predetermined detection means for detecting a posture or a motion of an input device operated by a user. The game program causes the computer to function as posture/motion information obtaining means (S2), posture calculation means (S31), posture correction value calculation means, and processing means (S17). The posture/motion information obtaining means obtains posture/motion information detected by the detection means. The posture calculation means calculates the posture of the input device based on the posture/motion information.

The posture correction value calculation means calculates a posture correction value of the input device based on the posture/motion information at a predetermined timing. The processing means executes predetermined processing in accordance with a posture obtained by correcting the posture of the input device with respect to a predetermined reference plane, which is virtually set in an actual space, with the correction value.

According to the twenty-seventh aspect, substantially the same effect as that of the first aspect can be provided.

A twenty-eighth aspect of the present invention is directed to a game apparatus for moving an object in a virtual space based on posture/motion information obtained from predetermined detection means for detecting a posture or a motion of an input device operated by a user. The game apparatus comprises posture/motion information obtaining means (10), posture calculation means (10), reference plane setting means (10), and processing means (10). The posture/motion information obtaining means obtains posture/motion information detected by the detection means. The posture calculation means calculates the posture of the input device based on the posture/motion information. The reference plane setting means virtually sets a predetermined plane as a reference plane in an actual space at a predetermined timing based on the posture/motion information. The processing means executes predetermined processing in accordance with the posture of the input device with respect to the reference plane.

A twenty-ninth aspect of the present invention is directed to a game apparatus for moving an object in a virtual space based on posture/motion information obtained from predetermined detection means for detecting a posture or a motion of an input device operated by a user. The game apparatus comprises posture/motion information obtaining means (10), posture calculation means (10), posture correction value calculation means (10), and processing means (10). The posture/motion information obtaining means obtains posture/motion information detected by the detection means. The posture calculation means calculates the posture of the input device based on the posture/motion information. The posture correction value calculation means calculates a posture correction value of the input device based on the posture/motion information at a predetermined timing. The processing means executes predetermined processing in accordance with a posture obtained by correcting the posture of the input device with respect to a predetermined reference plane, which is virtually set in an actual space, with the correction value.

According to the twenty-eighth and twenty-ninth aspects, substantially the same effect as that of the first aspect can be provided.

According to the present invention, the reference plane is set based on the posture of the input device or the like calculated by the motion information, and processing based thereon can be executed. Therefore, for example, erroneous recognitions and erroneous determinations on a golf shot or the like can be prevented in a golf game.

These and other objects, features, aspects and effects of the present invention will become more apparent from the following detailed description of the present invention when taken in conjunction with the accompanying drawings.

BRIEF DESCRIPTION OF THE DRAWINGS

FIG. 16 is provided to explain the power gauge 104;
FIG. 17 is provided to explain the power gauge 104;
FIG. 26 is a schematic view showing the concept of a reference X angle;
FIG. 27 is a schematic view showing the concept of a current X angle.

FIG. 34 shows an example of a data structure of game processing data 128 shown in FIG. 32;

FIG. 54 shows an example of a change of the shape of the power gauge 104;

DESCRIPTION OF THE PREFERRED EMBODIMENTS (Overall Structure of the Game System)

Figure 1:
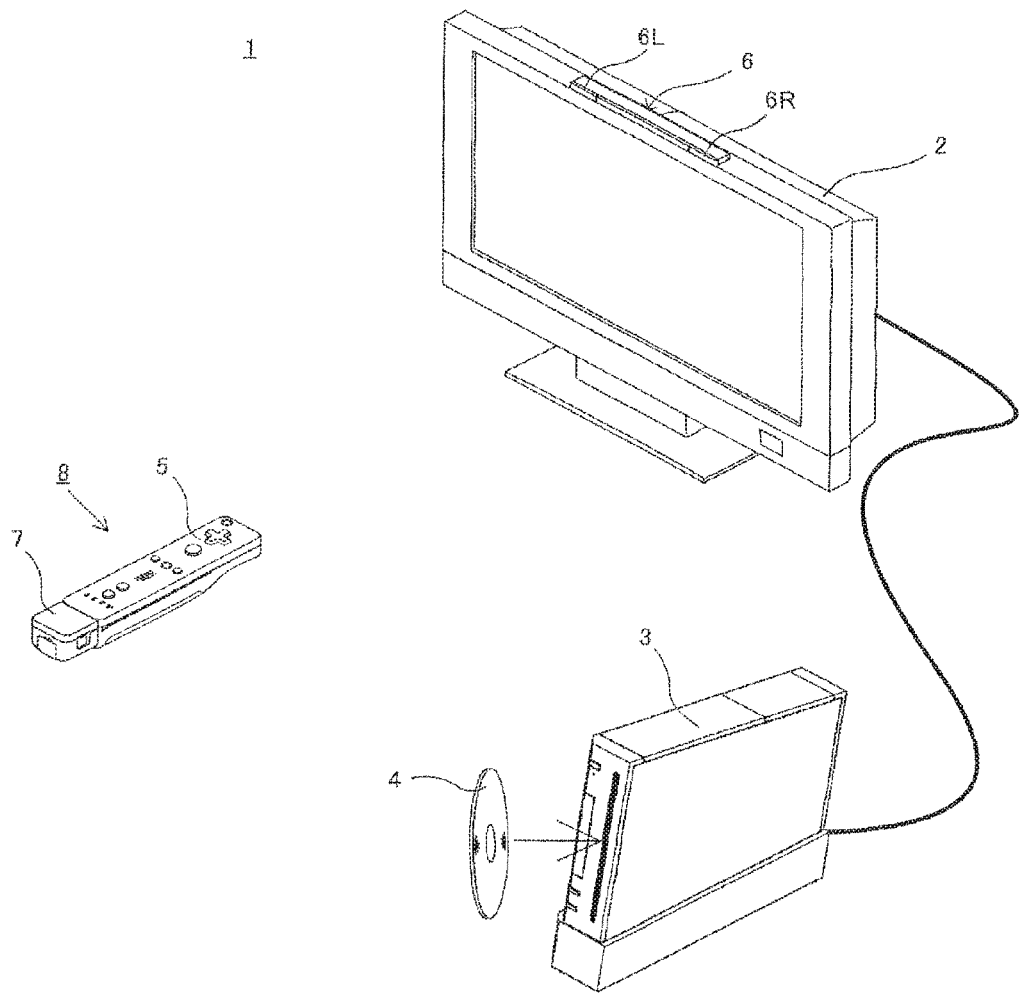
FIG. 1 is an external view of a game system 1.

With reference to FIG. 1, a game system 1 including a game apparatus, which is an example of a posture calculation device according to one embodiment of the present invention, will be described. FIG. 1 is an external view of the game system 1. Hereinafter, a game apparatus and a game program according to this embodiment will be described. In the following example, the game apparatus is of an installation type. As shown in FIG. 1, the game system 1 includes a television receiver 2 (hereinafter, referred to simply as the "TV") 2, a game apparatus 3, an optical disc 4, an input device 8, and a marker section 6. In the game system 1, game processing is executed by the game apparatus 3 based on a game operation performed using the input device 8.

In the game apparatus 3, the optical disc 4, which is an example of an information storage medium exchangeably usable for the game apparatus 3, is detachably inserted. The optical disc 4 has stored thereon a game program to be executed by the game apparatus 3. The game apparatus 3 has an insertion opening for inserting the optical disc 4 on a front surface thereof. The game apparatus 3 reads and executes the game program stored on the optical disc 4 inserted into the insertion opening, and thus performs the game processing.

The game apparatus 3 is connected to the TV 2, which is an example of a display device, via a connection cord. The TV 2 displays a game image obtained as a result of the game processing executed by the game apparatus 3. A marker section 6 is provided in the vicinity of a display screen of the TV 2 (above the display screen in FIG. 1). The marker section 6 includes two markers 6R and 6L respectively at two ends thereof. Specifically, the marker 6R (also the marker 6L) includes one or more infrared LEDs, and outputs infrared light forward from the TV 2. The marker section 6 is connected to the game apparatus 3, and the game apparatus 3 can control each of the infrared LEDs of the marker section 6 to be lit up or out.

The input device 8 provides the game apparatus 3 with operation data representing the particulars of the operation made thereon. In this embodiment, the input device 8 includes a controller 5 and a gyrosensor unit 7. As described later in detail, in the input device 8, the gyrosensor unit 7 is detachably connected to the controller 5. The controller 5 and the game apparatus 3 are connected with each other via wireless communication. In this embodiment, the controller 5 and the game apparatus 3 are wirelessly communicable to each other by, for example, the Bluetooth (registered trademark) technology. In other embodiments, the controller 5 and the game apparatus 3 may be connected with each other in a wired manner.

(Internal Structure of the Game Apparatus 3)

Figure 2:
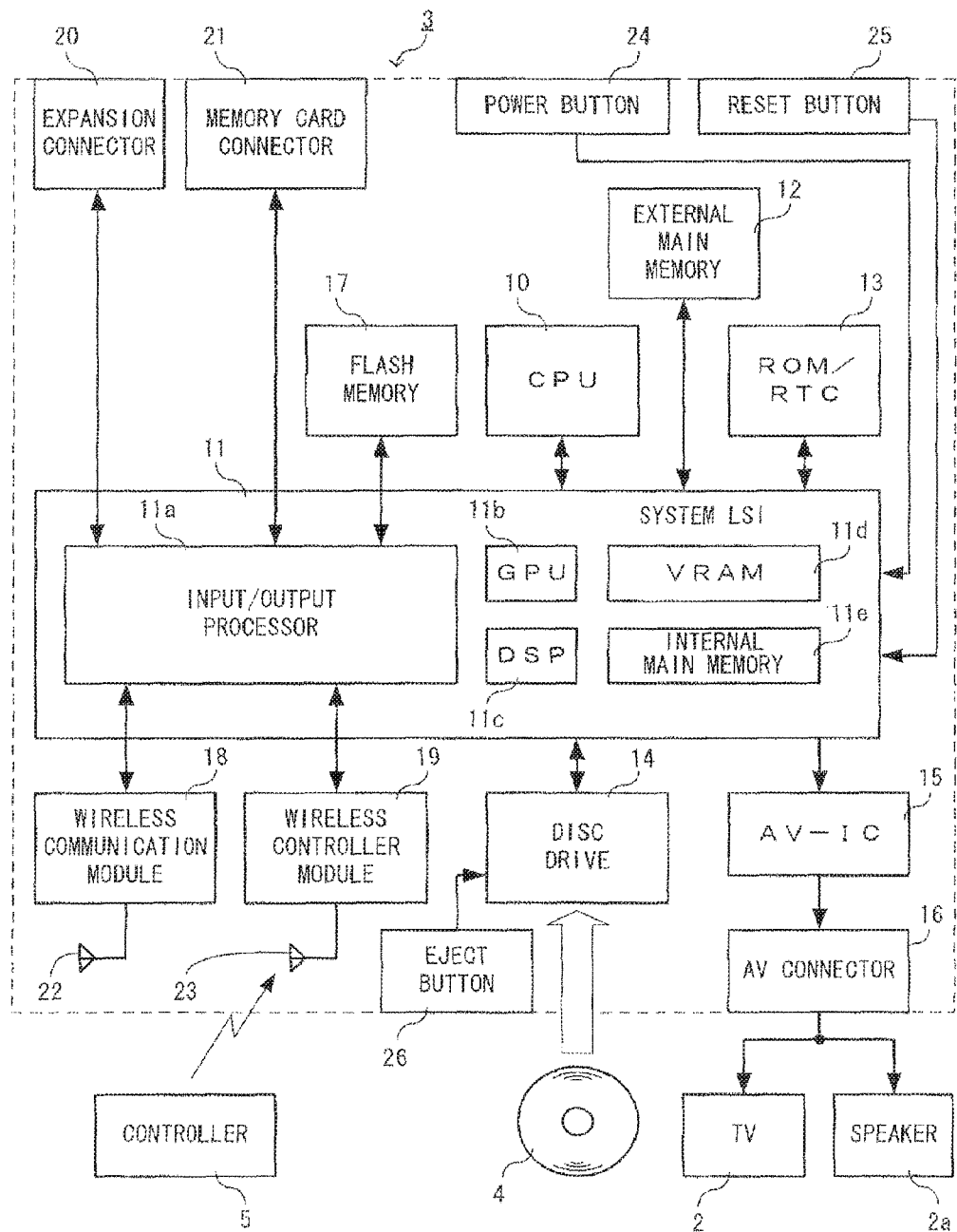
FIG. 2 is a block diagram showing a structure of a game apparatus 3.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing a game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11 performs the processing of, for example, controlling data transfer between the elements connected thereto, generating images to be displayed, and obtaining data from external devices. An internal structure of the system LSI 11 will be described later. The external main memory 12, which is of a volatile type, has stored thereon a program such as a game program read from the optical disc 4, a game program read from a flash memory 17 or the like, or various other data. The external main memory 12 is used as a work area or a buffer area of the CPU 10. The ROM/RTC 13 includes a ROM having a program for starting the game apparatus 3 incorporated thereon (so-called boot ROM) and a clock circuit for counting time (RTC: Real Time Clock). The disc drive 14 reads program data, texture data or the like from the optical disc 4 and writes the read data onto an internal main memory 11*e* described later or the external main memory 12.

The system LSI 11 includes an input/output processor (I/O processor) 11*a*, a GPU (Graphics Processor Unit) 11*b*, a DSP (Digital Signal Processor) 11*c*, a VRAM 11*d*, and the internal main memory 11*e*. Although not shown, these elements 11*a* through 11*e* are connected with each other via an internal bus.

The GPU 11*b* is a part of drawing means and generates an image in accordance with a graphics command (a command to draw an image) from the CPU 10. The VRAM 11*d* has stored thereon data necessary for the GPU 11*b* to execute the graphics command (polygon data, texture data or other data). The GPU 11*b* uses the data stored on the VRAM 11*d* to generate an image.

The DSP 11*c* acts as au audio processor and generates audio data using sound data or sound wave (sound tone) data stored on the internal main memory 11*e* or the external main memory 12.

The image data and the audio data generated as described above are read by the AV-IC 15. The AV-IC 15 outputs the read image data to the TV 2 via an AV connector 16, and outputs the read audio data to a speaker 2*a* built in the TV 2. Thus, the image is displayed on the TV 2 and also the sound is output from the speaker 2*a*.

The input/output processor 11*a* transmits or receives data to or from the elements connected thereto, or downloads data from external devices. The input/output processor 11*a* is connected to the flash memory 17, a wireless communication module 18, a wireless controller module 19, an expansion connector 20, and a memory card connector 21. The wireless communication module 18 is connected to an antenna 22, and the wireless controller module 19 is connected to an antenna 23.

The input/output processor 11*a* is connected to a network via the wireless communication module 18 and the antenna 22, and thus can communicate with other game apparatuses or various servers also connected to the network. The input/output processor 11*a* periodically accesses the flash memory 17, and detects whether or not there is data which needs to be transmitted to the network. When there is such data, the input/output processor 11*a* transmits such data to the network via the wireless communication module 18 and the antenna 22. The input/output processor 11*a* also receives data transmitted from other game apparatuses or data downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored thereon data saved as a result of playing the game using the game apparatus 3 (data representing a result or a state in the middle of the game) as well as the data to be transmitted to, or data received from, the other game apparatuses or various servers.

The input/output processor 11*a* receives operation data which is transmitted from the controller 5 via the antenna 23 and the wireless controller module 19 and stores (temporarily stores) the operation data in a buffer area of the internal main memory 11*e* or the external main memory 12.

The input/output processor 11*a* is connected to the expansion connector 20 and the memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector, to communicate with the network instead of the wireless communication module 18. The memory card connector 21 is a connector for an external storage medium such as a memory card or the like. For example, the input/output processor 11*a* can access an external storage medium via the expansion connector 20 or the memory card connector 21 to store data on the external storage medium or read data from the external storage medium.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

(Structure of the Input Device 8)

Figure 3:
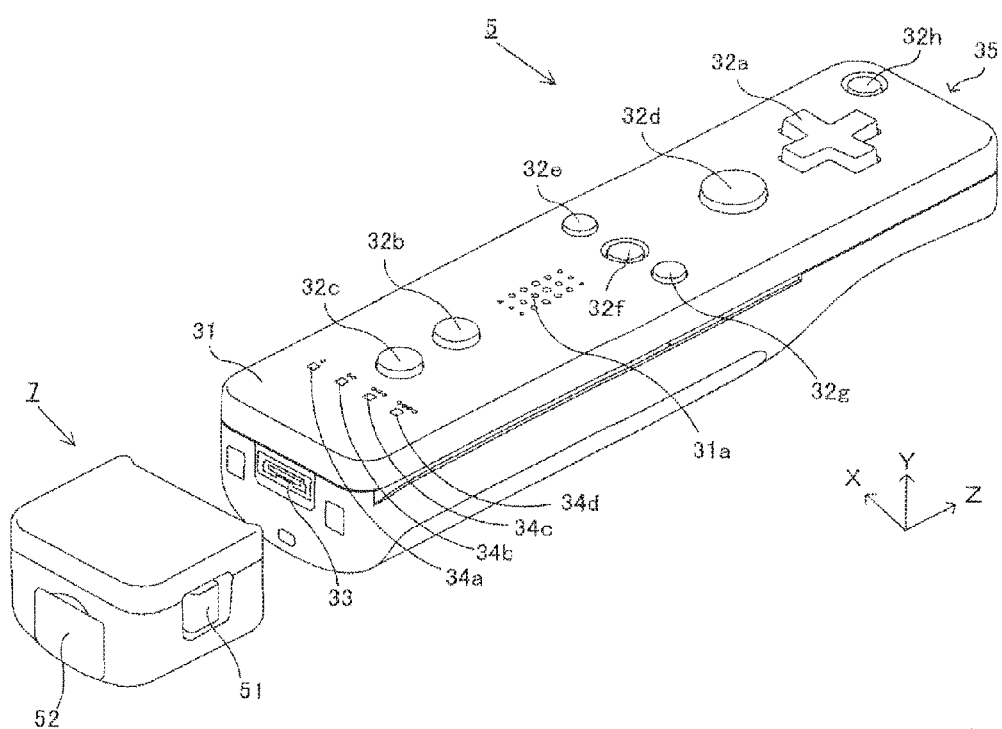
FIG. 3 is an isometric view showing an external structure of an input device 8.
Figure 4:
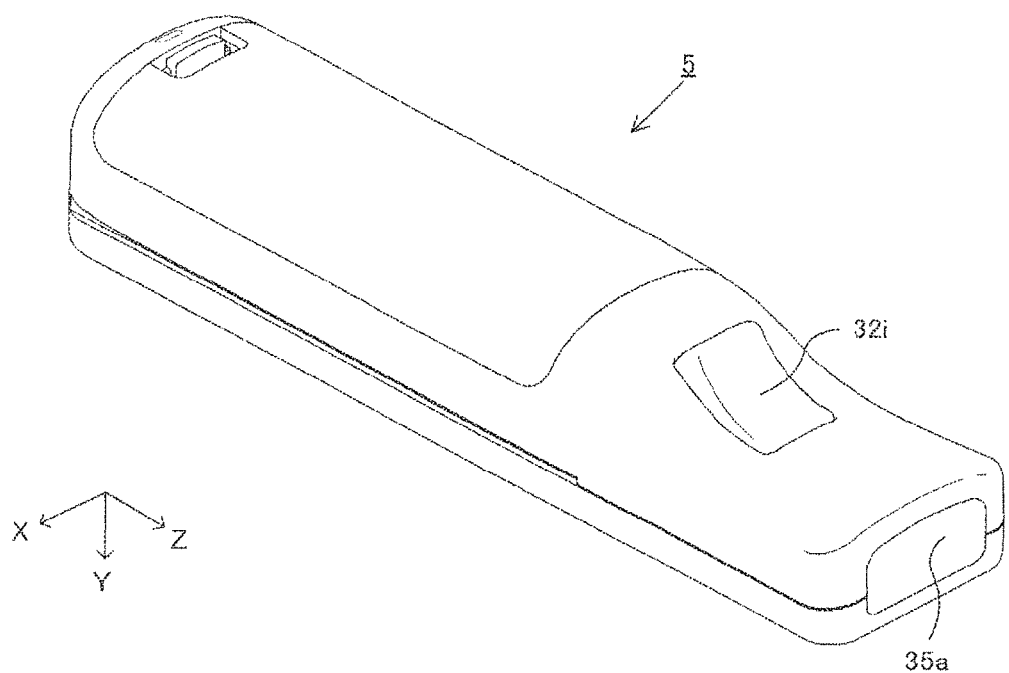
FIG. 4 is an isometric view showing an external structure of a controller 5.

With reference to FIG. 3 through FIG. 6, the input device 8 will be described. FIG. 3 is an isometric view showing an external structure of the input device 8. FIG. 4 is an isometric view showing an external structure of the controller 5. FIG. 3 is an isometric view of the input device 8 seen from the top rear side thereof. FIG. 4 is an isometric view of the controller 5 seen from the bottom front side thereof.

As shown in FIG. 3 and FIG. 4, the controller 5 includes a housing 31 formed by, for example, plastic molding. The housing 31 has a generally parallelepiped shape extending in a longitudinal or front-rear direction (Z-axis direction shown in FIG. 3). The overall size of the housing 31 is small enough to be held by one hand of an adult or even a child. A player can perform a game operation by, for example, pressing buttons provided in the controller 5 or moving the controller 5 itself to change the position or posture thereof.

The housing 31 has a plurality of operation buttons. As shown in FIG. 3, provided on a top surface of the housing 31 are a cross button 32*a*, a first button 32*b*, a second button 32*c*, an A button 32*d*, a minus button 32*e*, a home button 32*f*, a plus button 32*g*, and a power button 32*h*. In this specification, the top surface on which these buttons 32*a* through 32*h* are provided will be occasionally referred to as the "button surface". As shown in FIG. 4, a recessed portion is formed on a bottom surface of the housing 31, and a B button 32*i* is provided on a slope surface of the recessed portion. The operation buttons 32*a* through 32*i* are assigned various functions in accordance with the game program executed by the game apparatus 3. The power button 32*h* is for remote-controlling the power of the main body of the game apparatus 3 to be on or off. The home button 32*f* and the power button 32*h* have a top surface thereof buried in the top surface of the housing 31, so as not to be inadvertently pressed by the player.

On a rear surface of the housing 31, a connector 33 is provided. The connector 33 is used for connecting the controller 5 with another device (for example, the gyrosensor unit 7 or another controller). On both sides of the connector 33 on the rear surface of the housing 31, engagement holes 33*a* are provided for preventing such another device from easily coming off.

In a rear part of the top surface of the housing 31, a plurality of LEDs (in FIG. 3, four LEDs) 34*a* through 34*d* are provided. The controller 5 is assigned a controller type (number) so as to be distinguishable from other main controllers. The LEDs 34a through 34d are used for, for example, informing the player of the controller type which is currently set to the controller 5 that he/she is using, or for informing the player of the remaining battery amount. Specifically, when the controller 5 is used for the game operation, one of the plurality of LEDs 34a through 34d corresponding to the controller type is lit up.

Figure 6:
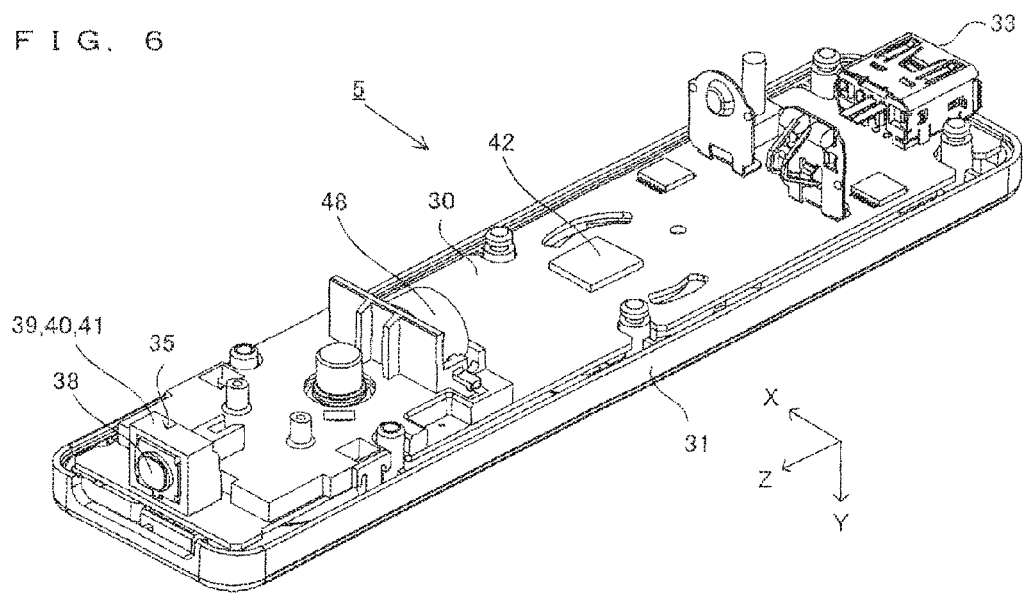
FIG. 6 is an isometric view showing an internal structure of the controller 5.

The controller 5 includes an imaging information calculation section 35 (FIG. 6). As shown in FIG. 4, a light incident face 35a of the imaging information calculation section 35 is provided on a front surface of the housing 31. The light incident face 35a is formed of a material which allows infrared light from the markers 6R and 6L to be at least transmitted therethrough.

On the top surface of the housing 31, sound holes 31a are formed between the first button 32b and the home button 32f for releasing the sound outside from a speaker 49 (FIG. 5) built in the controller 5.

Figure 5:
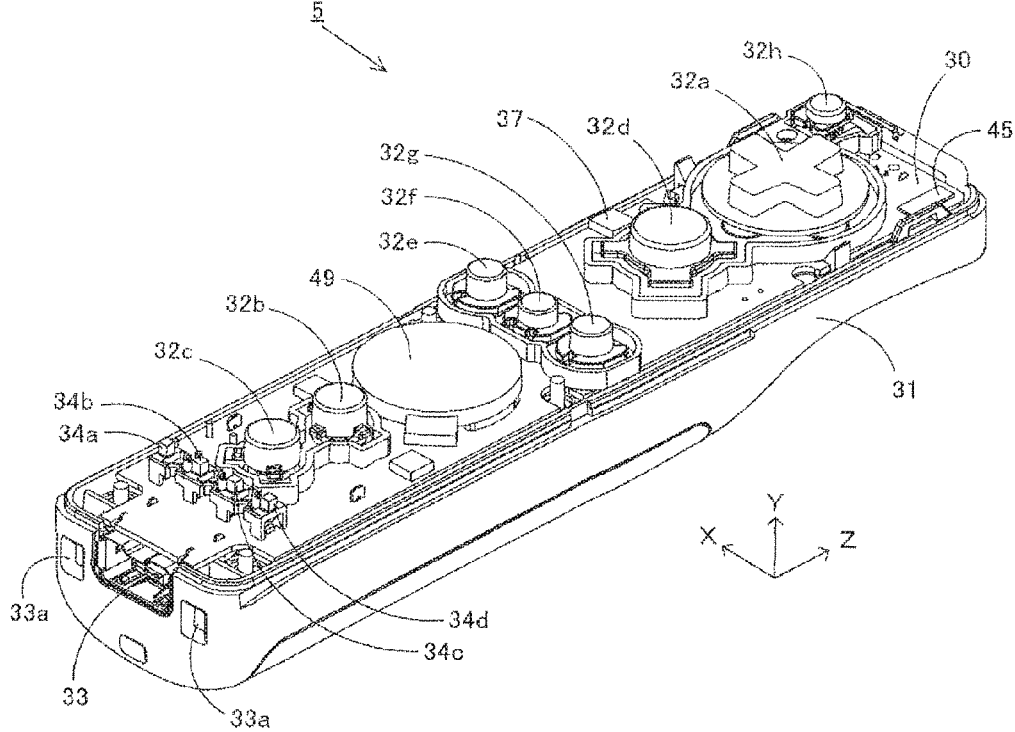
FIG. 5 is an isometric view showing an internal structure of the controller 5.

Now, with reference to FIG. 5 and FIG. 6, an internal structure of the controller 5 will be described. FIG. 5 and FIG. 6 illustrate an internal structure of the controller 5. FIG. 5 is an isometric view illustrating a state where an upper casing (a part of the housing 31) of the controller 5 is removed. FIG. 6 is an isometric view illustrating a state where a lower casing (a part of the housing 31) of the controller 5 is removed. FIG. 6 shows a reverse side of a substrate 30 shown in FIG. 5.

As shown in FIG. 5, the substrate 30 is fixed inside the housing 31. On a top main surface of the substrate 30, the operation buttons 32a through 32h, the LEDs 34a through 34d, an acceleration sensor 37, an antenna 45, the speaker 49 and the like are provided. These elements are connected to a microcomputer 42 (see FIG. 6) via lines (not shown) formed on the substrate 30 and the like. In this embodiment, the acceleration sensor 37 is provided off the center line of the controller 5 along an X-axis direction. This makes it easier to calculate the motion of the controller 5 when the controller 5 is rotated around the Z axis. The acceleration sensor 37 is also located forward with respect to the center of the controller 5 along the longitudinal direction thereof (Z-axis direction). The provision of a wireless module 44 (FIG. 7) and the antenna 45 allows the controller 5 to function as a wireless controller.

As shown in FIG. 6, at a front edge of a bottom main surface of the substrate 30, the imaging information calculation section 35 is provided. The imaging information calculation section 35 includes an infrared filter 38, a lens 39, an imaging element 40 and an image processing circuit 41 located in this order from the front surface of the controller 5. These elements 38 through 41 are attached to the bottom main surface of the substrate 30.

On the bottom main surface of the substrate 30, the microcomputer 42 and a vibrator 48 are provided. The vibrator 48 may be, for example, a vibration motor or a solenoid, and is connected to the microcomputer 42 via lines provided on the substrate 30 and the like. The controller 5 is vibrated by an actuation of the vibrator 48 based on an instruction from the microcomputer 42, and the vibration is conveyed to the hand of the player holding the controller 5. Thus, a so-called vibration-responsive game is realized. In this embodiment, the vibrator 48 is located slightly forward with respect to the center of the housing 31. Since the vibrator 48 is provided closer to a front end than the center of the controller 5, the vibration of the vibrator 48 can vibrate the entire controller 5 more significantly. The connector 33 is attached at a rear edge of the main bottom surface of the substrate 30. In addition to the elements shown in FIG. 5 and FIG. 6, the controller 5 includes a quartz oscillator for generating a reference clock of the microcomputer 42, an amplifier for outputting an audio signal to the speaker 49, and the like.

The gyrosensor unit 7 includes gyrosensors (gyrosensors 55 and 56 shown in FIG. 7) for sensing an angular velocity around three axes. The gyrosensor unit 7 is detachably attached on the connector 33 of the controller 5. At a front end of the gyrosensor unit 7 (an end thereof in a positive Z-axis direction shown in FIG. 3), a plug (a plug 53 shown in FIG. 7) connectable to the connector 33 is provided. On both sides of the plug 53, hooks (not shown) are provided. In the state where the gyrosensor unit 7 is attached to the controller 5, the plug 53 is connected to the connector 33 and the hooks are engaged with the engagement holes 33a of the controller 5. Thus, the controller 5 and the gyrosensor unit 7 are firmly secured to each other. The gyrosensor unit 7 also includes buttons 51 on side surfaces thereof (side surfaces perpendicular to the X-axis direction shown in FIG. 3). The buttons 51 are structured so as to release the hooks from the engagement holes 33a when being pressed. By pulling the plug 53 from the connector 33 while pressing the buttons 51, the gyrosensor unit 7 can be detached from the controller 5.

At a rear end of the gyrosensor unit 7, a connector having the same shape as that of the connector 33 is provided. Therefore, other devices attachable to the controller 5 (the connector 33 of the controller 5) can be attached to the connector of the gyrosensor unit 7. In FIG. 3, a cover 52 is detachably attached to the connector of the gyrosensor unit 7.

The shape of the controller 5 and the gyrosensor unit 7, the shape, number and position of the operation buttons, the acceleration sensor and the vibrator, and the like shown in FIG. 3 through FIG. 6 are merely exemplary, and may be altered without departing from the scope of the present invention. In this embodiment, the imaging direction of the imaging means is the positive Z-axis direction, but the imaging direction may be any direction. Specifically, the position of the imaging information calculation section 35 (the light incident face 35a of the imaging information calculation section 35) in the controller 5 does not need to be on the front surface of the housing 31, and may be on another surface as long as light can enter from the outside of the housing 31.

Figure 7:
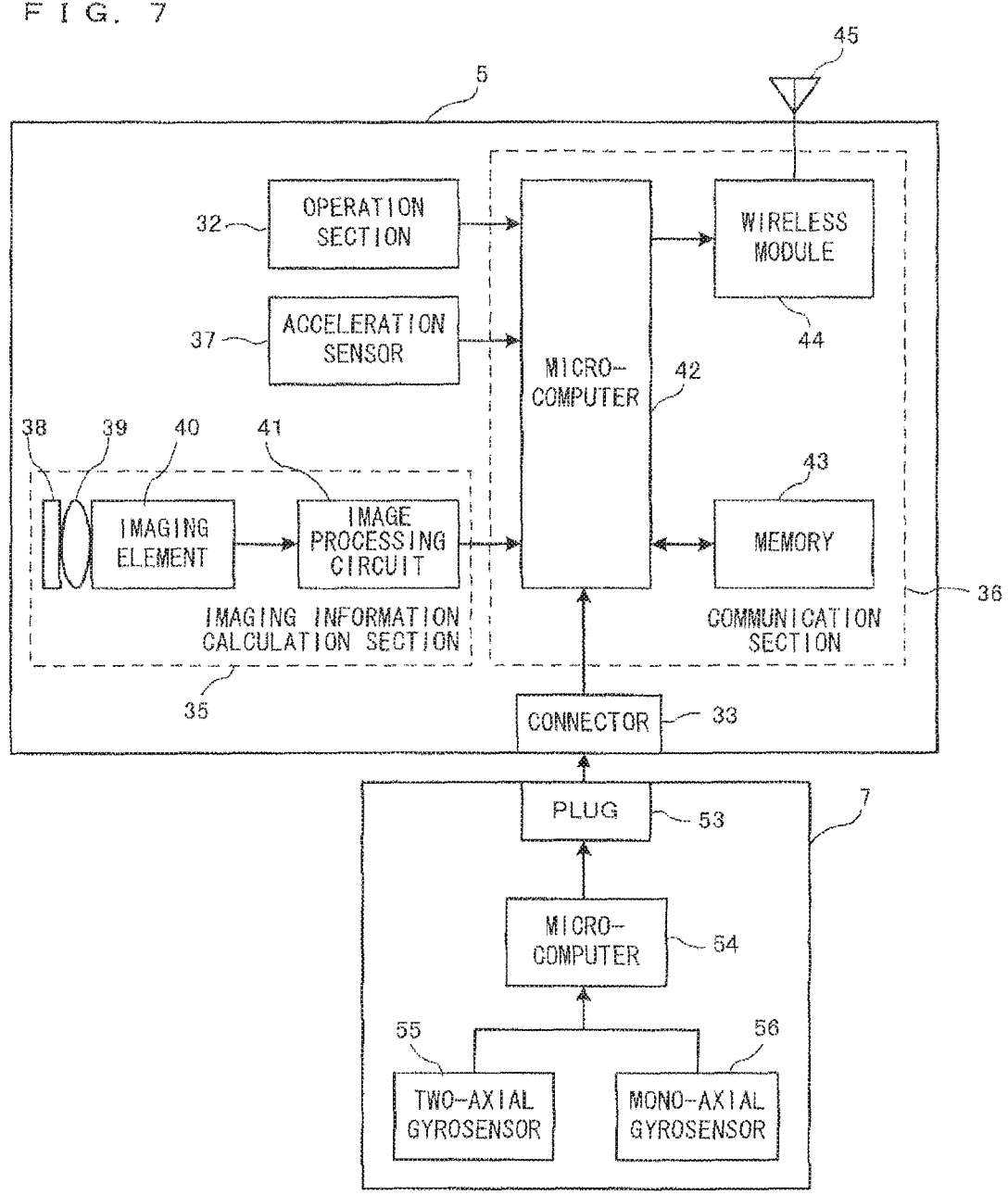
FIG. 7 is a block diagram showing a structure of the input device 8.

FIG. 7 is a block diagram showing a structure of the input device 8 (the controller 5 and the gyrosensor unit 7). The controller 5 includes the operation section 32 (operation buttons 32a through 32i), the connector 33, the imaging information calculation section 35, a communication section 36, and the acceleration sensor 37. The controller 5 transmits operation data representing the particulars of the operation made thereon to the game apparatus 3 as operation data.

The operation section 32 includes the above-described operation buttons 32a through 32i, and outputs operation button data representing an input state of each of the operation buttons 32a through 32i (whether or not each of the operation buttons 32a through 32i has been pressed) to the microcomputer 42 of the communication section 36.

The imaging information calculation section 35 is a system for analyzing image data taken by the imaging means, distinguishing an area having a high brightness in the image data, and calculating the center of gravity, the size and the like of the area. The imaging information calculation section 35 has, for example, a maximum sampling cycle of about 200 frames/sec., and therefore can trace and analyze even a relatively fast motion of the controller 5.

The imaging information calculation section 35 includes the infrared filter 38, the lens 39, the imaging element 40 and the image processing circuit 41. The infrared filter 38 allows only infrared light to pass therethrough, among light incident on the front surface of the controller 5. The lens 39 collects the infrared light which has been transmitted through the infrared filter 38 and causes the infrared light to be incident on the imaging element 40. The imaging element 40 is a solid-state imaging device such as, for example, a CMOS sensor or a CCD sensor. The imaging element 40 receives the infrared light collected by the lens 39 and outputs an image signal. The markers 6R and 6L of the marker section 6 located in the vicinity of the screen of the TV 2 each include an infrared LED for outputting infrared light forward from the TV 2. The provision of the infrared filter 38 allows the imaging element 40 to receive only the infrared light transmitted through the infrared filter 38 to generate image data. Therefore, the image of each of the markers 6R and 6L can be taken more accurately. Hereinafter, an image taken by the imaging element 40 will be referred to as a "taken image". The image data generated by the imaging element 40 is processed by the image processing circuit 41. The image processing circuit 41 calculates the positions of imaging targets (the markers 6R and 6L) in the taken image. The image processing circuit 41 outputs a coordinate representing the calculated position to the microcomputer 42 of the communication section 36. The data on the coordinate is transmitted by the microcomputer 42 to the game apparatus 3 as operation data. Hereinafter, this coordinate will be referred to as a "marker coordinate". The marker coordinate changes in accordance with the direction (inclining angle) or the position of the controller 5 itself, and therefore the game apparatus 3 can calculate the direction or the position of the controller 5 using the marker coordinate.

In other embodiments, the controller 5 does not need to include the image processing circuit 41, and a taken image itself may be transmitted from the controller 5 to the game apparatus 3. In this case, the game apparatus 3 may include a circuit or program having substantially the same function as that of the image processing circuit 41 and calculate the marker coordinate.

The acceleration sensor 37 detects an acceleration (including a gravitational acceleration) of the controller 5. Namely, the acceleration sensor 37 detects a force (including the force of gravity) applied to the controller 5. The acceleration sensor 37 detects a value of the acceleration in a linear direction along a sensing axis (linear acceleration) among accelerations acting on a detection section of the acceleration sensor 37. For example, in the case of a multi-axial (at least two-axial) acceleration sensor, an acceleration component along each axis is detected as an acceleration acting on the detection section of the acceleration sensor. For example, a three-axial or two-axial acceleration sensor may be of a type available from Analog Devices, Inc. or STMicroelectronics N.V. The acceleration sensor 37 is, for example, of an electrostatic capacitance type, but may be of any other system.

In this embodiment, the acceleration sensor 37 detects a linear acceleration in each of an up-down direction with respect to the controller 5 (Y-axis direction shown in FIG. 3), a left-right direction with respect to the controller 5 (X-axis direction shown in FIG. 3), and a front-rear direction with respect to the controller 5 (Z-axis direction shown in FIG. 3). Since the acceleration sensor 37 detects an acceleration in the linear direction along each axis, the output from the acceleration sensor 37 represents a value of the linear acceleration along each of the three axes. Namely, the detected acceleration is represented as a three-dimensional vector (ax, ay, az) in an XYZ coordinate system (controller coordinate system) which is set with respect to the input device (controller 5). Hereinafter, a vector having, as components, acceleration values along the three axes detected by the acceleration sensor 37 will be referred to as the "acceleration vector".

Data representing the acceleration detected by the acceleration sensor 37 (acceleration data) is output to the communication section 36. Since the acceleration detected by the acceleration sensor 37 changes in accordance with the direction (inclining angle) or the motion of the controller 5 itself, the game apparatus 3 can calculate the direction or the motion of the controller 5 using the acceleration data. In this embodiment, the game apparatus 3 calculates the posture of the controller 5 based on the acceleration data.

Data (acceleration data) representing the acceleration detected by the acceleration sensor 37 (acceleration vector) is output to the communication section 36. In this embodiment, the acceleration sensor 37 is used as a sensor for outputting data for determining the inclining angle of the controller 5.

A computer such as a processor of the game apparatus 3 (for example, the CPU 10) or a processor of the controller 7 (for example, the microcomputer 42) executes processing based on an acceleration signal which is output from the acceleration sensor 37, and as a result, can estimate or calculate (determine) further information on the controller 5. A person of ordinary skill in the art would easily understand this from the description of this specification. For example, when the computer executes processing with a premise that the controller 5 including the acceleration sensor 37 is in a static state (i.e., when the computer executes processing with a premise that the acceleration detected by the acceleration sensor 37 includes only a gravitational acceleration), if the controller 5 is actually in a static state, it can be found based on the detected acceleration whether or not the posture of the controller 5 is inclined with respect to the direction of gravity, or how much the posture of the controller 5 is inclined with respect to the direction of gravity. Specifically, where the state in which a detection axis of the acceleration sensor 37 is directed vertically downward is a reference state, it can be found whether or not the controller 5 is inclined with respect to the reference state based on whether or not 1 G (gravitational acceleration) is applied to the controller 5. Based on the magnitude of the gravitational acceleration, it can also be found how much the controller 5 is inclined with respect to the reference state. In the case of a multi-axial acceleration sensor 37, it can be found more precisely how much the controller 5 is inclined with respect to the direction of gravity by processing a signal representing an acceleration along each axis. In this case, the processor may calculate the inclining angle of the controller 5 based on an output from the acceleration sensor 37, or may calculate the inclining direction of the controller 5 without calculating the inclining angle. By using the acceleration sensor 37 in combination with a processor in this manner, the inclining angle or posture of the controller 5 can be determined.

By contrast, with a premise that the controller 5 is in a dynamic state (in the state where the controller 5 is being moved), the acceleration sensor 37 detects an acceleration in accordance with the motion of the controller 5 in addition to the gravitational acceleration. Therefore, the moving direction of the controller 5 can be found by removing a component of the gravitational acceleration from the detected acceleration using predetermined processing. Even with the premise that the controller 5 is in a dynamic state, the inclination of the controller 5 with respect to the direction of gravity can be found by removing a component of the acceleration in accordance with the motion of the acceleration sensor from the detected acceleration using predetermined processing. In other embodiments, the acceleration sensor 37 may include an incorporated processing device or any other type of dedicated device for executing predetermined processing on an acceleration signal detected by built-in acceleration detection means before the detected acceleration signal is output to the microcomputer 42. In the case where the acceleration sensor 37 is used for, for example, detecting a static acceleration (for example, a gravitational acceleration), the incorporated or dedicated processing device may be of a type for converting the acceleration signal into an inclining angle (or any other preferable parameter).

The communication section 36 includes the microcomputer 42, a memory 43, the wireless module 44 and the antenna 45. The microcomputer 42 controls the wireless module 44 for wirelessly transmitting the data obtained by the microcomputer 42 to the game apparatus 3 while using the memory 43 as a storage area during processing. The microcomputer 42 is connected to the connector 33. Data transmitted from the gyrosensor unit 7 is input to the microcomputer 42 via the connector 33. Hereinafter, the gyrosensor unit 7 will be described.

The gyrosensor unit 7 includes the plug 53, a microcomputer 54, the two-axial gyrosensor 55 and the mono-axial gyrosensor 56. As described above, the gyrosensor unit 7 detects an angular velocity around three axes (in this embodiment, the X, Y and Z axes) and transmits data representing each detected angular velocity (angular velocity data) to the controller 5.

The two-axial gyrosensor 55 detects an angular velocity (per unit time) around the X axis and an angular velocity around the Y axis (per unit time). The mono-axial gyrosensor 56 detects an angular velocity around the Z axis (per unit time). In this specification, with respect to the imaging direction of the controller 5 (the positive Z-axis direction), the rotation directions around the X, Y and Z axes will be referred to as the "roll direction", the "pitch direction" and "yaw direction", respectively. Namely, the two-axial gyrosensor 55 detects the angular velocity in the roll direction (rotation direction around the X axis) and the pitch direction (rotation direction around the Y axis), and the mono-axial gyrosensor 56 detects the angular velocity in the yaw direction (rotation direction around the Z axis).

In this embodiment, the two-axial gyrosensor 55 and the mono-axial gyrosensor 56 are used in order to detect the angular velocity around the three axes. In other embodiments, the number and combination of the gyrosensors to be used are not specifically limited as long as the angular velocity around the three axes can be detected.

In this embodiment, for the purpose of facilitating calculations in posture calculation processing described later, the three axes around which the gyrosensors 55 and 56 detect the angular velocity are set to match the three axes along which the acceleration sensor 37 detects the acceleration (X, Y and Z axes). In other embodiments, the three axes around which the gyrosensors 55 and 56 detect the angular velocity do not need to match the three axes along which the acceleration sensor 37 detects the acceleration.

Data representing the angular velocity detected by each of the gyrosensors 55 and 56 is output to the microcomputer 54. Accordingly, data representing the angular velocity around the three axes, i.e., the X, Y and Z axes is input to the microcomputer 54. The microcomputer 54 transmits the data representing the angular velocity around the three axes as the angular velocity data to the controller 5 via the plug 53. The transmission from the microcomputer 54 to the controller 5 is performed at a predetermined cycle. Since game processing is generally performed at a cycle of 1/60 sec. (at a cycle of frame time), the transmission is preferably performed at a cycle of a time period equal to or shorter than 1/60 sec.

Now, the description of the controller 5 will be resumed. Data which is output from the operation section 32, the imaging information calculation section 35, and the acceleration sensor 37 to the microcomputer 42, and data transmitted from the gyrosensor unit 7 to the microcomputer 42, are temporarily stored on the memory 43. Such data is transmitted to the game apparatus 3 as the operation data. Namely, at the transmission timing to the wireless controller module 19 of the game apparatus 3, the microcomputer 42 outputs the operation data stored on the memory 43 to the wireless module 44. The wireless module 44 modulates a carrier wave of a predetermined frequency with the operation data and radiates the resultant very weak radio signal from the antenna 45, using, for example, the Bluetooth (registered trademark) technology. Namely, the operation data is modulated into a very weak radio signal by the wireless module 44 and transmitted from the controller 5. The very weak radio signal is received by the wireless controller module 19 on the side of the game apparatus 3. The received very weak radio signal is demodulated or decoded, and thus the game apparatus 3 can obtain the operation data. The CPU 10 of the game apparatus 3 executes the game processing based on the obtained operation data and the game program. The wireless communication from the communication section 36 to the wireless controller module 19 is performed at a predetermined cycle. Since game processing is generally performed at a cycle of 1/60 sec. (at a cycle of frame time), the wireless transmission is preferably performed at a cycle of a time period equal to or shorter than 1/60 sec. The communication section 36 of the controller 5 outputs each piece of the operation data to the wireless controller module 19 of the game apparatus 3 at a rate of, for example, once in 1/200 seconds.

By using the controller 5, the player can perform an operation of inclining the controller 5 at an arbitrary inclining angle, in addition to a conventional general game operation of pressing the operation buttons. With the controller 5 described above, the player can also perform an operation of indicating an arbitrary position on the screen by the controller 5 and also an operation of moving the controller 5 itself.

Figure 8:
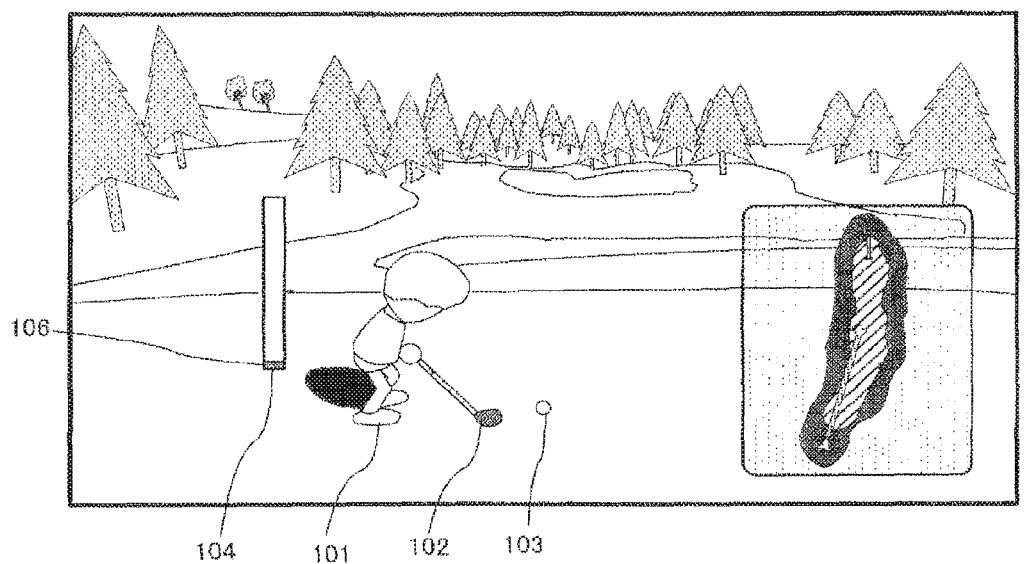
FIG. 8 shows an example of a game screen assumed in an embodiment of the present invention.

Now, an overview of a game assumed in this embodiment will be described. FIG. 8 shows an example of a game screen assumed in this embodiment. The game assumed in this embodiment is a golf game. As shown in FIG. 8, a golf course constructed in a three-dimensional virtual space is displayed as the game screen. The game screen displays a player object 101 holding a golf club 102, a golf ball object 103 (hereinafter, referred to simply as the "ball"), a power gauge 104 and the like. In the power gauge 104, a swing bar 106 is displayed.

Figure 9:
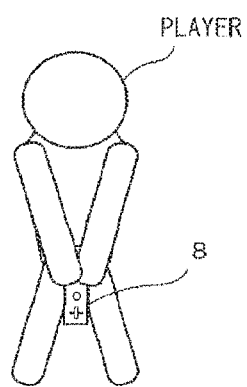
FIG. 9 shows a method of operation to be made by the player.

Now, a method of operation to be made by the player in this game will be described. This game is played with the input device 8 being regarded as a golf club. For example, as shown in FIG. 9, the player holds the input device 8 with both hands, with the front surface of the input device 8 (the surface having the light incident face 35*a*) being directed downward. Then, the player makes a motion mimicking a golf swing. In association with this swing motion, the player object 101 in the virtual space also makes a swing motion. In accordance with this, the golf club 102 moves. Namely, the motion of the player swinging his/her arms is reflected as the swing motion of the player object 101.

Figure 10:
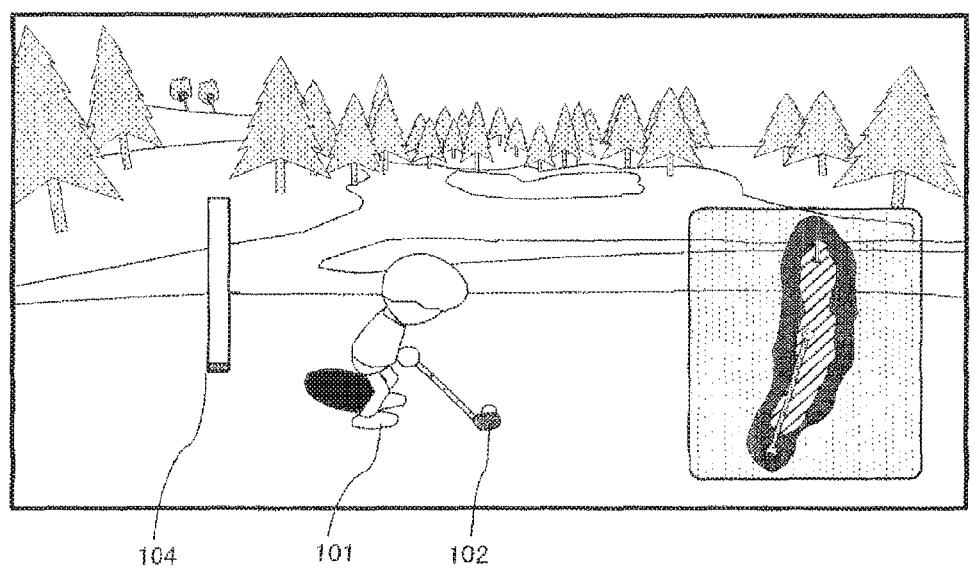
FIG. 10 shows an example of a game screen assumed in an embodiment of the present invention.

The above-described operation will be described more specifically. First, in an initial state before hitting the ball (before starting the swing), the player object is located slightly away from the ball 103 as shown in FIG. 8. By making a swing as described above in this state, the player can make a "practice swing". For hitting the ball, the player presses the A button 32*d*. Then, as shown in FIG. 10, the player object 101 moves forward to approach the ball 103. By making the above-described swing motion while pressing the A button 32*d*, the player can hit the ball 103 with the golf club 102 to cause the ball 103 to fly, namely, can make a shot. In this game, as described above, when the player holds the input device 8 and makes a swing motion without pressing the A button 32*d*, he/she can make a practice swing. When the player makes a swing motion while pressing the A button 32*d*, he/she can hit the ball 103 to cause the ball 103 to fly. Thus, the player can enjoy the golf game close to actual golfing.

In addition, in this game, the player can make a "re-hold" operation by pressing the B button 32*i* in the state of not pressing the A button 32*d*. The "re-hold" operation is made to define the forward direction of the player in the actual world (the "re-hold" operation has a concept close to taking the posture of "address" in golf). Since the gyrosensor only senses a "change" in the posture, the forward direction is defined by having the player press the B button 32*i*. Based on the forward direction defined by this operation, various types of processing for this golf game are executed.

Figure 11:
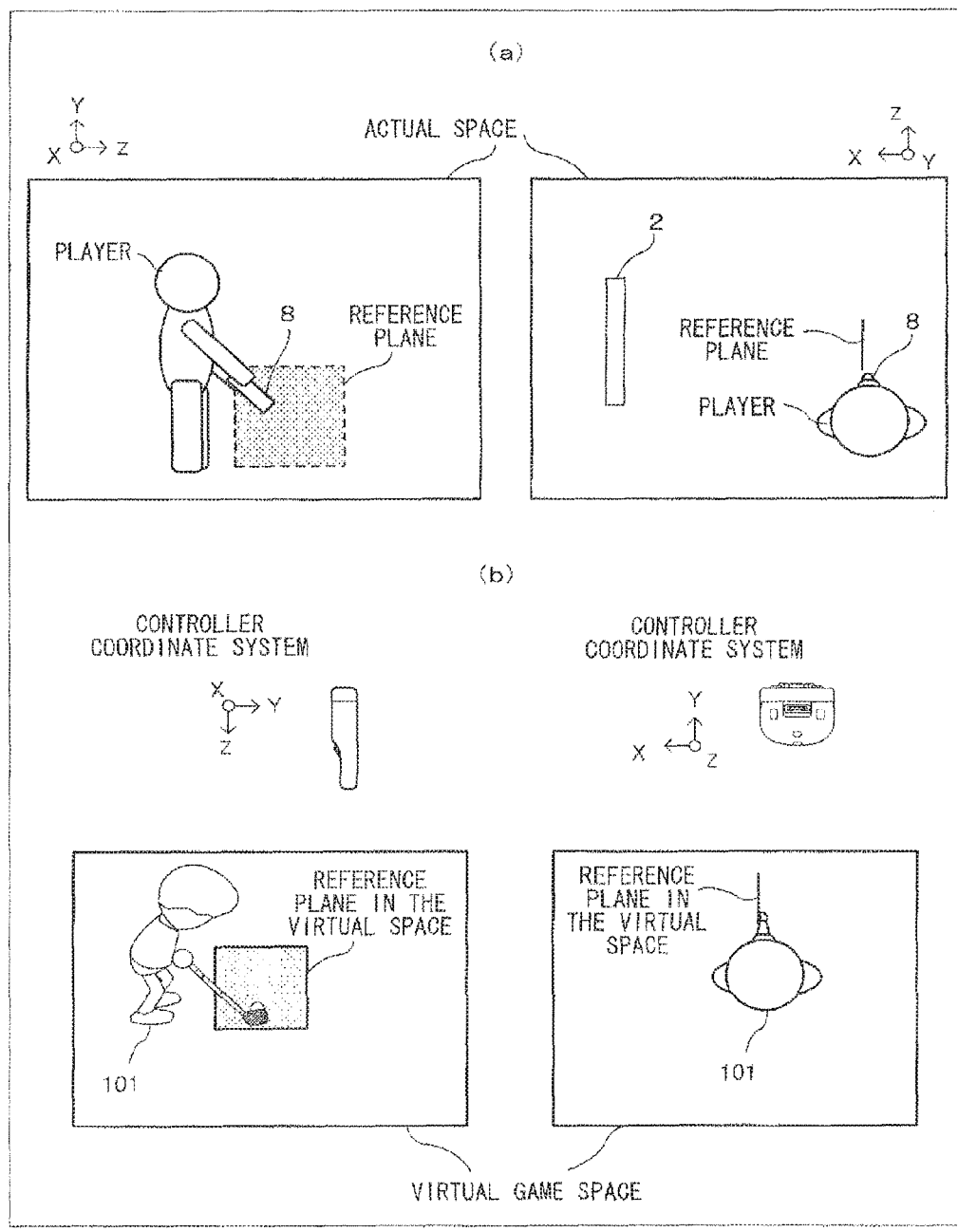
FIG. 11 provides schematic views showing the concept of a reference plane.

More specifically, the following processing is executed. Based on the posture of the input device 8 which is taken when the B button 32*i* is pressed, a virtual plane which extends toward the forward direction of the player in the actual space is calculated, and this plane is set as the "reference plane". FIG. 11 provides schematic views showing the concept of the reference plane. As shown in FIG. 11(*a*), the reference plane is a (virtual) plane which extends toward the forward direction of the player in the actual space. The reference plane also corresponds to a plane, as shown in FIG. 11(*b*), which extends toward the forward direction of a position in the virtual space corresponding to the position of the player, namely, toward the forward direction of the player object 101. By comparing the reference plane against the posture of the input device 8 during a swing, a parameter such as a swing angle (how much the player swings up the input device 8) or the like is calculated, and whether or not an impact has been generated (whether or not the golf club 102 has hit the ball 103) is determined, for example. More specifically, the swing angle (swing-up angle described later) is calculated with a premise that the position of the reference plane is 0°, the side to which the ball is to fly has a positive value angle, and the side to which the club is to be swung has a negative value angle. (In this embodiment, the swing angle is in the range of +180° to −180°.) For example, when the swing angle is changed from a negative value angle to a positive value angle, it is determined that the input device 8 has contacted, or has passed, the reference plane (an impact has been generated).

However, even if the forward direction (reference plane) is once determined, the relationship between the forward direction defined above and the posture of the input device 8 may become gradually inaccurate while the player swings the input device 8. This occurs as a result of accumulation of measuring errors of the gyrosensor or calculation errors. In addition, the player himself/herself may change the direction in which he/she faces and in this case, the forward direction defined above is not the forward direction from the viewpoint of the player anymore. As a result, while swinging the input device 8, the player in the actual world may lose the sense of the direction in which he/she is facing in the virtual game space (may lose the sense of whether or not he/she is facing forward in the virtual game space). When this problem occurs, although the player considers himself/herself as making a swing while facing forward, the game processing is executed as if he/she was making a swing while not facing forward. For this reason, it is necessary for the player to press the B button 32*i* periodically to reset the forward direction (reference plane). In addition, for example, in the case where the player swings up the input device 8 and keeps that state for a certain period of time without swinging down the input device 8, the influence of the accumulation of calculation errors may possibly occur. Therefore, where the difference between the posture of the input device 8 obtained when the B button 32*i* is pressed (posture at the time of address) and the current posture of the input device 8 is large and further, no motion of the input device 8 is made for a certain period of time, it is preferable to reset the forward direction (reference plane).

In this embodiment, in order to avoid the calculation for finding the forward direction from becoming unstable due to the difference in the manner in which the input device 8 is held when the B button 32*i* is pressed, the forward direction (reference plane) is defined based on multiple points of view by executing the processing described later.

Figure 12:
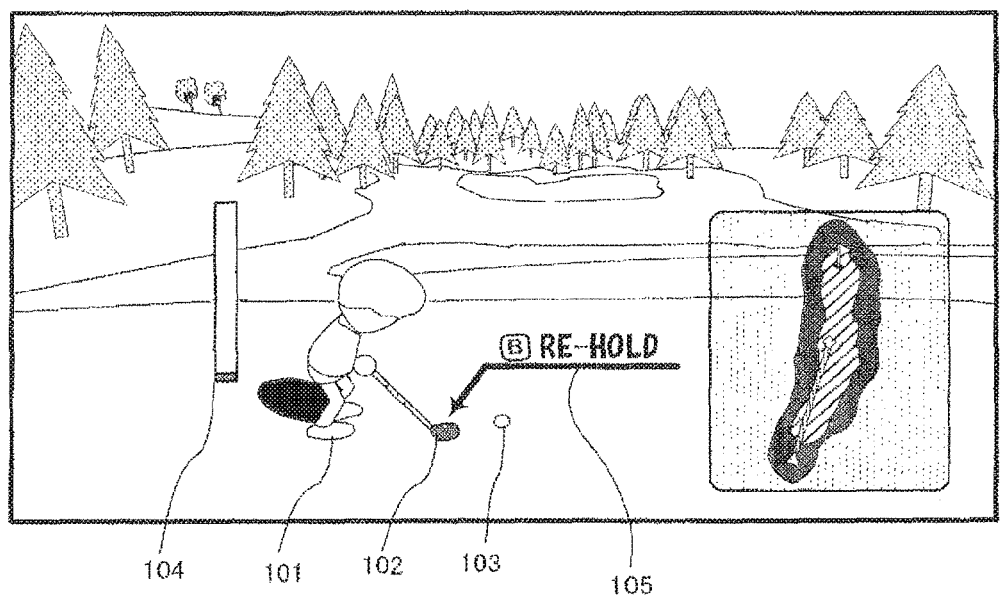
FIG. 12 shows an example of a game screen assumed in an embodiment of the present invention.

Also in this embodiment, the processing of estimating that it is necessary to reset the reference plane and displaying a message 105 as shown in FIG. 12 to urge the player to make a "re-hold" operation at an appropriate timing (hereinafter, the message 105 will be referred to as the "re-hold guide") is also executed.

Figure 13:
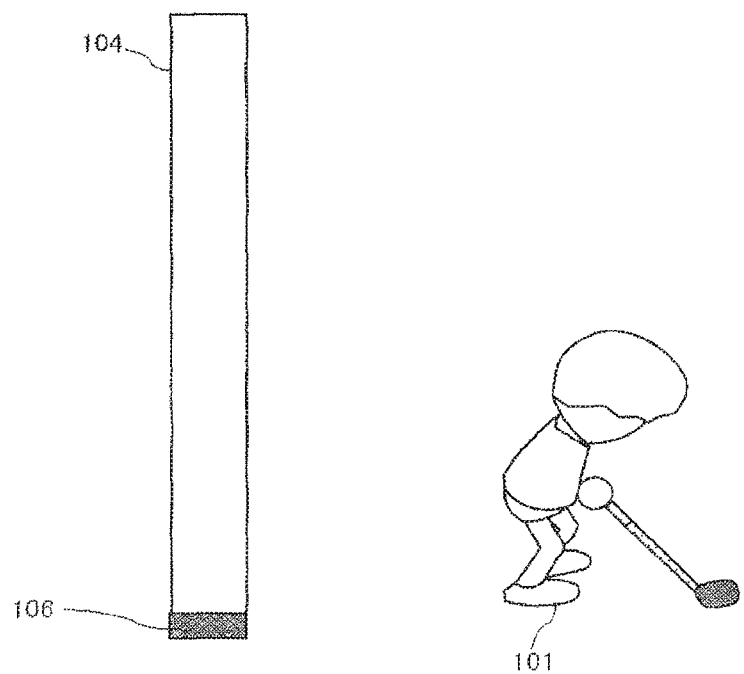
FIG. 13 is provided to explain a power gauge 104.

Now, the power gauge 104 displayed on the game screen will be described. The power gauge 104 is displayed as having a shape of a bar, and provides two types of information, i.e., a swing-up amount of the golf club 12 (information which allows the player to roughly estimate the power of the struck ball) and a twisting degree of the wrists (rotation angle around the Z axis). The swing-up amount is indicated by the position of the swing bar 106 in the gauge 104. The swing bar 106 goes up and down in accordance with the swing-up amount. For example, as shown in FIG. 13, when the player object 101 is in the state of a reference posture (address posture), the swing bar 106 is located at the bottom of the power gauge 104. After this, until the golf club 102 impacts the ball 103, the swing bar 106 goes up and down in real time in accordance with the swing-up amount.

Figure 14:
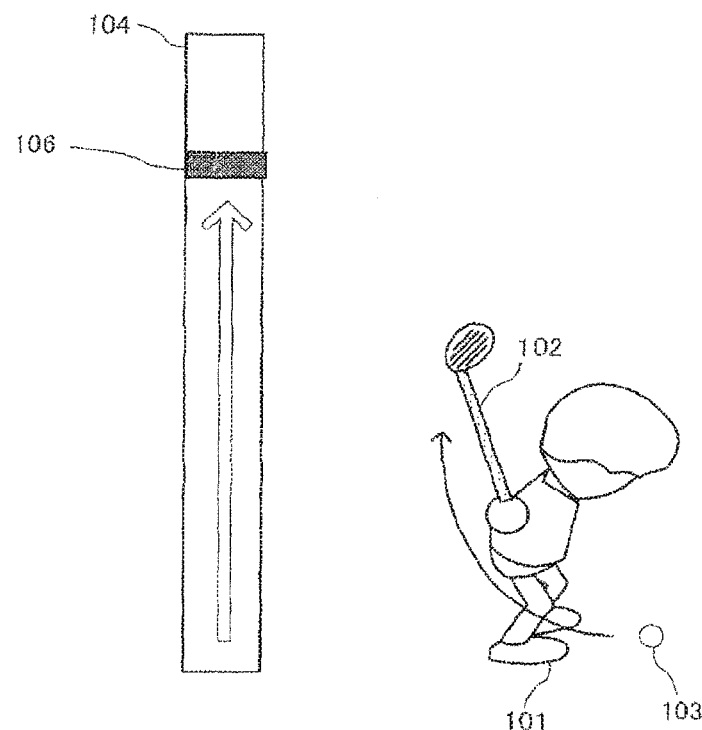
FIG. 14 is provided to explain the power gauge 104.
Figure 15:
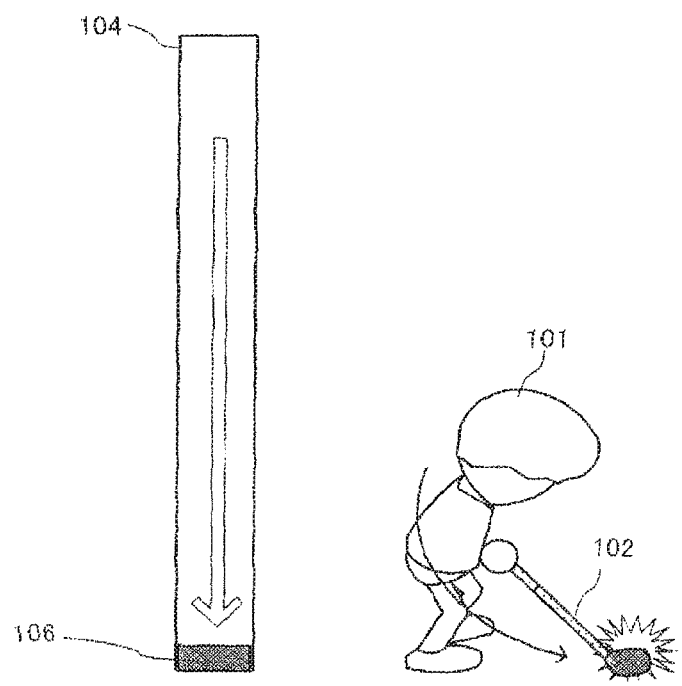
FIG. 15 is provided to explain the power gauge 104.

Specifically, when the golf club 102 (in the real world, the input device 8) is swung up, as shown in FIG. 14, the swing bar 106 moves up. As the swing-up amount is larger, the swing bar 106 moves to a higher position. Then, when the golf club 102 is swung down, the swing bar 106 moves down. At the time of impact, as shown in FIG. 15, the swing bar 106 is located at the bottom of the gauge 104. At the time of impact, the power of the struck ball is determined. When the power of the struck ball is determined (namely, when the impact is generated), the display of the swing bar 106 disappears. Instead, as shown in FIG. 16, a power bar 107 extends from the bottom of the gauge 104 by such a length that indicates the power of the struck ball. When the power bar 107 reaches the position corresponding to the power of the struck ball, the power bar 107 stops and does not extend any further.

Figure 18:
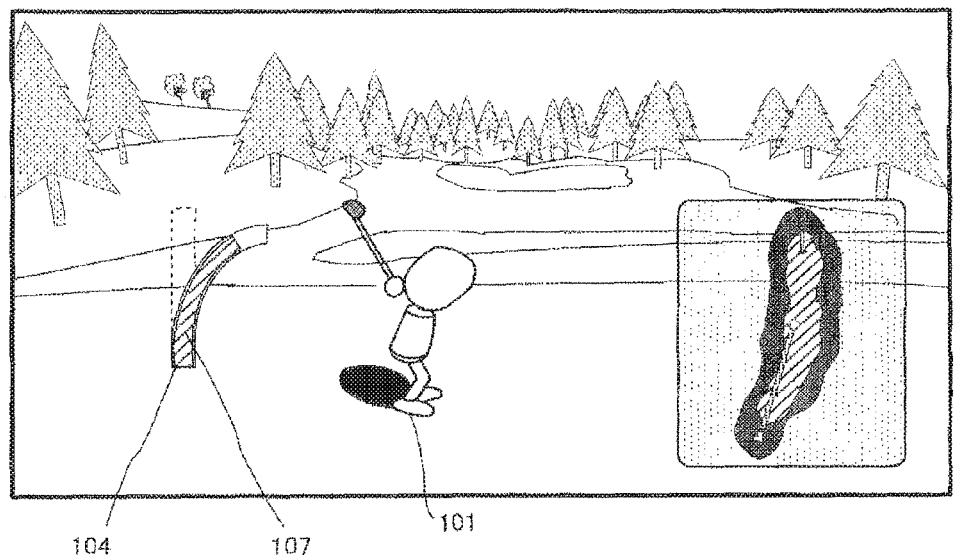
FIG. 18 shows an example of a game screen assumed in an embodiment of the present invention.
Figure 19:
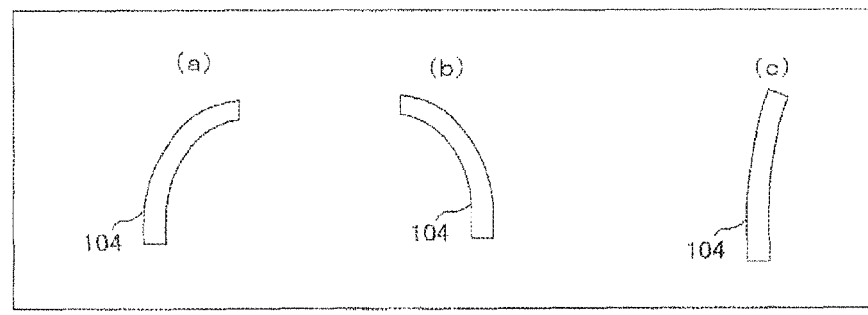
FIG. 19 is provided to explain the power gauge 104.
Figure 20:
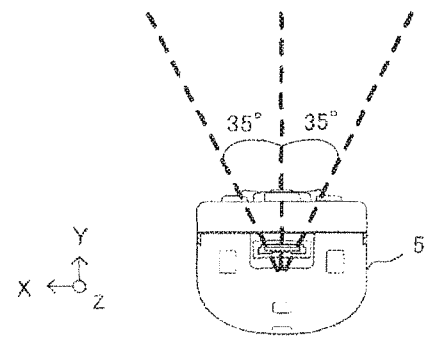
FIG. 20 is provided to explain a twisting angle.

As shown in FIG. 18, the twisting degree of the wrists (rotation angle around the Z axis) is represented by curving the power gauge 104. For example, when the player twists his/her wrists rightward (clockwise), as shown in FIG. 19(*a*), the power gauge 104 is curved rightward. When the player twists his/her wrists leftward (counterclockwise), as shown in FIG. 19(*b*), the power gauge 104 is curved leftward. As the twisting degree is larger, the curving degree is larger. By contrast, as the twisting degree is smaller, the curving degree is smaller as shown in FIG. 19(*c*). In this embodiment, as shown in FIG. 20, the maximum value of the twisting degree (rotation angle around the Z axis) is 35° rightward and leftward (−35° to)+35° with respect to the Y axis of the input device 8 (even when the twisting degree exceeds this range, such a degree is also treated as 35°). In this embodiment, the twisting degree is calculated with a premise that the angle at which the re-hold operation is made is 0°, the rightward twist has a positive value angle and the leftward twist has a negative value angle.

As described above, in this embodiment, two different elements of the swing-up amount and the twisting degree of the wrists are displayed by one power gauge 104.

Now, among various types of processing in this embodiment, distinctive processing will be described. The distinctive processing in this embodiment is roughly classified into the following three.
(1) Shot-related processing
(2) Power gauge-related processing
(3) Re-hold guide processing The (1) shot-related processing is roughly classified into the following three.
(1-1) Reference plane setting processing
(1-2) Swing-down motion reflection processing
(1-3) Backspin processing First, the (1-1) reference plane setting processing calculates and sets the reference plane when the B button 32*i* is pressed as described above. The reference plane is calculated based on multiple points of view in order to avoid the calculation for finding the forward direction from becoming unstable due to the difference in the manner in which the controller 5 is held, as described above.

The (1-2) swing-down motion reflection processing calculates a shot power based on the height of the swing bar 106 when the club is swung up. Specifically, when the club is once swung up and then is swung down slowly, the shot power is calculated to be weak in accordance with the fall of the swing bar 106. By contrast, when the club is once swung up and then is swung down with some vigor, a shot power corresponding to a position close to the height of the swing bar 106 when the club is swung up is calculated. When the club is once swung up and then is swung down more vigorously, the shot power is calculated to be stronger. Namely, the swing-down motion reflection processing causes the motion of swinging down the club during a swing to be reflected on the shot, in other words, reflects the manner of movement of the club when the club is swung down on the shot power. Specifically, when the club is once swung up and then is swung down slowly, the swing bar 106 goes down in accordance with the movement of the club. By contrast, when the club is once swung up and then is swung down vigorously, a shot can be made at substantially the same power as that when the club is swung up.

Figure 21:
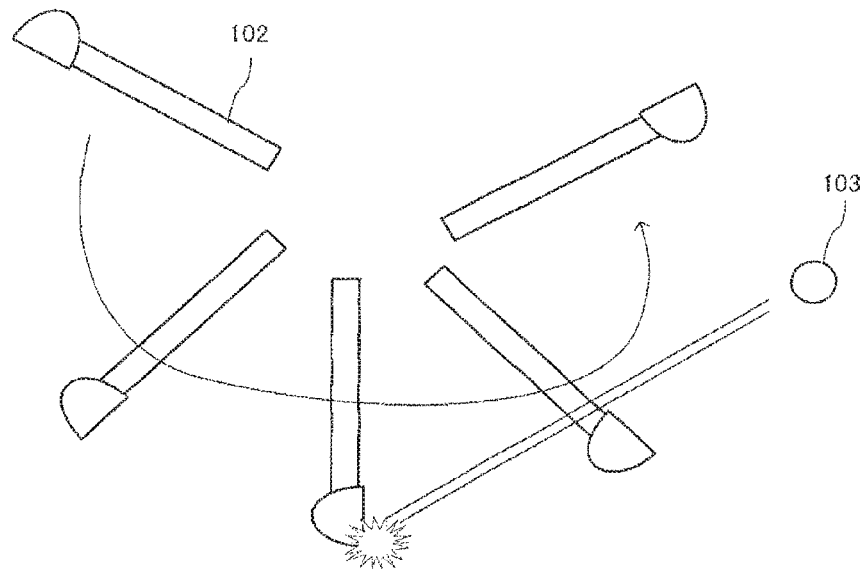
FIG. 21 is provided to explain a backspin operation.
Figure 22:
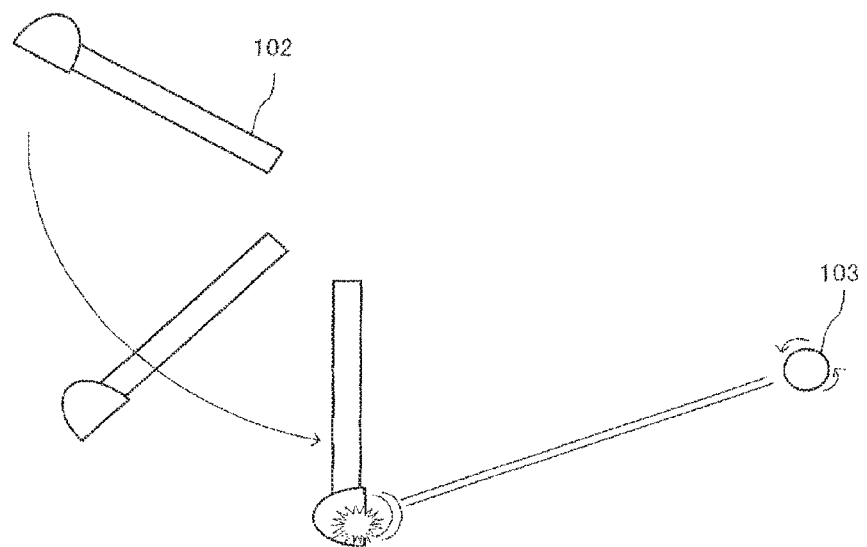
FIG. 22 is provided to explain the backspin operation.

The (1-3) backspin processing will be described. In this embodiment, when the club is swung to impact the ball, a backspin can be applied to the ball 103 by stopping the golf club 102 at a position of the ball 103 as shown in FIG. 22 (by applying a sudden brake at the position of the impact to stop the club 102), instead of swinging the club 102 all the way through as shown in FIG. 21. The (1-3) backspin processing detects that a sudden brake has been applied to the swing in the middle (a swing with a braking power) and causes the movement of the club at this point to be reflected on the struck ball as a backspin.

The (2) power gauge-related processing calculates the swing-up amount (swing angle) and the twisting degree of the wrists (rotation angle around the Z axis) described above and causes each of the swing-up amount and the twisting degree of the wrists to be reflected on the display of the power gauge 104.

The (3) re-hold guide processing will be described. In this embodiment, it is necessary to perform a "re-hold" operation (to reset the reference plane) by pressing the B button 32*i* periodically as described above. The (3) re-hold guide processing estimates that it is necessary to reset the reference plane and displays the re-hold guide message 105 at an appropriate timing.

Now, an overview of each of the processing will be described.

(Overview of the Reference Plane Setting Processing)

First, an overview of the (1-1) reference plane setting processing of the (1) shot-related processing will be described. As described above, this processing defines the reference plane (forward direction) when the B button 32*i* is pressed. In this embodiment, in order to avoid the calculation result from becoming unstable due to the difference in the manner in which the player holds the input device 8 when pressing the B button 32*i*, the following processing is executed.

First, a plane including the Z-axis direction and a gravity direction (in a local coordinate system of the input device 8) is calculated based on the current posture of the input device 8. Hereinafter, this plane will be referred to as the "first candidate plane".

Next, a rotation which directs the positive Z-axis direction toward the gravity direction is applied to the Y axis to calculate a Y' axis. This means virtually redirecting the input device 8 vertically downward and finding the Y-axis direction in this state. Then, a plane including the Y'-axis direction and the gravity direction is calculated. Hereinafter, this plane will be referred to as the "second candidate plane".

The reason why the Y axis is not used but the Y' axis is calculated is as follows. In general, it is considered that when the player takes a posture of holding a golf club to be ready to swing, the input device 8 is more often at an inclining posture (posture of raising up the Z axis) than a posture of being directed vertically downward. Often, the Y-axis direction is deviated from the forward direction of the player as a result of the input device 8 being pulled by a rotation made to take this posture of raising up the Z axis. Therefore, it is considered that a better calculation result is provided for executing the golf game processing by using the Y' axis obtained by assuming that the input device 8 is once directed vertically downward than using the Y axis. Hence, the Y axis may be used instead of the Y' axis depending on the particulars of the game processing.

Based on the above-described two candidate planes and the reference plane already calculated at each point in time (i.e., the reference plane calculated immediately previously), a new reference plane is calculated. The new reference plane can be calculated by, for example, as follows. According to one method, the new reference plane is found by blending the two candidate planes. In this case, the two planes are blended after being weighted such that the candidate plane located closer to the current reference plane is relied on more heavily.

Figure 23:
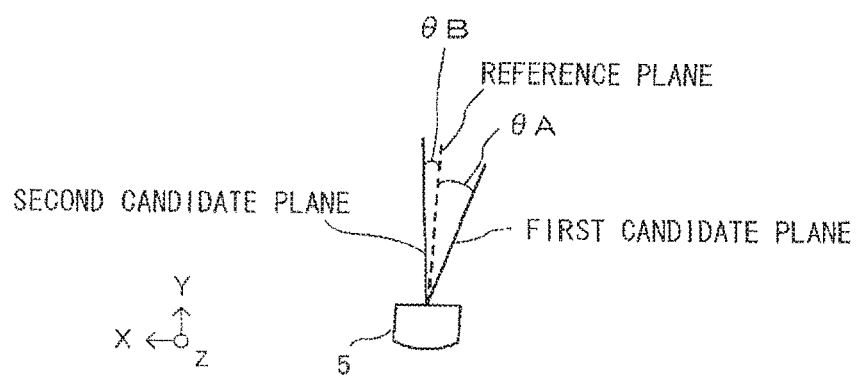
FIG. 23 shows an example of the relationship among the input device 8, the reference plane and two candidate planes.

For example, it is assumed that the input device 8, the reference plane and the two candidate planes have the relationship shown in FIG. 23. FIG. 23 is a schematic view of the input device 8 as seen from the negative Z-axis direction. Where the angle made by the first candidate plane and the current reference plane is θA and the angle made by the second candidate plane and the current reference plane is θB, the new reference plane is calculated by, for example, the following expression.

Weight $a=1-\cos(\theta B/2)$

Weight $b=1-\cos(\theta A/2)$

Ratio $a=\text{weight } a/(\text{weight } a+\text{weight } b)$

Ratio $b=\text{weight } b/(\text{weight } a+\text{weight } b)$

New reference plane=ratio $a$×first candidate plane+
ratio $b$×second candidate    expression 1

In the above expression, weight a is larger as the second candidate plane is more deviated from the current reference plane. Weight b is larger as the first candidate plane is more deviated from the current reference plane.

Ratio a and ratio b may be calculated by the following expression.

Weight $a=1-\cos(\theta B/2)$

Weight $b=1-\cos(\theta A/2)$

Ratio $a=(\text{weight } a)^2/((\text{weight } a)^2+(\text{weight } b)^2)$

Ratio $b=(\text{weight } b)^2/((\text{weight } a)^2+(\text{weight } b)^2)$

New reference plane=ratio $a$×first candidate plane+
ratio $b$×second candidate plane    expression 1'

Expressions 1 and 1' shown above pay attention to the "closeness" between the current reference plane and each of the candidate planes. Alternatively, the new reference plane may be calculated by a technique paying attention to the angle made by each of the candidate planes and the gravity direction, as follows. The angle made by the Z-axis direction and the gravity direction, and the angle made by the Y-axis direction (or the Y'-axis direction) and the gravity direction, are calculated. As the calculated angles are larger, the ratios of the weighted averages (ratio a and ratio b) are made larger.

Still alternatively, the new reference plane may be calculated by selecting only the candidate plane which is closer to the current reference plane and blending the selected candidate plane and the current reference plane. Assuming that the candidate plane and the reference plane have the relationship shown in FIG. 23, the new reference plane is calculated by, for example, the following expression.

New reference plane=0.9×current reference plane+
0.1×selected candidate plane    expression 2

In expression 2, the ratios of the weighted averages are fixed (0.9 and 0.1). In this expression, the current reference plane is weighted more heavily, namely, is relied on more heavily.

The ratios of the weighted averages, although being fixed in expression 2, do not need to be fixed. For example, the ratios of the weighted averages in expression 2 may be made higher as the angle made by the axis used for calculating the "candidate plane closer to the current reference plane" (Z axis or the Y' axis) and the gravity direction is larger.

Instead of using the "candidate plane closer to the current reference plane", the angle made by the Z axis and the gravity direction and the angle made by the Y' axis and the gravity direction may be calculated, and the plane corresponding to a larger angle may be selected. In other words, the new reference plane may be calculated by relying more heavily on the candidate plane calculated using the Y' axis when the input device 8 is directed downward like a golf club which is held to be ready to swing; or by relying more heavily on the candidate plane calculated using the Z axis when the input device 8 is directed upward like a baseball bat which is held to be ready to swing.

The above-described blending methods are merely exemplary, and any other processing method is usable as long as each of the two candidate planes and the current reference plane can be appropriately blended together.

As a result of using any of the above-described calculation methods, the reference plane can be corrected as follows. Where the candidate planes calculated by a plurality of methods contradict each other, the reference plane can be corrected mildly in consideration of the reliability; whereas where the candidate planes match each other, the reference plane can be corrected boldly and significantly. By paying attention to the relationship of the candidate planes with the "gravity direction" and the "current reference plane", the calculation result is avoided from becoming unstable due to the difference in the manner in which the player holds the input device 8. Namely, the forward direction (reference plane) is avoided from being set to be a direction unintended by the player due to a slight unintentional movement of the input device 8 made while the input device 8 is held by the player. As a result, the processing is executed such that the position of the reference plane is corrected in accordance with the manner in which the player holds the input device 8.

(Overview of the Swing-Down Motion Reflection Processing)

Now, an overview of the (1-2) swing-down motion reflection processing will be described. This processing causes the movement of the club when being swung down to be reflected on the power of the struck ball. For example, when the player swings up the club widely and swings down the club strongly, the power of the struck ball is calculated to be strong; whereas when the player swings the club weakly or slowly, the power of the struck ball is calculated to be weak accordingly. Specifically, it is assumed that the player swings up the controller 5 and as a result, the swing bar 106 goes up to the top of the power gauge 104 (a state where the power of the struck ball is expected to be 100%). When the player swings down the club quickly from this state, the power (the expected value of the power of the struck ball represented by the position of the swing bar 106) which is reflected on the power of the struck ball is almost 100%. By contrast, it is assumed that, where the swing bar 106 is at the top of the power gauge 104, the player changes his/her mind (for example, considers that this is too strong) and lowers the input device 8 (golf club 102) slowly to a position corresponding to about 75% of the power gauge 104 (position which is about ¾ of the power gauge 104 from the bottom thereof) (in association with this movement, the swing bar 106 is lowered) to make a swing at this position. In this case, the power reflected on the power of the struck ball is not 100% as above but is about 75% in correspondence with the position of the club after the player changes his/her mind and lowers the club. In this manner, the swing-down motion reflection processing causes the particulars of the swing-down motion to be reflected on the power of the struck ball.

In this embodiment, the above-described processing is specifically executed as follows. First, a swing-up amount H corresponding to the swing bar 106 is calculated. How to calculate the swing-up amount H will be described later in the explanation of the "power gauge-related processing" and the like. Briefly, the amount by which the player swing up the input device 8 (swing angle) is calculated as the swing-up amount (namely, the position of the swing bar 106 in the power gauge 104). In addition, in this embodiment, a follow-up amount T (T is 0.0 to 1.0) which follows the swing-up amount (swing bar 106) is calculated. The follow-up amount T is found by the following expression.

When $H<T$, $T=T$+follow-up coefficient $Kt\times(H-T)$   expression 3

When $H \geq T$, $T=H$

The above expressions will be explained. "$H<T$" refers to when a swing-down motion is made. "$H \geq T$" mainly refers to when a swing-up motion is made. While the swing-up motion is being made, the follow-up amount T is the same as the swing-up amount H. The follow-up amount T follows the swing-up amount only while the swing-down motion is being made. The follow-up coefficient Kt is provided for decreasing the followability when the swing is strong (when the acceleration is large) and for increasing the followability when the swing is weak (when the acceleration is small). The follow-up coefficient Kt is obtained by converting the strength of the swing which is calculated in terms of the acceleration. Specifically, the follow-up coefficient Kt is found as follows. First, from the acceleration obtained by the acceleration sensor 37, a gravity component (1.0 G) is removed. An absolute value of the result is set as the "magnitude of the acceleration". In this embodiment, this absolute value is in the range of 0.0 G to 1.2 G. The magnitude of the acceleration in the range of 0.0 G to 1.2 G is converted (assigned) into a value in the range of 0.2 to 0.01, and the obtained value is set as the follow-up coefficient Kt (i.e., Kt=0.2 to 0.01).

This calculation provides the following results. As the player, after swinging up the input device 8, swings down the input device 8 more rapidly or more strongly, the follow-up amount T can be maintained at a value closer to the maximum value of the past swing-up amounts (hereinafter, referred to as the "maximum swing-up amount"). As the player swings down the input device 8 more slowly or more weakly, the follow-up amount T is decreased in accordance with the swing-up amount H.

Expression 3 uses "(H−T)". Therefore, as the difference between the swing-up amount H and the follow-up amount T is larger, the value of T decreases (follows) by a larger amount.

When $H \geq T$, the swing-up amount H is the lower limit of the value of the follow-up amount T. This means that even while the swing-down motion is being made, the value of the follow-up amount T does not decrease to be lower than the value of the swing-up amount H.

For determining the power of the struck ball, in conventional golf games, the maximum swing-up amount is set as the swing power. In this embodiment, when the golf club 102 and the ball 103 make an impact, the final power of the struck ball (hereinafter, referred to as the "struck ball power P") is determined. As the struck ball power P, the value of the follow-up amount T is used instead of the maximum swing-up amount or the swing-up amount H. Namely, the follow-up amount T corresponding to a value obtained by correcting the swing-up amount H is used as the struck ball power P. Owing to this, the struck ball power can be made different between when the input device 8 is swung down strongly and when the input device 8 is swung down slowly. In this embodiment, the following processing is further executed to determine the final struck ball power P.

In this embodiment, in addition to the follow-up amount T, an element of "excessive swing strength S" is calculated (S is 0.0 to 1.0). This is performed in order to evaluate the "strength" of a down swing as, for example, a "strong down swing with a force" or a "light down swing with little force", and cause the evaluation result to be reflected on the struck ball power P. Owing to the above-described calculation method of the follow-up amount T, especially the calculation of decreasing the follow-up coefficient Kt as the acceleration during the swing is larger, the struck ball power P is increased as the input device 8 is swung more strongly (as the acceleration is larger). However, the upper limit of the struck ball power P is equal to the maximum value of the swing-up amount H. Therefore, however strongly the input device 8 may be swung, the struck ball power P does not exceed the maximum value of the swing-up amount H. In order to solve this, it is considered to evaluate an acceleration during an excessively strong swing which does not influence the struck ball power P (the follow-up amount T) as the "excessive swing strength S" and superpose the "excessive swing strength S" on the struck ball power P. In this embodiment, the "excessive swing strength S" is evaluated by a series of swing motions as follows. The acceleration during a swing is virtually decreased, and it is observed how the struck ball power P calculated with such a decreased acceleration changes. For example, the follow-up amount T is re-calculated with an assumption that where the "swing-down strength" from the state of the swing-up amount H is 100%, the acceleration is only 20% (i.e., the acceleration is decreased by 80%). When the re-calculation is performed with the acceleration being estimated smaller in this manner, it is expected that the "swing-down strength" is finally calculated to be 60% to 80% with an influence of the element of the follow-up amount T and the like. In the case where, even though the swing-down strength is calculated with the acceleration being decreased by 80%, the resultant swing-down strength is merely different from the original swing-down strength by a small amount (the re-calculation result has a value of about 80%), namely, the resultant swing-down strength is not much different from the original swing-down strength, it can be evaluated that the value of the original acceleration is too large. By contrast, in the case where the resultant swing-down strength is much different from the original swing-down strength (the re-calculation result has a value of about 60%), it can be evaluated that there is no waste in the acceleration. In other words, when the struck ball power P is decreased in accordance with the decrease in the acceleration, it is considered that the swing has no waste in the acceleration. When the struck ball power P is not much decreased even though the acceleration is decreased, it is considered that the original acceleration is too large, namely, the swing is excessive in terms of the acceleration. Hence, a difference between the original "swing-down strength" and the "swing-down strength"

obtained by the re-calculation performed with the decreased acceleration is evaluated as the "excessive swing strength S".

Specifically, the processing is executed as follows. First, assuming that the acceleration during the swing is merely 20% of the actual acceleration (the acceleration is decreased by 80%), the same calculation as that performed to find the follow-up amount T is made. The result is set as a decreased follow-up amount T' (in this embodiment, T' is 0.0 to 1.0). The follow-up amount T and the decreased follow-up amount T' are compared with each other to find the difference. When the difference is small, it is considered that a swing with a relatively strong force (swing excessive in terms of the acceleration) is performed. When the difference is large, it is considered that the actually performed swing has an appropriate strength (in the game processing) (i.e., the actually performed swing is a swing with no waste in the acceleration).

A more specific calculation method will be described. In this embodiment, T'/T is first calculated. Among the calculation results, a value in the range of 0.6 to 0.8 is assigned to a value of the excessive swing strength S (0.0 to 1.0). Using the excessive swing strength S and the follow-up amount T, the final struck ball power P is calculated by the following expression.

$$P=T+\text{coefficient } Kz \times S \quad \text{expression 4}$$

The coefficient Kz represents the weight applied on S, which is 0.25 in this embodiment. Namely, the struck ball power P is determined by superposing 25% of the excessive swing strength S on the follow-up amount T (the value of the coefficient Kz is appropriately determined in consideration of the game balance or the like).

As described above, in this embodiment, by executing the processing of calculating the struck ball power P in consideration of the elements of the follow-up amount T and the excessive swing strength S, the particulars of the motion of swinging down the input device 8 can be reflected on the struck ball power P. For example, according to this processing, when the input device 8 is swung until the level of the swing bar 106 reaches 100% (the state where the swing bar 106 is at the top of the power gauge 104) and then swung down quickly, a struck ball power corresponding to almost 100% level of the swing bar 106 is obtained. When the input device 8 is swung down slowly, a struck ball power which is lower accordingly is obtained.

(Overview of the Backspin Processing)

Now, an overview of the (1-3) backspin processing will be described. As described above, a backspin can be applied to the struck ball by making a swing which stops the golf club in the middle instead of swinging the club all the way through. In this embodiment, in order to realize such a movement, a "bend" of the head of the golf club is used. More specifically, a model of the "bend" in which "the head is bent rearward by a swing, bent back when the swing is stopped, and in a certain case, bent forward by inertia" is used.

The bend of the club head during a swing in such a model will be discussed. When a swing is made normally, the golf club is swung up and starts being swung down. Until the club head hits the ball, the club head is bent rearward. When the swing is suddenly stopped as described above, namely, a braking power is applied, the club head is considered to be bent forward by inertia. In this embodiment, processing of finding the maximum value of the forward bend and causing the maximum value to be reflected on the backspin ratio is executed. Namely, after the swing (club) is stopped, how forward (in the direction in which the ball is to fly) the club head is bent by inertia is measured, and the backspin ratio (backspin strength) is set in accordance with the bending degree.

Figure 24:
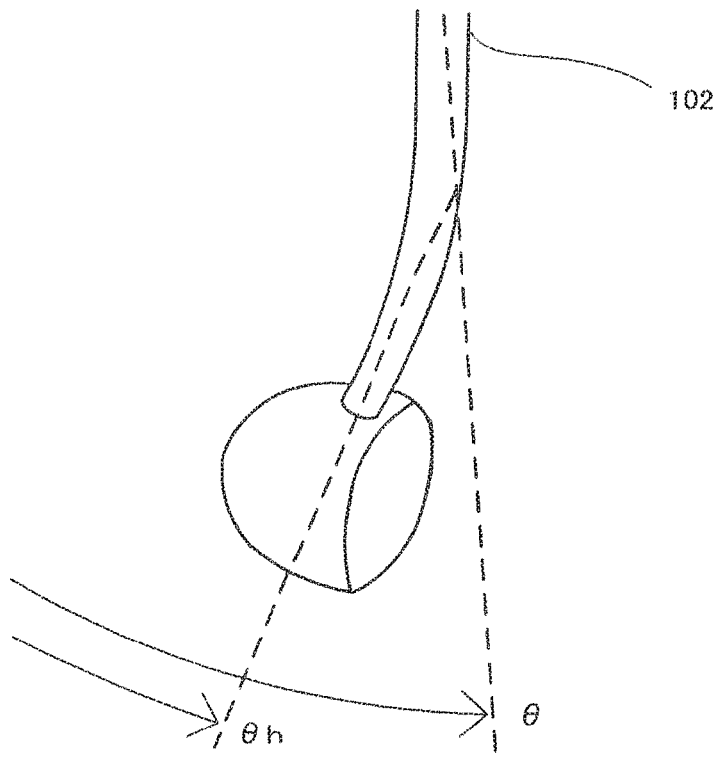
FIG. 24 schematically shows an example of a bend of a club head.

FIG. 24 schematically shows an example of the bend of the head. In FIG. 24, angle θ represents the swing-up angle described above. Angle θh (hereinafter, referred to as the "follow-up angle") represents the angle of the bent head of the club. Thus, a bending angle φ can be calculated by the following expression (in FIG. 24, φ<0).

$$\phi = \theta h - \theta \quad \text{expression 5}$$

A change of the bending angle φ into a forward bend (φ>0) is monitored. The maximum value of the change to the forward bend is found and caused to be reflected on the backspin ratio.

Figure 25:
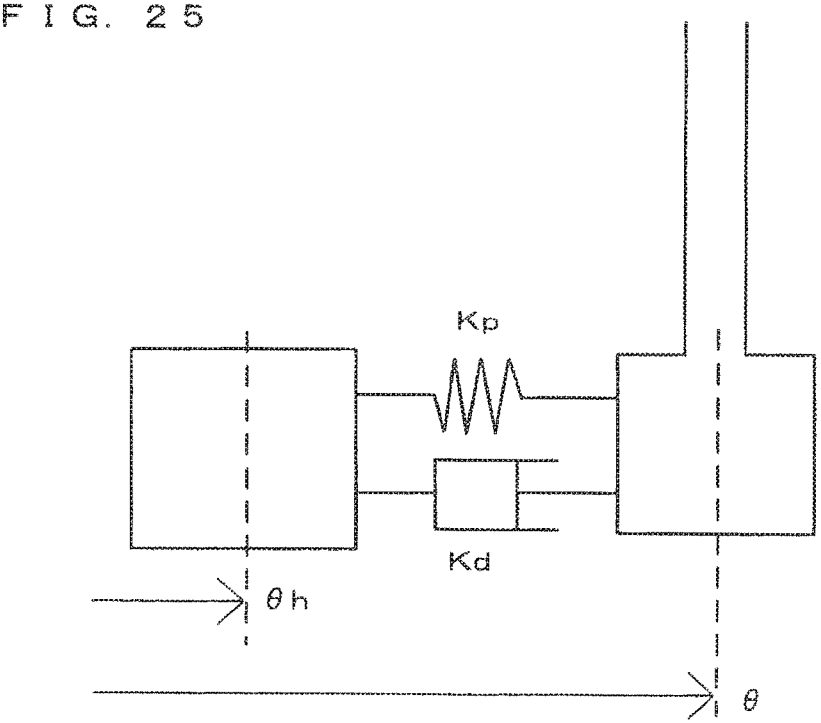
FIG. 25 is a model of the club head made using a "spring" and a "damper"

FIG. 25 shows a model of the above-described bend provided using a "spring" and a "damper". In the model shown in FIG. 25, the club head is connected to the main body of the club by the "spring" Kp and the "damper" Kd. In this embodiment, the bend of the club head is simulated using such a model. Specifically, an acceleration A of the head is calculated using the following expression.

$$A = -Kp(\theta h - \theta) - Kd(\theta hd - \theta d) \quad \text{expression 6}$$

In expression 6, variable θhd represents a difference between θh in the immediately previous frame and θh in the current frame. Variable θd represents a difference between θ in the immediately previous frame and θ in the current frame. In "−Kp(θh−θ)" in expression 6, θh is the follow-up angle in the immediately previous frame, and θ is the current swing-up angle.

In this embodiment, variables Kp (spring) and Kd (damper) are updated in accordance with the absolute value of the swing-up angle θ. Namely, the bending characteristic is varied in accordance with the swing-up angle θ. This is performed in order to make the head likely to be bent in the vicinity of the impact and unlikely to be bent far from the impact. As a result, a backspin is likely to be applied when the club is stopped in the vicinity of the impact, and is unlikely to be applied when the club is swung all the way through.

Using the acceleration A, the velocity of the club head is calculated. Based on the velocity, the follow-up angle, i.e., the angle (position) θh of the head is calculated. Once the follow-up angle θh is calculated, the bending angle θ can be calculated using expression 5.

Then, processing of updating the backspin ratio K using the maximum value of the forward bending angle φ is executed. In this embodiment, processing of varying the degree, at which the bending angle φ is reflected on the backspin ratio, in accordance with the type of the club or the struck ball power is also executed.

Owing to such processing, when the club is stopped in the vicinity of the impact during a swing, a backspin can be applied. In addition, when the swing is vigorous before the club is stopped, a stronger backspin can be applied (because the club head is bent forward by inertia).

(Overview of the Power Gauge-Related Processing)

Now, an overview of the (2) power gauge-related processing will be described. In this embodiment, as described above, the twisting degree of the wrists (rotation around the Z axis) and the swing-up amount H are calculated. The swing-up amount H is displayed as the swing bar 106, and the twisting degree is displayed by curving the power gauge 104 itself. Thus, two different elements are displayed with one power gauge.

In this embodiment, the twisting degree is specifically calculated as follows. As described above, at the time of the re-hold operation, the reference plane is calculated. At this point, an angle of the X axis of the input device 8 with respect to the reference plane is calculated and stored (hereinafter, this angle will be referred to as the "reference X angle"). FIG. 26 is a schematic view showing the concept of the reference X angle. FIG. 26 shows the input device 8 directed vertically downward, which is seen from the negative Z-axis direction. In FIG. 26, the angle of the X-axis direction of the input device 8 with respect to the reference plane is 90°.

Figure 28:
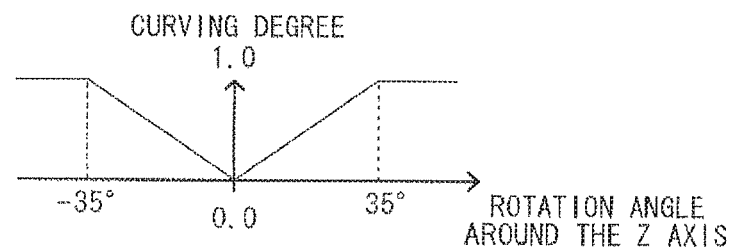
FIG. 28 is an exemplary graph usable for converting the twisting angle into a curving degree of the power gauge.

Next, during the swing (processing in each frame after the reference plane is set), a reference plane is virtually calculated using the same technique as that used for calculating the reference plane, based on the posture of the input device 8 at each point in time (hereinafter, this plane will be referred to as the "virtual reference plane"). An angle of the X-axis direction of the input device 8 with respect to the virtual reference plane is calculated. For example, it is assumed that the input device 8 is slightly inclined rightward with the Z axis being directed vertically downward, and that the virtual reference plane including the Z axis and the gravity direction and the angle of the X-axis direction with respect to the virtual reference plane at this point are as shown in FIG. 27 (hereinafter, this angle will be referred to as the "current X angle"). It is assumed that the current X angle is, for example, 100°. A difference between reference X angle and the current X angle is calculated, and this difference is set as the twisting angle. In the above example, the twisting angle is 100°−90°=10°. Based on the twisting angle thus calculated, the power gauge 104 is displayed as being curved in real time during the swing motion (until the shot is made). For example, the curving degree of the power gauge 104 is defined at a value in the range of −1.0 to 1.0 (a negative value indicates that the power gauge 104 is curved leftward and a positive value indicates that the power gauge 104 is curved rightward). Then, as shown in FIG. 28, the value of the twisting degree is assigned to a value in this range in accordance with the line graph. Thus, the curving degree of the power gauge 104 is calculated. Based on the curving degree, the power gauge 104 is curved.

It is conceivable that the twisting degree is calculated using only the angular velocity of the Z axis. However, the actual swing motion is not performed by only the rotation around the Z axis, but is performed by a combination of the rotation around the Z axis, the rotation around the X axis and the rotation around the Y axis. Therefore, even if the "accumulated value of the angular velocity of the Z axis" is zero, it may not be determined that there is no twisting of the wrists. For this reason, in this embodiment, the twisting degree is calculated using the plane based on the posture of the input device 8.

The swing-up amount H is obtained by calculating the angle, at which the golf club 102 (input device 8) is swung up, with respect to the reference posture, namely, how much the Z axis of the input device 8 is raised from the ground. This swing-up angle is converted into the swing-up amount H and is caused to be reflected on the position of the swing bar 106. In the case of a golf swing, the input device 8 is considered to be at the reference posture when the positive Z-axis direction is directed vertically downward. By finding the inclination of the Z axis with respect to this state, the swing-up angle can be found.

Figure 29:
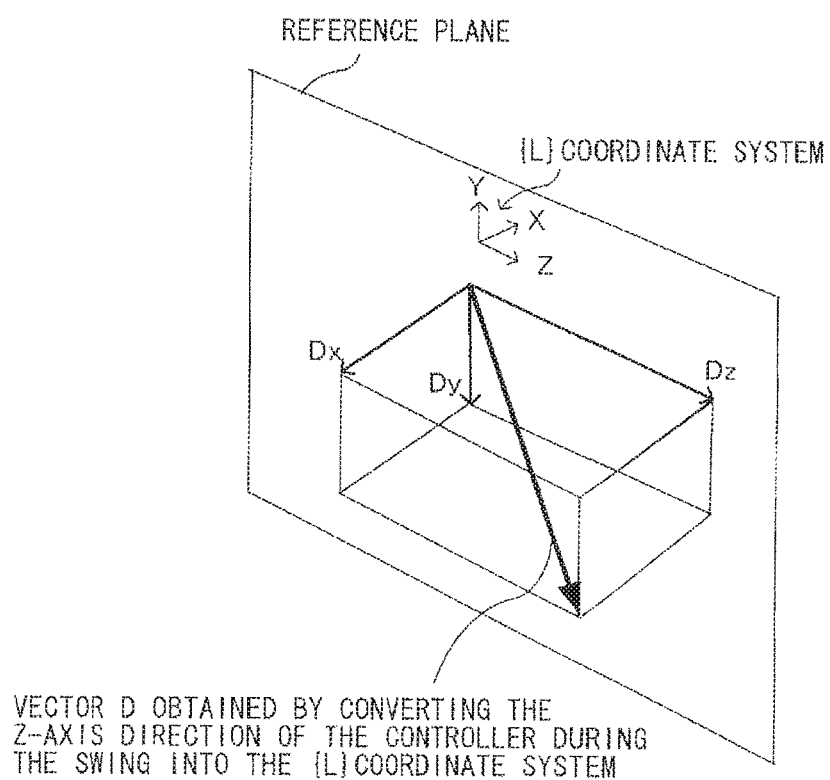
FIG. 29 is provided to explain how to calculate a swing-up amount H.

More specifically, in this embodiment, the swing-up amount H is calculated as follows. First, based on the reference plane, a coordinate system {L} shown in FIG. 29 is set, in which an upper gravity direction is the Y direction and a vertical direction with respect to the reference plane is the X direction. Hereinafter, this coordinate system will be referred to as the "{L} coordinate system".

Next, a vector D is calculated by converting the positive Z-axis direction in the local coordinate system of the input device 8 during the swing into a direction in the {L} coordinate system.

Based on three axial components of the vector D (Dx, Dy, Dz), the swing-up angle θ is calculated using the following expression.

$$\theta = \text{Atan}(Dx, -Dy + K \times Dz) \qquad \text{expression 7}$$

In the above expression, variable K>0. The element of Dz is added in consideration of the case where the input device 8 is swung horizontally (like in baseball). Namely, the calculation result of the angle is avoided from becoming unstable when Dx and Dy both approach zero (a state where the input device 8 is held horizontally). In the case where Dz is on the positive side, the same effect as that obtained when the input device 8 is directed more downward than actual is provided. In the case where Dz is on the negative side, the same effect as that obtained when the input device 8 is directed more upward than actual is provided. In other words, even when the input device 8 is swung horizontally (even when the input device 8 is swung like in baseball), an effect as that obtained when the input device 8 is swung vertically (golf swing) is provided to a certain degree.

As a result of using the above expression, when the input device 8 takes the posture of the re-hold operation (the posture at which the B button 32*i* is pressed), θ=0. When the input device 8 is swung forward (in the direction in which the ball is to fly), θ is calculated to have a positive value. When the input device 8 is swung up, θ is calculated to have a negative value. The swing-up angle θ thus obtained is converted into the swing-up amount H. For example, the swing-up angle θ is set to be in a range of −180° to +180°, and the swing-up amount H is set to be in a range of 0.0 to 1.0. In accordance with the line graph shown in FIG. 30, the absolute value of the swing-up angle θ is converted into the swing-up amount H. By moving the swing bar 106 up and down in accordance with the swing-up amount H, the swing-up amount is displayed. In this embodiment, when the swing-up amount H is 0.0, the swing bar 106 is at the bottom of the power gauge 104; whereas when the swing-up amount H is 1.0, the swing bar 106 is at the top of the power gauge 104.

As described above, in this embodiment, the twisting degree is represented by the curving of the power gauge 104, and the swing bar 106 is moved up and down in the power gauge 104. Thus, for example, the power gauge 104 is displayed as shown in FIG. 18. Two elements of the swing-up amount (providing an estimate on the struck ball power) and the twisting degree of the wrists (opening degree of the face) are displayed together. This makes it possible to allow the player to intuitively perceive the influence on the golf ball at the time of shot.

(Overview of the Re-Hold Guide Processing)

Now, an overview of the (3) re-hold guide processing will be described. As described above, in this embodiment, the re-hold guide 105 shown in FIG. 12 is displayed at an appropriate timing for urging the player to make a "re-hold" operation by pressing the B button 32*i*. The re-hold guide 105 is displayed as follows. Basically, at the timing when the B button 32*i* is pressed, an internal counter starts counting up (hereinafter, referred to as the "guide display counter"). The guide display counter counts up frame by frame, and when the value of the guide display counter reaches a predetermined value or greater, the re-hold guide 105 is displayed. In this embodiment, in order to determine the "appropriate timing", the "necessity degree of re-hold" (hereinafter, referred to as the "necessity degree Kr") and the "possibility that the holding posture is taken" (hereinafter, referred to as the "holding posture possibility Ks") are calculated and caused to be reflected on the count-up described above. Moreover, the guide display counter is reset at a predetermined timing in order to make the "appropriate timing" more accurate. Specifically, the guide display counter is reset at the following timings.

(1) When the B button 32*i* is pressed.

(2) When the posture of the input device 8 is significantly different from the posture expected at the time of "re-hold" (address posture). For example, when the positive Z-axis direction of the input device 8 is directed above the horizontal direction while the positive Y-axis direction is directed below the horizontal direction (like the posture of a baseball batter).

(3) During a swing. Whether or not a swing is being made is determined based on whether or not the absolute value of the angular velocity or the acceleration is greater than a predetermined value; specifically, whether or not the absolute value of the angular velocity is larger than 30 deg/sec., and whether or not the absolute value of the acceleration is larger than 0.2 G.

Now, methods for calculating the necessity degree Kr and the holding posture possibility Ks will be described. The necessity degree Kr is the degree at which the re-hold operation is considered to be necessary. The holding posture possibility Ks is the possibility at which the player is in a state of holding. Herein, the "state of holding" is a state where the front surface of the input device 8 is directed downward to a certain degree (state closer to the address state). Namely, a state where the golf club is swung up is excluded.

In this embodiment, the necessity degree Kr is calculated as follows. First, assuming that "the B button is pressed at this instance", a temporary reference plane is created. An absolute value of the angle between the temporary reference plane and the current reference plane is calculated. (The angle made by these two planes means the angle made by surface normals of the two planes.) When this angle is 0°, it is determined that the re-hold operation is not necessary; whereas when this angle is 11° or greater, it is determined that the re-hold operation is necessary.

The necessity degree Kr is set to be in the range of 0.0 to 1.0. A value of 0.0 means that the re-hold operation is not necessary, whereas a value of 1.0 means that the re-hold operation is highly necessary. Namely, when the angle is 0°, Kr=0.0; whereas when the angle is 11°, Kr=1.0. A value of Kr between 0° to 11° is calculated by linear interpolation.

Now, the holding posture possibility Ks is calculated using the elements of an angular velocity stable state Sw, an acceleration stable state Sa (i.e., a state where no active motion is generated), and a re-holding posture accuracy St. The angular velocity stable state Sw is calculated as follows. When it is considered that a swing is not being made based on the angular velocity, namely, when the absolute value of the angular velocity is 30 deg/sec. or less, the absolute value of such an angular velocity is converted into a value in the range of 0.0 to 1.0. The obtained value is set to be Sw. The acceleration stable state Sa is calculated in substantially the same manner. When it is considered that a swing is not being made based on the acceleration, the absolute value of such an acceleration in the range of 0 G to 0.2 G is assigned to a value in the range of 0.0 to 1.0. The obtained value is set to be Sa.

Figure 31:
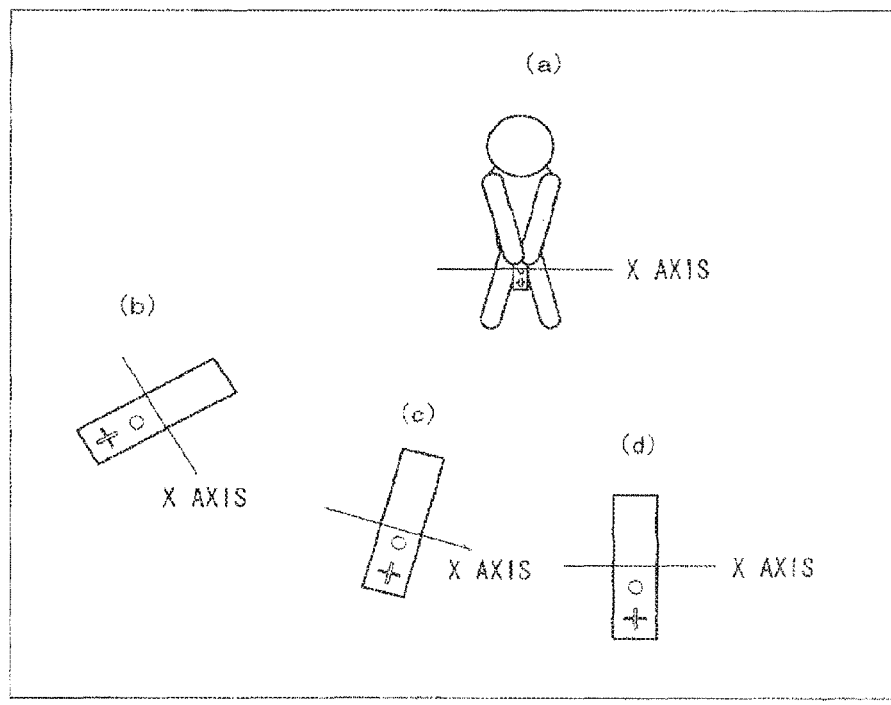
FIG. 31 is provided to explain how to calculate a re-holding posture accuracy St.

The element of the re-holding posture accuracy St represents the degree at which the input device 8 is lowered. This is represented by the closeness of the X axis of the input device 8 to a horizontal state. FIG. 31 shows the concept of the re-holding posture accuracy St. As shown in FIG. 31(*a*), in a state where the front surface of the input device 8 is directed downward, the X axis in the local coordinate system of the input device 8 is in the horizontal state (see FIG. 31(*d*)). This state is set as an ideal re-holding posture. By checking whether or not the X axis of the input device 8 of the posture calculated at each point in time is horizontal (see FIGS. 31(*b*) and (*c*)), the re-holding posture accuracy St can be calculated. More specifically, an absolute value of the gravity direction component of the X axis is calculated and indicated by a value in the range of 0.0 to 1.0. The obtained value is the re-holding posture accuracy St.

Using the above-described elements, the holding posture possibility Ks is calculated by the following expression.

$$Ks = Sw \times Sa \times St \qquad \text{expression 8}$$

Once the necessity degree Kr and the holding posture possibility Ks are calculated as described above, count-up is performed by the guide display counter C based on Kr and Ks using the following expression.

$$C = C + Kr \times Ks \qquad \text{expression 9}$$

When the value of the guide display counter C exceeds 30, the above-described processing of displaying the re-hold guide 105 shown in FIG. 12 is executed. Owing to this, the re-hold guide 105 is displayed after measuring the timing at which the "re-hold" is necessary and effective. Thus, the re-hold operation by the player is expected to be performed at a more appropriate timing.

Figure 32:
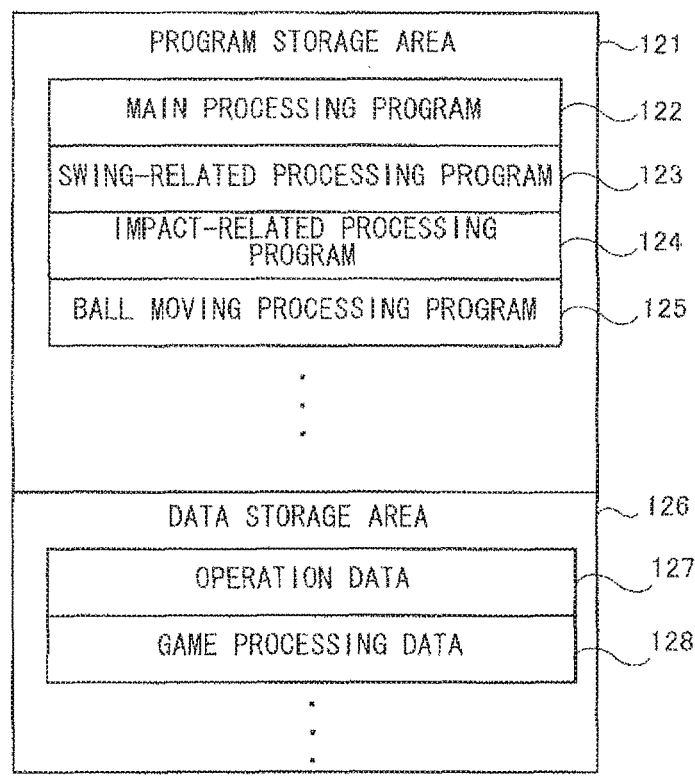
FIG. 32 shows a memory map of an external memory 12 of the game apparatus 3.

Now, game processing executed by the main body of the game apparatus 3 will be described in detail. First, data to be stored on the external main memory 12 for executing the game processing will be described. FIG. 32 shows a memory map of the external main memory 12 of the game apparatus 3. As shown in FIG. 32, the external main memory 12 includes a program storage area 121 and a data storage area 126. Data stored in the optical disc 4 is transferred to, and stored in, the program storage area 121 and the data storage area 126 of the external main memory 12 for executing the game program.

The program storage area 121 stores the game program to be executed by the CPU 10. The game program includes a main processing program 122, a swing-related processing program 123, an impact-related processing program 124, a ball moving processing program 125, and the like. The main processing program 122 corresponds to the processing in a flowchart in FIG. 35 through FIG. 37 described later. The swing-related processing program 123 causes the CPU 10 to execute various types of processing relating to the swing motion made by the player. The impact-related processing program 124 causes the CPU 10 to execute, for example, processing for determining whether or not an impact has been generated. The ball moving processing program 125 causes the CPU 10 to execute processing for moving the struck ball.

The data storage area 126 stores data such as operation data 127, game processing data 128 and the like, as well as various flags and variables temporarily used during the game processing.

The operation data 127 is sent from the controller 5 to the game apparatus 3. As described above, the operation data is sent from the controller 5 to the game apparatus 3 at a rate of once in 1/200 seconds. Therefore, the operation data 127 stored on the external main memory 12 is updated at this rate. In this embodiment, the external main memory 12 only needs to store the latest operation data (data obtained at the most recent time).

Figure 33:
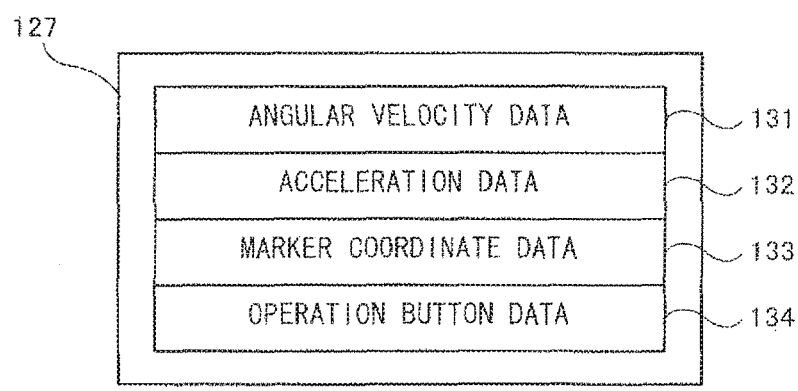
FIG. 33 shows an example of a data structure of operation data 127 shown in FIG. 32.

As shown in FIG. 33, the operation data 127 includes angular velocity data 131, acceleration data 132, marker coordinate data 133, and operation button data 134. The angular velocity data 131 represents an angular velocity detected by the gyrosensors 55 and 56 of the gyrosensor unit 7. Herein, the angular velocity data 131 represents an angular velocity around each of the three axes of X, Y and Z shown in FIG. 3. The acceleration data 132 represents an acceleration (acceleration vector) detected by the acceleration sensor 37. Herein, the acceleration data 132 represents a three-dimensional acceleration vector having, as a component, an acceleration in each of the three axes of X, Y and Z shown in FIG. 3. In this embodiment, the magnitude of the acceleration vector which is detected by the acceleration sensor 37 in the state where the controller 5 is still is "1". Namely, the magnitude of the gravitational acceleration which is detected by the acceleration sensor 37 is "1".

The marker coordinate data 133 represents a coordinate calculated by the image processing circuit 41 of the imaging information calculation section 35, namely, the above-described marker coordinate. The marker coordinate is represented by a two-dimensional coordinate system which indicates a position on a plane corresponding to the taken image. In the case where the imaging element 40 takes an image of two markers 6R and 6L, two marker coordinates are calculated. By contrast, in the case where only one of the markers 6R and 6L is present in the range which can be imaged by the imaging element 40, an image of only one marker is taken by the imaging element 40 and thus only one marker coordinate is calculated. In the case where neither the marker 6R nor 6L is present in the range which can be imaged by the imaging element 40, no image of the marker is taken by the imaging element 40 and thus no marker coordinate is calculated. Therefore, the marker coordinate data 133 may represent two marker coordinates, one marker coordinate or absence of marker coordinate.

The operation button data 134 represents an input state of each of the operation buttons 32a through 32i.

As shown in FIG. 34, the game processing data 128 includes input device posture data 141, reference plane data 142, reference X angle data 143, virtual reference plane data 144, current X angle data 145, twisting angle data 146, swing-up amount data 147, {L} coordinate system data 148, vector D data 149, first candidate plane data 150, second candidate plane data 151, immediately previous swing-up angle data 152, immediately previous follow-up angle data 153, immediately previous bending angle data 154, a guide display counter 155, struck ball power data 156, backspin ratio data 157, struck ball parameters 158, current state data 159, image data 160, a shot flag 161, an in-flight flag 162, a backspin flag 163, a termination flag 164 and the like.

The input device posture data 141 represents a posture of the input device 8. In this embodiment, the posture of the input device 8 is represented by a set of three vectors perpendicular to one another (i.e., X axis, Y axis, and Z axis). In this embodiment, when the power is turned on or the game processing is started, the posture of the input device 8 in a world coordinate system (i.e., posture as seen in the local coordinate system of the input device 8) is set as X axis=(1,0,0), Y axis=(0,1,0) and Z axis=(0,0,1) as an initial value. After the game processing is started, the posture represented by the input device posture data 141 is calculated as a posture with respect to the world coordinate system based on the value obtained from the gyrosensor unit 7.

The reference plane data 142 and the reference X angle data 143 respectively represent the reference plane and the reference X angle described above. In this embodiment, data representing various planes is stored as angle data of a rotation around the gravity direction as the axis. Since the various planes include (are parallel to) the gravity direction, the angle data is stored in order to define the respective planes. In addition, although being redundant, one axis of horizontal vector (vertical to the gravity direction) included in the plane may be stored as the data. Such data is easy to use in the processing described later. Alternatively, three-axis vector data, including the one axis of horizontal vector as well as one axis of vector in the upward gravity direction and one axis of vector in the direction of normal to the plane, may be stored.

The virtual reference plane data 144 and the current X angle data 145 respectively represent the virtual reference plane and the current X angle used for, for example, calculating the twisting angle described above. The twisting angle data 146 represents the calculated twisting angle.

The swing-up amount data 147 corresponds to the swing-up amount H described above. The {L} coordinate system data 148 represents the {L} coordinate system (see FIG. 29) described above. The vector D data 149 represents the vector D shown in FIG. 29.

The first candidate plane data 150 and the second candidate plane data 151 respectively represent the first candidate plane and the second candidate plane used for calculating the reference plane described above.

The immediately previous swing-up angle data 152, the immediately previous follow-up angle data 153, and the immediately previous bending angle data 154 are used for, for example, determining whether or not an impact has been generated. Such data represents a value of the swing-up angle or the respective element calculated in the immediately previous loop.

The guide display counter 155 is provided for measuring a timing for displaying the re-hold guide 105 shown in FIG. 12.

The struck ball power data 156 represents the power of the struck ball (data corresponding to the struck ball power P described above). The backspin ratio data 157 represents the backspin ratio described above. The struck ball parameters 158 are various parameters used for moving the struck ball, which include an orbit (trajectory) on which the struck ball moves, the moving velocity and the like.

The current state data 159 includes data regarding the environments around the player object in the virtual game space, such as the type of the golf club currently selected, the current location (e.g., fairway or rough), the direction and strength of the wind, and the like.

The image data 160 includes data on various types of images to be displayed as game images. The image of the re-hold guide 105 is included in the image data 160.

The shot flag 161 is used to determine whether or not the A button 32d is pressed at the time of the swing, namely, whether or not the swing made by the player is a practice swing. When the A button 32d is pressed, the shot flag 161 is set to be on.

The in-flight flag 162 is used to determine whether the current state is before or after an impact is generated (before or after the ball is hit). The in-flight flag 162 is set to be off before the impact is generated, and is set to be on after the impact is generated.

The backspin flag 163 indicates whether or not it is necessary to execute the processing of calculating the backspin ratio. The backspin flag 163 is set to be on at the time when an impact is generated, and is set to be off when the calculation of the backspin ratio is finished (because, in this embodiment, the processing of calculating the backspin ratio is executed after an impact is generated and before the struck ball makes a landing).

The termination flag 164 indicates whether or not the processing corresponding to one shot has been terminated.

Figure 35:
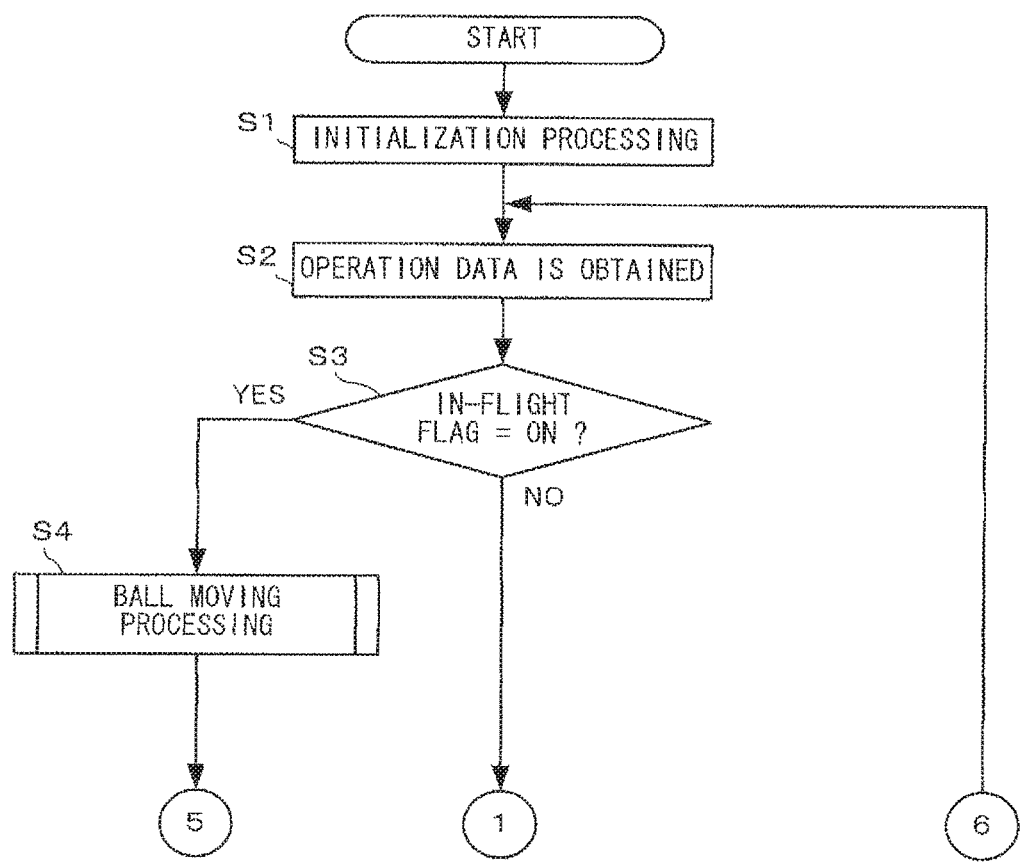
FIG. 35 is a flowchart showing game processing according to an embodiment of the present invention.
Figure 36:
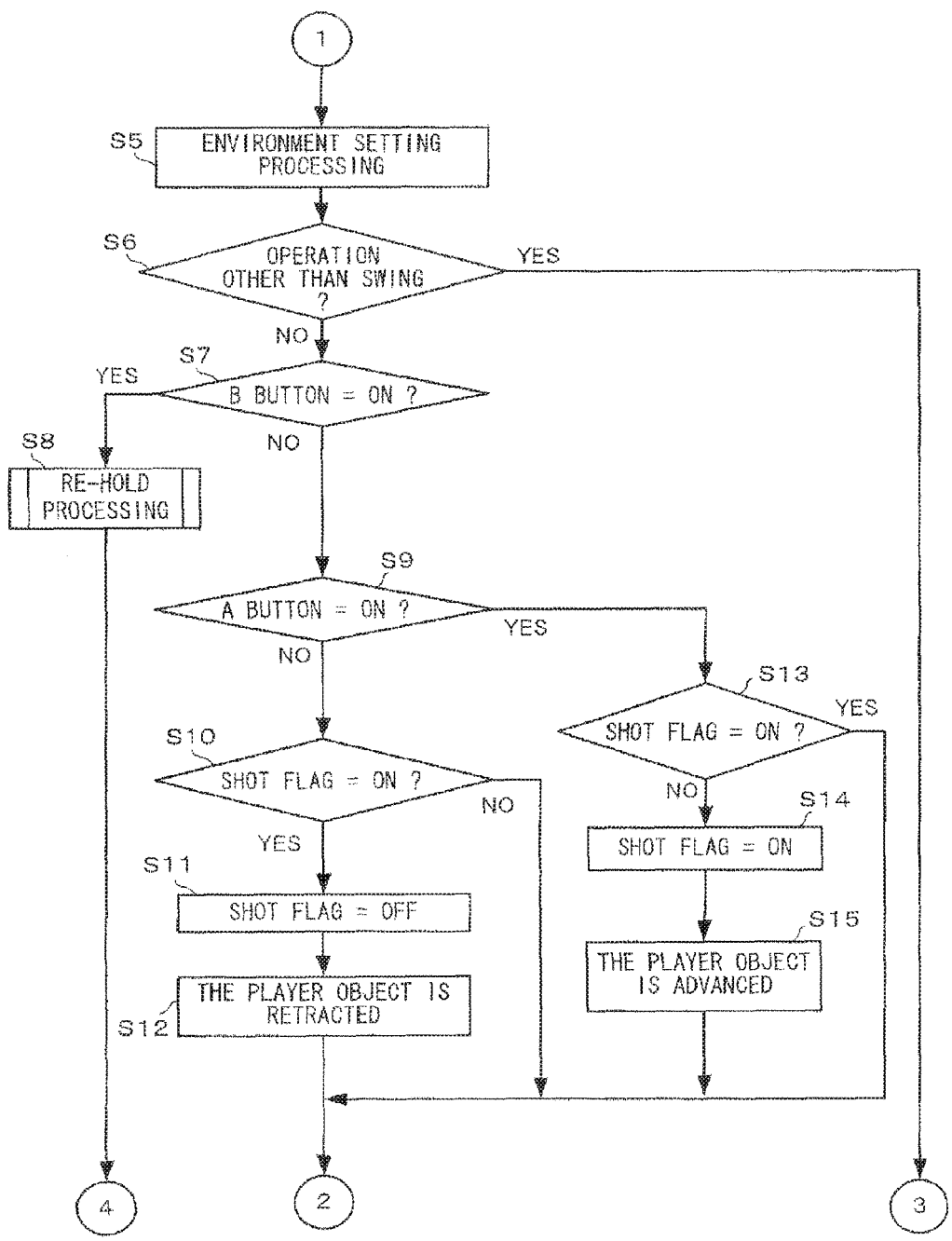
FIG. 36 is a flowchart showing the game processing according to the embodiment of the present invention.
Figure 37:
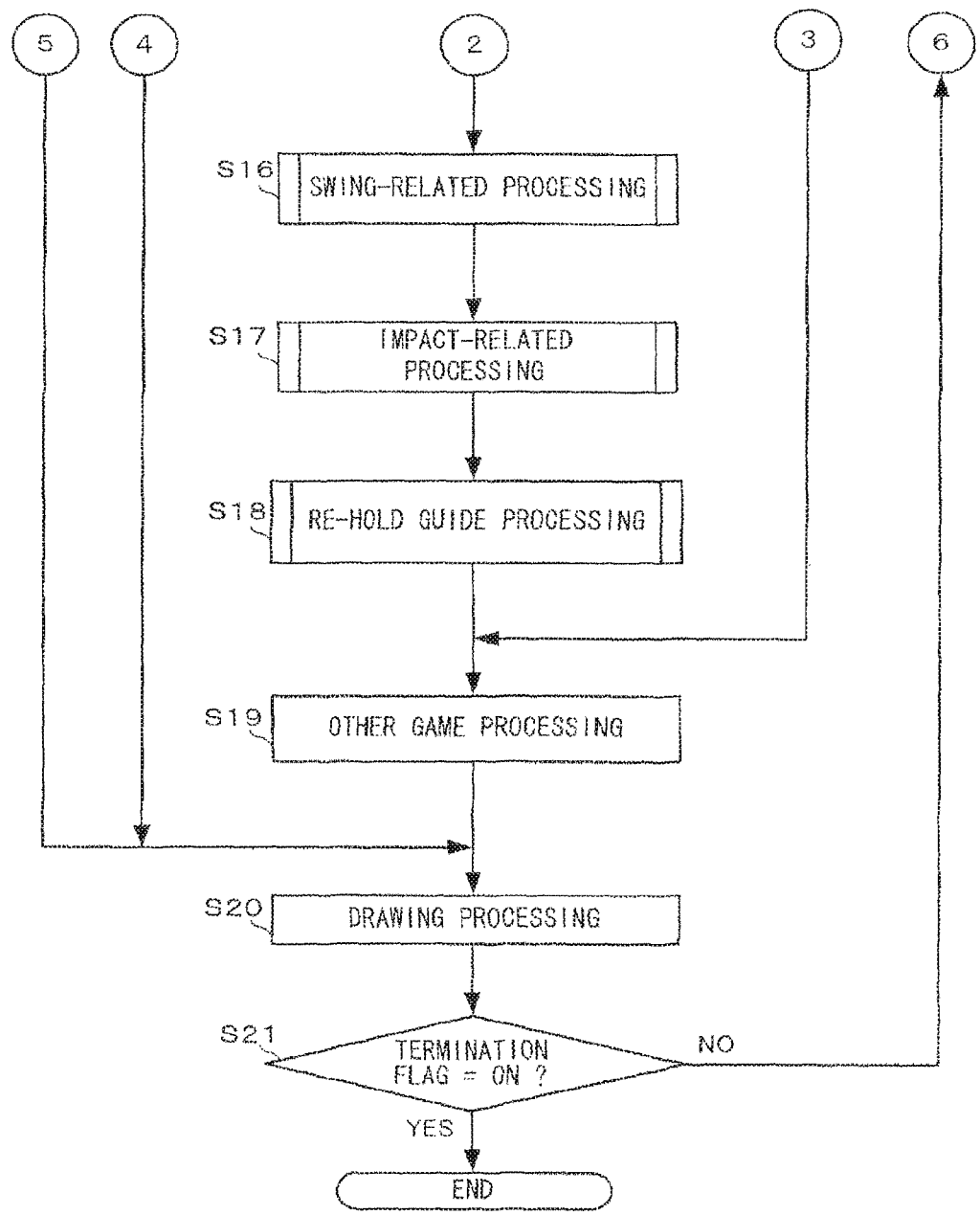
FIG. 37 is a flowchart showing the game processing according to the embodiment of the present invention.

Now, with reference to FIG. 35 through FIG. 53, the game processing executed by the game apparatus 3 will be described. When the power of the game apparatus 3 is turned on, the CPU 10 of the game apparatus 3 executes a starting program stored on the ROM/RTC 13 to initialize various units including the external main memory 12. The game program stored on the optical disc 4 is read onto the external main memory 12, and the CPU 10 starts the execution of the game program. The flowchart in FIG. 35 through FIG. 37 shows the game processing corresponding to one shot in the golf game. For the motion of each shot made by the player, the processing shown in the flowchart in FIG. 35 through FIG. 37 is executed. The processing loop of steps S1 through S21 shown in FIG. 35 through FIG. 37 is performed repeatedly for each frame.

As shown in FIG. 35, the CPU 10 first executes initialization processing (step S1). This processing initializes various flags and variables.

Next, the CPU 10 obtains the operation data 127 (step S2). Then, the CPU 10 determines whether the in-flight flag 162 is on or not (step S3). The in-flight flag 162 indicates whether the current state is before or after the impact. When it is determined that the in-flight flag 162 is on, namely, when the current state is after the impact (YES in step S3), the CPU 10 advances to step S4. The processing after this will be described later.

By contrast, when the in-flight flag 162 is off (NO in step S3), the current state is before the club impacts the ball 103. Therefore, the CPU 10 executes environment setting processing (step S5 in FIG. 36). This processing sets shot-related environments. For example, it is determined whether the current position of the player object 101 is in the fairway/rough or in the bunker; and the upper limit of the struck ball power is set, or the outgoing direction of the ball is changed in accordance with the topography or the like. Data representing the particulars set by this processing is stored on the external main memory 12 as the current state data 159. This processing is not directly related to the essence of the present invention and will not be described in detail.

Next, the CPU 10 determines whether or not the operation particular represented by the operation data 127 obtained in step S2 is regarding an operation other than the swing operation (step S6). An operation other than the swing operation is an operation not related to the essence of the present invention, for example, an operation of selecting the golf club or an operation of changing the direction of the shot (changing the direction of the virtual camera). When the operation of selecting the golf club is performed, data representing the type of the selected golf club (driver, iron, etc.) is stored on the external main memory 12 as a part of the current state data 159.

When it is determined that an operation other than the swing operation has been performed (YES in step S6), the CPU 10 advances to step S19 described later. By contrast, when the operation is not other than the swing operation (NO in step S6), the CPU determines whether or not the operation particular represented by the operation data 127 is that the B button 32i is pressed (step S7). When it is determined that the B button 32i has been pressed (YES in step S7), the CPU 10 executes re-hold processing (step S8). The re-hold processing, for example, calculates the reference plane described above.

Figure 38:
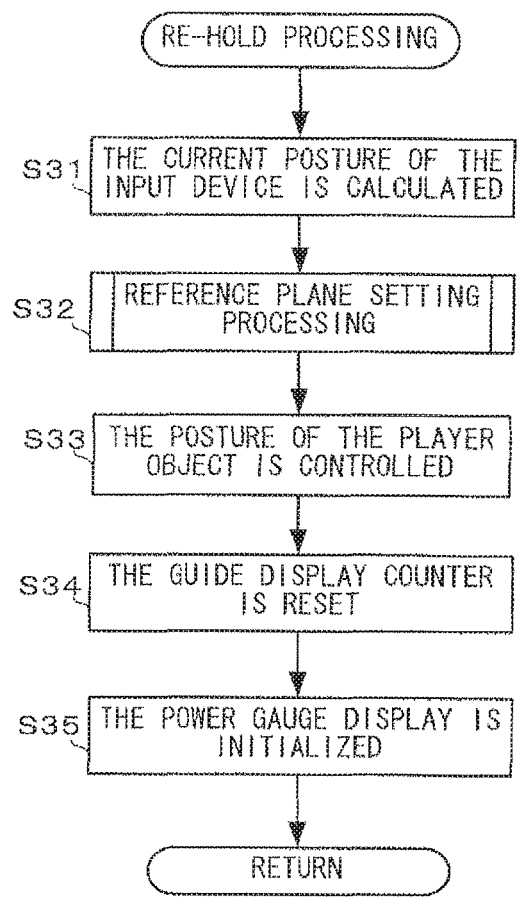
FIG. 38 is a flowchart showing the details of re-hold processing shown in step S8 in FIG. 36.

FIG. 38 is a flowchart showing the details of the re-hold processing shown in step S8. As shown in FIG. 38, the CPU 10 first executes processing of calculating the posture of the input device 8 based on the acceleration data 132 and the angular velocity data 131 included in the operation data 127 (step S31). This processing, which may be executed in any method, is executed as follows in this embodiment. As described above, first, the posture of the input device 8 is calculated based on the angular velocity detected by the gyrosensor unit 7. The posture can be calculated from the angular velocity by, for example, successively adding the angular velocity (per unit time) to the initial posture. Namely, starting from the initial state, the posture calculated immediately previously is successively changed and thus updated based on the angular velocity successively output from the gyrosensor unit 7. In this manner, the current posture can be calculated. Next, the posture calculated from the angular velocity is corrected based on the acceleration data detected by the acceleration sensor 37. According to the correction in this embodiment, the posture calculated from the angular velocity is made closer to the posture determined by the acceleration data. The next time the posture is updated based on the angular velocity, the angular velocity is added to the corrected posture. The posture determined by the acceleration data is, specifically, the posture of the input device 8 with an assumption that the direction of the acceleration represented by the acceleration data is vertically downward; namely, the posture calculated with an assumption that the acceleration represented by the acceleration data is a gravitational acceleration. The posture determined by the acceleration, by nature, is correct when the sensor is in a still state but has an error when the sensor is moving. By contrast, the posture calculated by a gyrosensor, by nature, has error accumulated along with time where the sensor output has errors. Accordingly, by updating the posture with constant corrections, a posture with little error is calculated. The posture thus corrected is stored on the external main memory 12 as the input device posture data 141 (hereinafter, this posture will be referred to as the "current posture"). In the case where the acceleration data is not to be reflected on the posture of the input device 8, an accumulation result of the angular velocities may be added to the initial posture.

Figure 39:
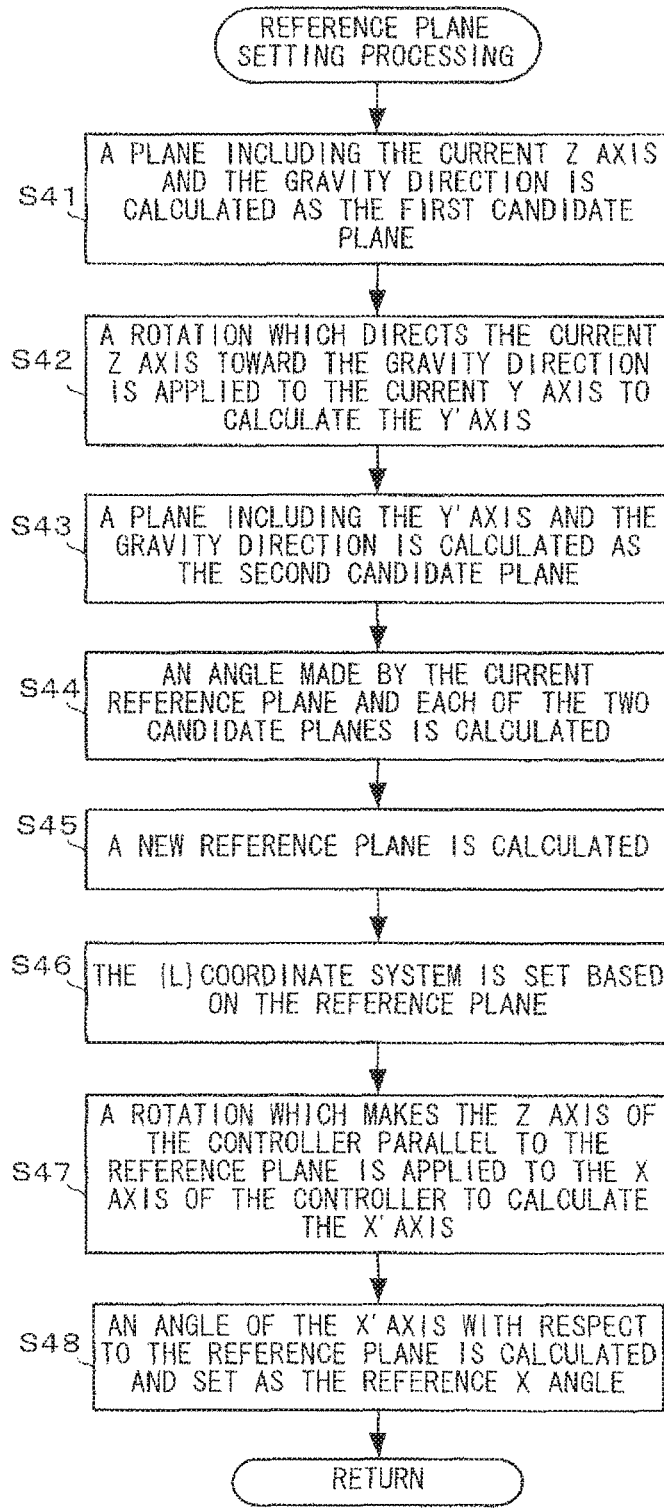
FIG. 39 is a flowchart showing the details of reference plane setting processing shown in step S32 in FIG. 38.

Next, the CPU 10 executes the reference plane setting processing (step S32). FIG. 39 is a flowchart showing the details of the reference plane setting processing. As shown in FIG. 39, the CPU 10 first calculates a plane, including the current Z-axis direction of the input device 8 in the local coordinate system (hereinafter, the Z axis in the local coordinate system will be referred to as the "local Z axis") and the gravity direction, as the first candidate plane, and stores the first candidate plane on the external main memory 12 as the first candidate plane data 150 (step S41).

Next, the CPU 10 calculates a rotation matrix which directs the local Z axis at the current posture toward the gravity direction. The CPU 10 applies the calculated rotation matrix to the current Y axis of the input device 8 in the local coordinate system (hereinafter, the Y axis in the local coordinate system will be referred to as the "local Y axis") to calculate the Y' axis (step S42).

Next, the CPU 10 calculates a plane including the Y' axis and the gravity direction as the second candidate plane, and stores the second candidate plane on the external main memory 12 as the second candidate plane data 151 (step S43).

Next, the CPU 10 calculates an angle made by the current reference plane (the reference plane most recently calculated) and the first candidate plane and an angle made by the current reference plane and the second candidate plane (θA and θB in FIG. 23) (step S44). Based on the angles, the CPU 10 calculates a new reference plane using expression 1 (or expression 1' or 2) and stores the obtained new reference plane on the external main memory 12 as the reference plane data 142 (step S45).

When this processing is first executed after the game processing is started, the reference plane has not been calculated. Therefore, only when this processing is first executed, the reference plane is calculated as follows. The CPU 10 calculates a plane which equally divides the angle made by the first candidate plane and the second candidate plane (θA+θB) into two (i.e., averages the two angles), and sets this plane as a new reference plane.

When this processing is first executed, the reference plane may be calculated by the following method, alternatively. An angle between the Z-axis direction and the gravity direction is set as a weight to be applied on the first candidate plane, and an angle between the Y'-axis direction and the gravity direction is set as a weight to be applied on the second candidate plane. A new reference plane may be calculated by obtaining a weighted average of the first candidate plane and the second candidate plane.

Next, based on the (new) reference plane, the CPU 10 sets the {L} coordinate system (see FIG. 29) described above (step S46).

Figure 40:
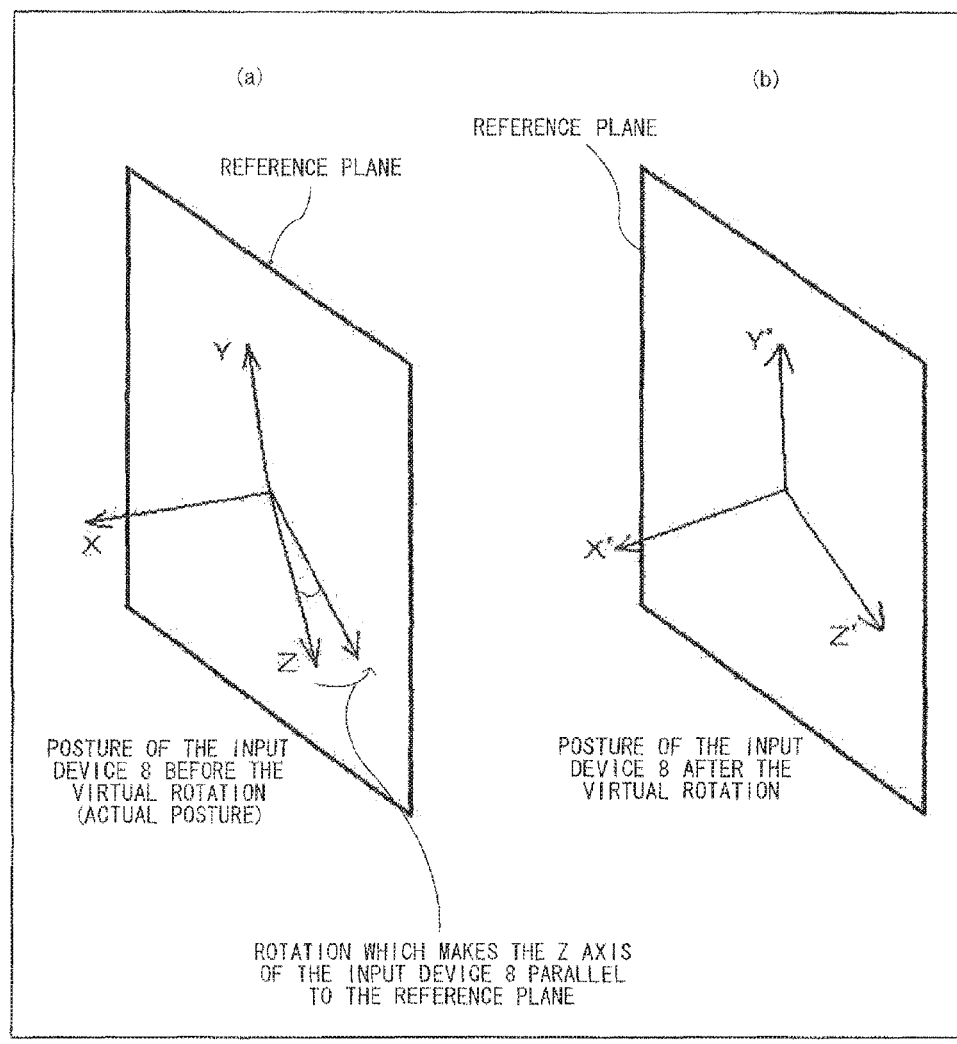
FIG. 40 is provided to explain an overview of processing in step S47 in FIG. 39.

Next, the CPU 10 applies a virtual rotation which makes the local Z axis parallel to the reference plane to the current X axis of the input device 8 (hereinafter, referred to as the "local X axis") to calculate the X' axis (step S47). FIG. 40 shows an overview of this processing. FIG. 40(*a*) shows the actual posture of the input device 8, and FIG. 40(*b*) shows a virtual posture of the input device 8 obtained by applying the above-described rotation.

Next, the CPU 10 calculates an angle of the X' axis with respect to the reference plane, and stores the obtained angle on the external main memory 12 as the reference X angle data 143 (step S48). Thus, the reference plane setting processing is finished.

Returning to FIG. 38, after the reference plane setting processing, the CPU 10 executes, for example, posture control on the player object 101 (step S33). Namely, based on the current posture calculated above, the CPU 10 moves the position of the golf club 102 or the like or causes the player object 101 to make a re-hold operation (e.g., causes the player object 101 to behave like re-gripping the golf club).

Next, the CPU 10 resets the guide display counter 155 used for displaying the re-hold guide 105 (see FIG. 12) (step S34).

Next, the CPU 10 initializes the display particulars of the power gauge 104 (step S35). Specifically, the CPU 10 makes the power gauge 104 straight as shown in FIG. 8 or FIG. 12 and sets the position of the swing bar 106 at the bottom of the power gauge 104. Thus, the re-hold processing is finished.

Returning to FIG. 36, after the re-hold processing, the CPU 10 executes drawing processing (step S20 in FIG. 37). Namely, the CPU 10 displays an image of the virtual game space taken by the virtual camera on the TV 2 as a game image. After step S20, the CPU 10 determines whether or not the game is to be terminated based on whether the termination flag 164 is on or not (step S21). When YES, the CPU 10 terminates the game; whereas when NO, the CPU 10 returns to step S2 to repeat the game processing.

Next, processing executed when it is determined in step S7 that the B button 32*i* has not been pressed (NO in step S7) will be described. In this case, the CPU 10 determines whether or not the operation particular of the operation data is that the A button is pressed, namely, whether or not the A button 32*d* has been pressed (step S9).

When it is determined that the A button 32*d* has been pressed (YES in step S9), the CPU 10 executes setting processing for treating the swing made by the player as a "shot" motion of hitting the ball, not as a "practice swing", as follows. The CPU 10 first determines whether the shot flag 161 is on or not (step S13). When it is determined that the shot flag 161 is not on (NO in step S13), it is considered that the current state is immediately after the A button 32*d* is pressed. Therefore, the CPU 10 sets the shot flag 161 to be on (step S14). Then, the CPU 10 controls the player object 101 to advance toward the position of the ball 103 (to approach the ball 103) (controls the state in FIG. 8 into the state in FIG. 10) (step S15). Then, the CPU 10 advances to step S16 (FIG. 37) described later.

By contrast, when it is determined in step S3 that the shot flag 16 is set to be on (YES in step S13), it is considered that the A button 32*d* has been continuously pressed. Therefore, the CPU 10 advances to step S16.

When it is determined in step S9 that the A button has not been pressed (NO in step S9), the CPU 10 executes setting processing for treating the swing made by the player as a "practice swing", as follows. The CPU 10 first determines whether the shot flag 161 is on or not (step S10). When it is determined that the shot flag 161 is on (YES in step S10), it is considered that the current state is immediately after the A button 32*d* is released after being pressed continuously. Therefore, the CPU 10 sets the shot flag 161 to be off (step S11). Then, the CPU 10 controls the player object 101 to retract from the position of the ball 103 (controls the state in FIG. 10 back to the state in FIG. 8) (step S12). Then, the CPU 10 advances to step S16.

By contrast, when it is determined in step S10 that the shot flag 161 is off (NO in step S10), the CPU 10 advances to step S16 without executing the processing in step S11 and S12.

Figure 41:
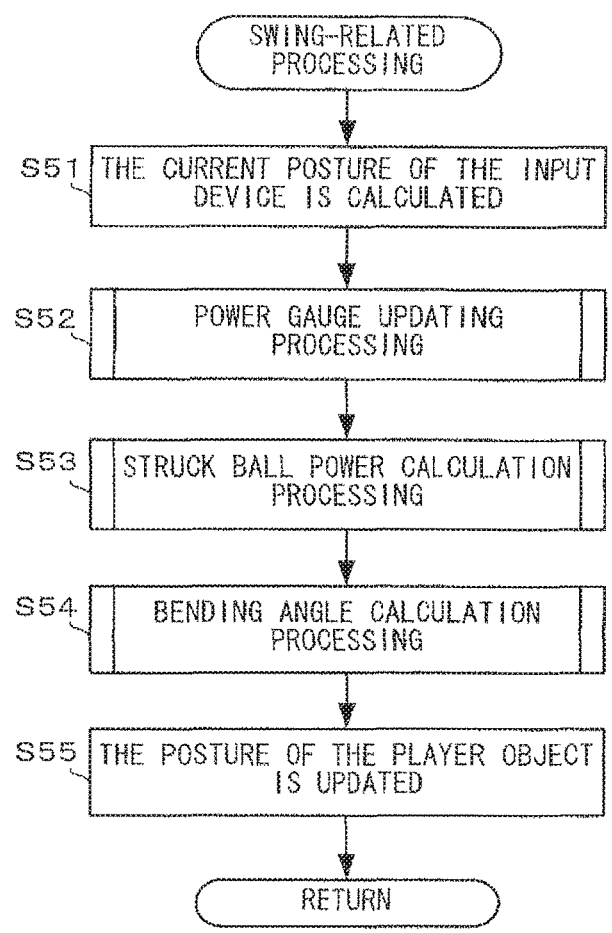
FIG. 41 is a flowchart showing the details of swing-related processing shown in step S16 in FIG. 37.

Next, the CPU 10 executes swing-related processing (step S16 in FIG. 37). FIG. 41 is a flowchart showing the details of the swing-related processing. As shown in FIG. 41, the CPU 10 first calculates the current posture of the input device 8 based on the operation data 127 (step S51).

Next, the CPU 10 executes power gauge updating processing (step S52). This processing determines (updates) the display particulars of the power gauge 104 described above (corresponding to the (2) power gauge-related processing, an overview of which is described above).

Figure 42:
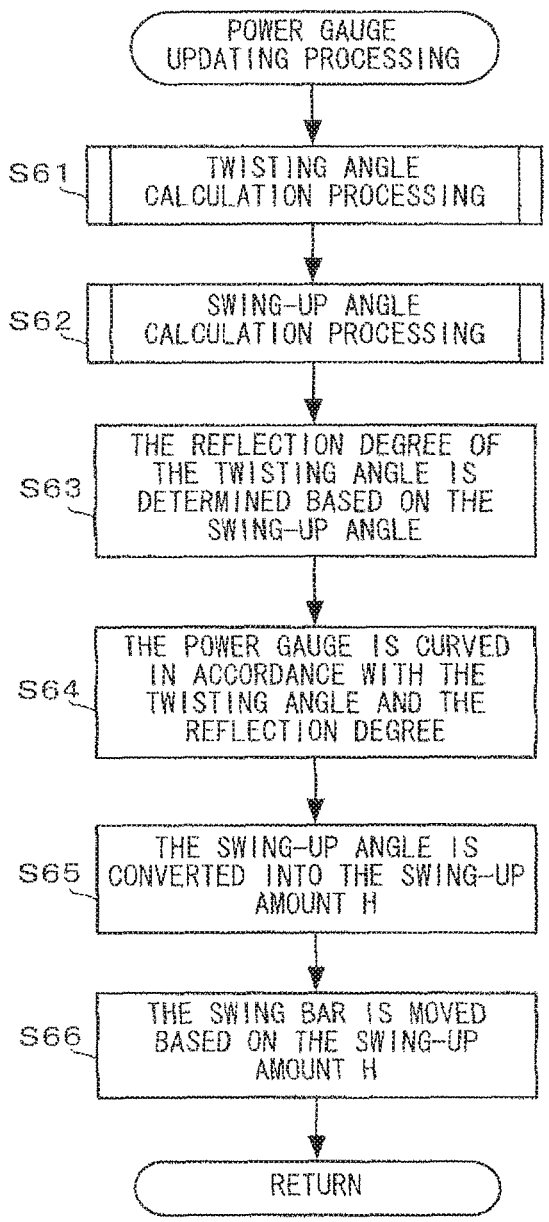
FIG. 42 is a flowchart showing the details of power gauge updating processing shown in step S52 in FIG. 41.
Figure 43:
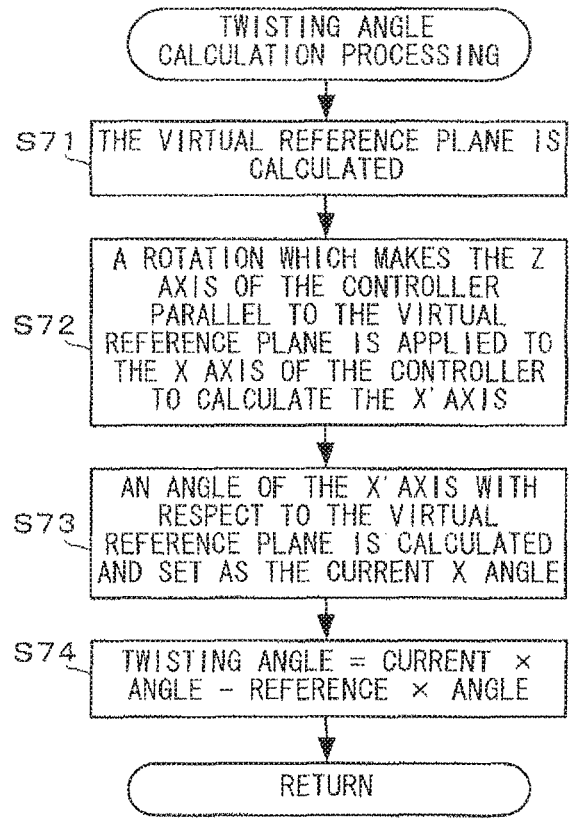
FIG. 43 is a flowchart showing the details of twisting angle calculation processing shown in step S61 in FIG. 42.

FIG. 42 is a flowchart showing the details of the power gauge updating processing. As shown in FIG. 42, the CPU 10 first executes twisting angle calculation processing (step S61). This processing obtains the twisting angle described above. FIG. 43 is flowchart showing the details of the twisting angle calculation processing. As shown in FIG. 43, the CPU 10 first generates a virtual reference plane based on the current posture of the input device 8 (step S71). Namely, the CPU 10 virtually generates the reference plane as described above with an assumption that the B button 32*i* has been just pressed. Hereinafter, such a reference plane will be referred to as the "virtual reference plane". The virtual reference plane is generated by the same processing as that in steps S41 through S45 described above with reference to FIG. 39. The generated plane is stored on the external main memory 12 as the virtual reference plane data 144.

Next, the CPU 10 applies a rotation which makes the local Z axis of the input device 8 parallel to the virtual reference plane to the local X axis to calculate a virtual X' axis (step S72). Then, the CPU 10 calculates an angle of the virtual X' axis with respect to the virtual reference plane, and stores the obtained angle on the external main memory 12 as the current X angle data 145 (step S73). The processing in steps S72 and S73 is substantially the same as the processing in steps S47 and S48 described above with reference to FIG. 39 except for being executed with respect to the virtual reference plane, and will not be described in detail.

Next, the CPU 10 calculates the twisting angle by the following expression and stores the obtained twisting angle on the external main memory 12 as the twisting angle data 146 (step S74).

Twisting angle=current $X$ angle−reference $X$ angle    expression 10

Thus, the twisting angle calculation processing is finished.

Figure 44:
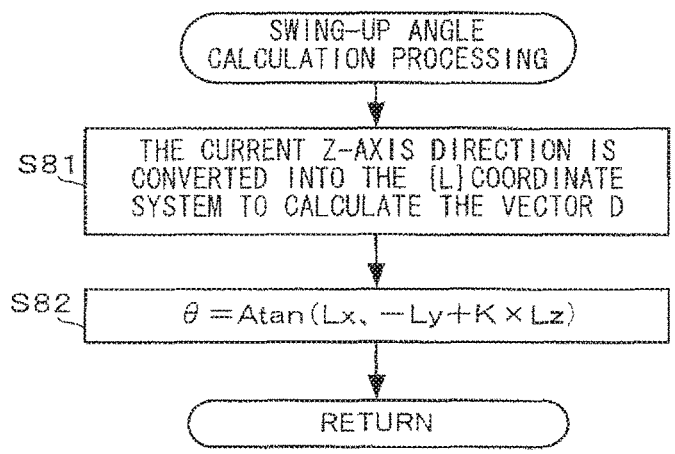
FIG. 44 is a flowchart showing the details of swing-up angle calculation processing shown in step S62 in FIG. 42.

Returning to FIG. 42, after the twisting angle calculation processing, the CPU 10 executes swing-up angle calculation processing (step S62). FIG. 44 is a flowchart showing the details of the swing-up angle calculation processing. As shown in FIG. 44, the CPU 10 first converts the local Z axis of the current posture of the input device 8 into the {L} coordinate system (FIG. 29 regarding the swing angle calculation) to calculate the vector D (step S81).

Next, the CPU 10 calculates the swing-up angle θ using expression 7 (θ=Atan (Dx, −Dy+K×Dz)) (step S82). As described above, the swing-up angle θ is 0° at the posture of the re-hold operation, has a positive value when the club is swung forward, and has a negative value when the club is swung up. Thus, the swing-up angle calculation processing is finished.

Returning to FIG. 42, after the swing-up angle θ is calculated, the CPU 10 executes processing of determining the degree at which the twisting angle is to be reflected on the curving of the power gauge 104 based on the absolute value of the swing-up angle θ (reflection degree) (step S63). According to this processing, as the swing-up angle is larger (as the club is swung more widely) the influence of the twisting angle is made smaller; whereas as the swing-up angle is smaller (as the head of the golf club 102 is closer to the ball 103), the influence of the twisting angle is made larger. Namely, where the twisting angle of the wrists is the same, when the club is swung widely, the power gauge 104 is not curved much; whereas when the head of the club is closer to the ball 103, the twisting angle is reflected on the curving of the power gauge 104 at a larger degree and the power gauge 104 is displayed as curving more. For example, where the reflection degree is in the range of 0.0 (low reflection degree) to 1.0 (high reflection degree), when the swing-up angle is 0°, the reflection degree is 1.0; whereas when the absolute value of the swing-up angle is 180°, the reflection degree is 0.0. Values between these angles are assigned so as to make a line graph (the values may be assigned so as to be nonlinear, needless to say).

Next, the CPU 10 curves the power gauge 104 based on the twisting angle and the reflection degree (step S64). For example, the CPU 10 executes the processing of converting a twisting angle in the range of −35° to +35° into a curving degree in the range of −1.0 to 1.0 using the function corresponding to the graph shown in FIG. 28. For the conversion, the reflection degree is used as the coefficient. For example, where the twisting angle is 10°, when the reflection degree is 1.0 (close to the address state), 10° is reflected as it is; whereas when the reflection degree is 0.5 (a state where the club is swung about half), a value obtained by multiplying 10° by 0.5 is calculated as the curving degree.

Next, the CPU 10 converts the swing-up angle θ into the swing-up amount H (step S65). Specifically, the CPU 10 converts the absolute value of the swing-up angle θ (−180° to)+180° into the swing-up amount H (0.0 to 1.0) using the function corresponding to the graph shown in FIG. 30.

Next, the CPU 10 moves the swing bar 106 based on the swing-up amount H (step S66). Thus, the power gauge updating processing is finished.

Figure 45:
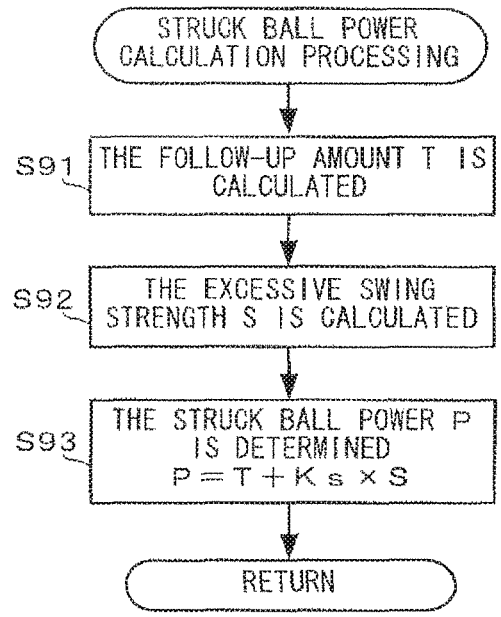
FIG. 45 is a flowchart showing the details of struck ball power calculation processing shown in step S53 in FIG. 41.

Returning to FIG. 41, after the power gauge updating processing, the CPU 10 executes struck ball power calculation processing (step S53). FIG. 45 is a flowchart showing the details of the struck ball power calculation processing. As shown in FIG. 45, the CPU 15 first sets the follow-up coefficient Kt and calculates the follow-up amount T using the follow-up coefficient Kt as described above in the section of the "swing-down motion reflection processing" (step S91).

Next, the CPU 10 calculates the excessive swing strength S described above (step S92). Namely, assuming that the acceleration is decreased by 80%, the CPU 10 executes substantially the same calculation as that for finding the follow-up amount T to calculate the excessive swing strength S.

Next, the CPU 10 calculates the struck ball power P using expression 4 and stores the obtained struck ball power P on the external main memory 12 as the struck ball power data 156 (step S93). Thus, the struck ball power calculation processing is finished.

Figure 46:
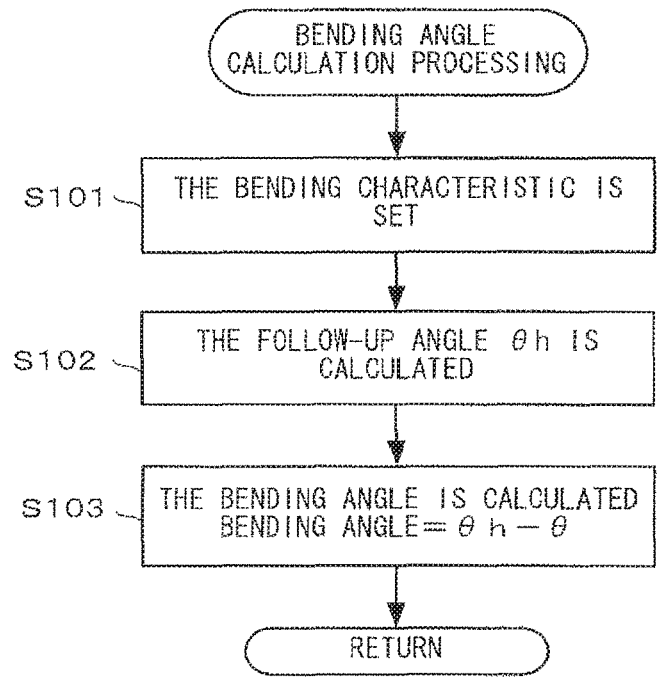
FIG. 46 is a flowchart showing the details of bending angle calculation processing shown in step S54 in FIG. 41.

Returning to FIG. 41, after the struck ball power calculation processing, the CPU 10 executes bending angle calculation processing (step S54). This processing calculates the bending angle of the head of the golf club 102, which is used for calculating the backspin ratio described above. FIG. 46 is a flowchart showing the details of the bending angle calculation processing. As shown in FIG. 46, the CPU 10 first sets a bending characteristic (step S101). Namely, the CPU 10 sets the variables Kp (spring) and Kd (damper) in accordance with the absolute value of the swing-up angle θ. Kp and Kd are set as follows. The absolute value |θ| of the swing-up angle is in the range of 0° to 180°. Kp is set by assigning values of 0.01 to 0.015 to values in the range of 0° to 90° in the above range (to the values exceeding 90°, Kp is uniformly 0.015). Kd is set by assigning values of 0.001 to 0.3 also to the values in the range of 0° to 90° (to the values exceeding 90°, Kd is uniformly 0.3). Owing to this, the club head can be provided with the bending characteristic of being likely to bend in the vicinity of the impact and being unlikely to bend far from the impact.

Next, the CPU 10 calculates acceleration A of the club head using expression 6, and also calculates the follow-up angle θh (see FIG. 25) (step S102).

Next, the CPU 10 calculates the bending angle φ using expression 5 (φ−θh−θ) (step S103). Thus, the bending angle calculation processing is finished.

Returning to FIG. 41, after the bending angle calculation processing, the CPU 10 updates the posture of the player object 101, the golf club 102 and the like based on the current posture of the input device 8 (step S55). Thus, the swing-related processing is finished.

Returning to FIG. 37, after the swing-related processing, the CPU 10 executes impact-related processing (S17). This processing determines whether or not an impact has been generated, and determines the parameters of the struck ball when the impact is generated.

Figure 47:
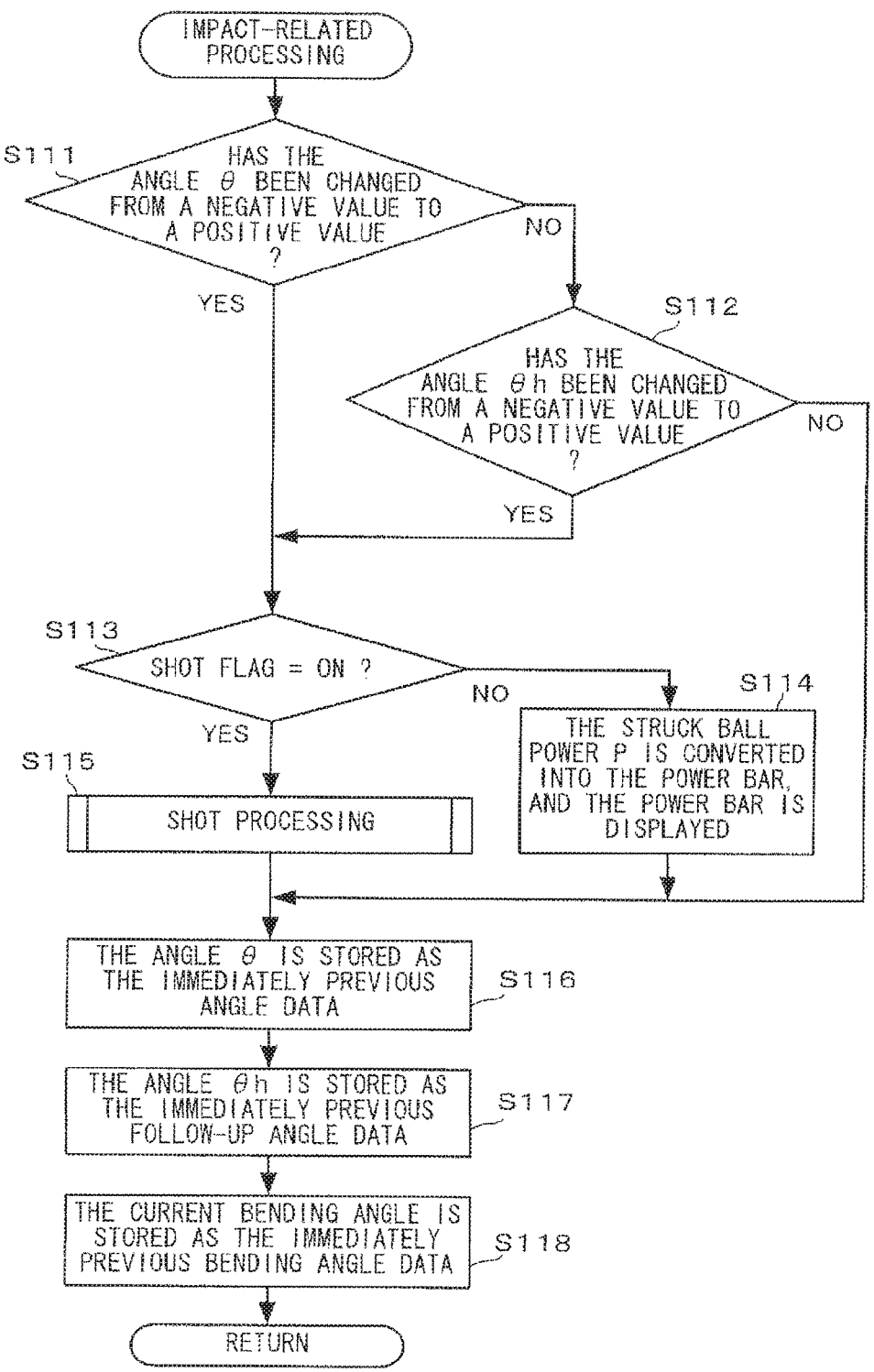
FIG. 47 is a flowchart showing the details of impact-related processing shown in step S17 in FIG. 37.

FIG. 47 is a flowchart showing the details of the impact-related processing. As shown in FIG. 47, the CPU 10 determines whether or not the golf club 102 has passed the reference plane (step S111). More specifically, the CPU 10 refers to the immediately previous swing-up angle data 152 to obtain the value of the swing-up angle θ calculated in the immediately previous frame (immediately previous processing loop). The CPU 10 compares the obtained value against the swing-up angle θ calculated by the processing in the current frame, and determines whether or not the value of the swing-up angle θ has changed from a negative value to a positive value to determine whether or not the golf club 102 has passed the reference plane. This determination is mainly made with an assumption that a normal swing has been made with no backspin motion.

When it is determined that the golf club 102 has passed the reference plane (YES in step S111), the CPU 10 advances to step S113 described later. By contrast, when it is determined that the golf club 102 has not passed the reference plane (NO in step S111), the CPU 10 determines whether or not the golf club 102 has passed the reference plane, in consideration of the bend of the head of the golf club 102 when the backspin motion is performed (step S112). When the backspin motion is performed, there may be a case where, although the player thinks he/she has impacted the ball, the determination made using the swing-up angle θ indicates that the golf club 102 almost hit, but did not hit, the ball 103 (did not pass the reference plane) and was stopped immediately before the ball 103 in the virtual game space. Assuming such a case, the CPU 10 determines whether or not the club head bent forward has passed the reference plane, namely, has impacted the ball 103, in consideration of the forward bend of the golf club 102, which is considered to be generated when the backspin motion is made. In order to make this determination, the CPU 10 determines whether or not the value of the follow-up angle θh has changed from a negative value to a positive value. When it is determined that the club head has passed the reference plane (YES in step S112), the CPU 10 advances to step S113. When it is determined that the club head has not passed the reference plane (NO in step S112), the CPU 10 advances to step S116.

Next, the CPU 10 determines whether the shot flag 161 is on or not (step S113). Namely, the CPU 10 determines whether or not the swing currently made is a "practice swing". When it is determined that the shot flag 161 is off (NO in step S113), the swing is the "practice swing". Therefore, the CPU 10 reads the struck ball power data 156, converts the struck ball power P into the power bar 107 (see FIG. 16, etc.) and displays the power bar 107 (step S114). In the case where the power gauge 104 is curved, the power bar 107 is also curved along with the shape of the power gauge 104.

Figure 48:
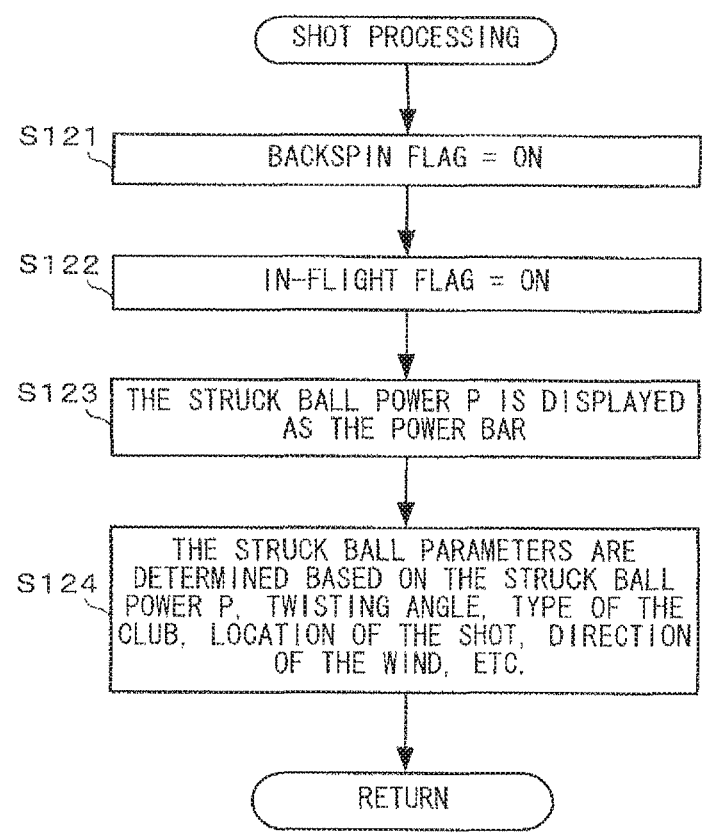
FIG. 48 is a flowchart showing the details of shot-related processing shown in step S115 in FIG. 47.

By contrast, it is determined in step S113 that the shot flag 161 is on (YES in step S113), the CPU 10 executes shot processing for causing the struck ball to fly (step S115). FIG. 48 is a flowchart showing the details of the shot processing.

As shown in FIG. 48, the CPU 10 first sets the backspin flag 163 to be on (step S121). The CPU 10 also sets the in-flight flag 162 to be on (step S122).

Next, the CPU 10 reads the struck ball power data 156, converts the struck ball power P into the power bar 107 and displays the power bar 107 (step S123). Then, the CPU 10 calculates the parameters of the struck ball such as the trajectory, the moving velocity and the like based on the struck ball power P, the twisting angle, and data obtained by referring to the current state data 159, for example, the type of the golf club currently selected, the location of the shot (fairway, rough, etc.), and the direction of the wind (step S124). The calculated parameters are stored on the external main memory 12 as the struck ball parameters 158. Thus, the shot processing is finished.

Returning to FIG. 47, after the shot processing, the CPU 10 stores the swing-up angle θ on the external main memory 12 as the immediately previous swing-up angle data 152 (step S116). Also, the CPU 10 stores the follow-up angle θh on the external main memory 12 as the immediately previous follow-up angle data 153 (step S117). The CPU 10 stores the bending angle calculated in the swing-related processing on the external main memory 12 as the bending angle data 154 (step S118). Thus, the impact-related processing is finished.

Returning to FIG. 37, after the impact-related processing, the CPU 10 executes the re-hold guide processing (step S18). This processing measures the display timing of the re-hold guide 105 shown in FIG. 12 and displays the guide message (corresponding to the (3) guide message display-related processing, an overview of which is described above).

Figure 49:
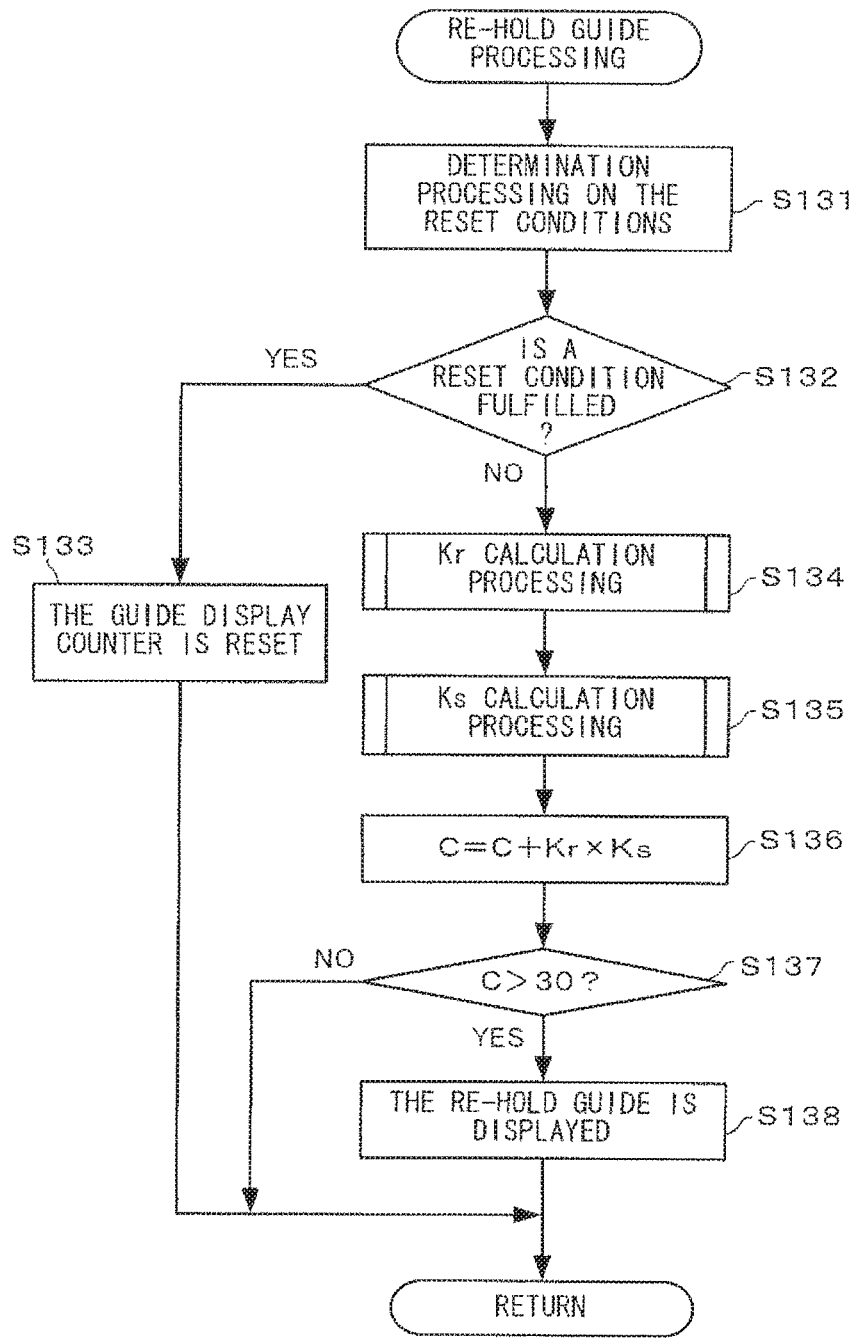
FIG. 49 is a flowchart showing the details of re-hold guide processing shown in step S18 in FIG. 37.

FIG. 49 is a flowchart showing the details of the re-hold guide processing. As shown in FIG. 49, the CPU 10 first determines whether or not conditions for resetting the guide display counter 155 are fulfilled (step S131). Such conditions are that the posture of the input device 8 is significantly different from the posture expected for the "re-hold" (the posture is close to the address posture), and that the state is during a swing (whether or not the B button 31i has been pressed is determined by the processing in step S34 in FIG. 38).

More specifically, the CPU 10 determines whether or not the following three conditions are fulfilled.

(1) The local Z axis of the input device 8 is above the horizontal direction and the local Y axis of the input device 8 is below the horizontal direction (for example, like the posture of holding a baseball bat).

(2) The absolute value of the angular velocity is greater than 30 deg/sec.

(3) The absolute value of the acceleration is greater than 0.2 G.

Next, the CPU 10 determines whether or not at least one of the three conditions is fulfilled (step S132). When it is determined that at least one of the three conditions is fulfilled (YES in step S132), the CPU 10 considers that the reset condition is fulfilled and resets the guide display counter 155 (step S133). Thus, the re-hold guide processing is finished.

Figure 50:
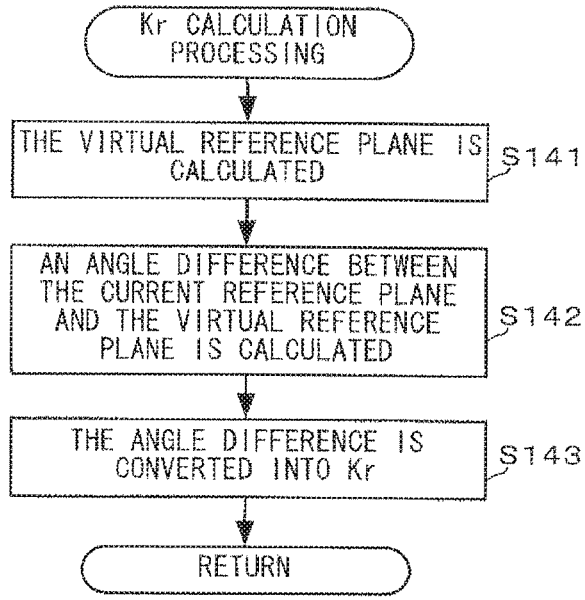
FIG. 50 is a flowchart showing the details of Kr calculation processing shown in step S134 in FIG. 49.

By contrast, when it is determined that none of the three conditions is fulfilled (NO in step S132), the CPU 10 executes processing for counting up the guide display counter 155. Specifically, the CPU 10 executes necessity degree Kr calculation processing for the re-hold operation (step S134). FIG. 50 is a flowchart showing the details of the necessity degree Kr calculation processing. As shown in FIG. 50, the CPU 10 first calculates the above-described virtual reference plane and stores the obtained virtual reference plane on the external main memory 12 (step S141). This processing is substantially the same as that executed in step S71 in FIG. 43.

Next, the CPU 10 calculates an absolute value of the angle made by the current reference plane and the virtual reference plane (angle made by the surface normals thereof) (step S142).

Next, the CPU 10 converts the angle calculated in step S142 into the necessity degree Kr (step S143). Specifically, it is defined that when the angle is 11° or greater, the re-hold operation is necessary; whereas when the angle is 0°, the re-hold operation is not necessary. An angle in the range of 0° to 11° is converted into a value in the range of 0.0 to 1.0 and set as the necessity degree Kr. Thus, the necessity degree Kr calculation processing is finished.

Figure 51:
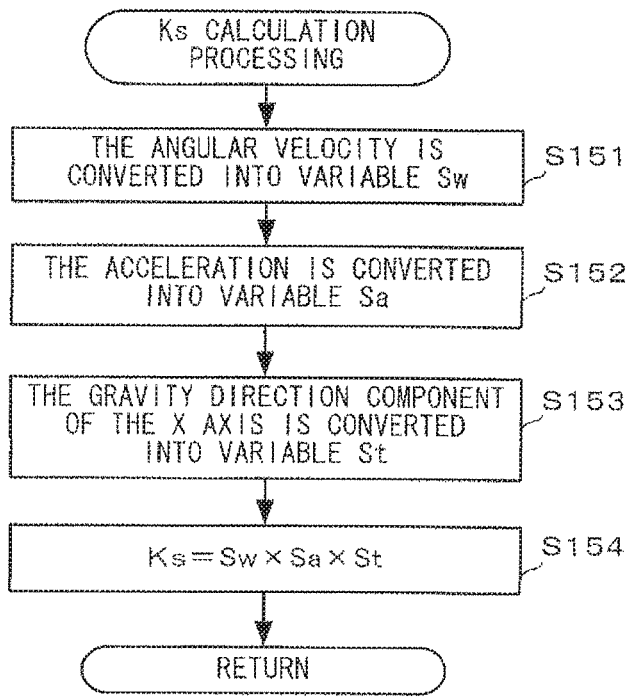
FIG. 51 is a flowchart showing the details of Ks calculation processing shown in step S135 in FIG. 49.

Returning to FIG. 49, the CPU 10 executes holding posture possibility Ks calculation processing (step S135). FIG. 51 is a flowchart showing the details of the holding posture possibility Ks calculation processing. As shown in FIG. 51, the CPU 10 converts the current angular velocity into variable Sw which represents a stable state of the angular velocity based on an angular velocity data included in the operation data 127 (step S151). Specifically, the CPU 10 converts the absolute value of the angular velocity of 0 deg/sec. to 30 deg/sec. into a value in the range of 0.0 to 1.0 using linear interpolation. The obtained value is set as variable Sw.

Next, the CPU 10 converts the current acceleration into variable Sa which represents a stable state of the acceleration based on the acceleration data included in the operation data 127 (step S152). Specifically, the CPU 10 converts the absolute value of an acceleration of 0 G to 0.2 G into a value in the range of 0.0 to 1.0 using linear interpolation. The obtained value is set as variable Sa.

Next, the CPU 10 converts the gravity direction component of the local X axis into variable St which represents the re-holding posture accuracy (step S153). Namely, the CPU 10 converts the horizontal degree of the X axis described above with reference to FIG. 31 into a value in the range of 0.0 (where the X axis is vertical) to 1.0 (where the X axis is horizontal). The obtained value is set as variable St.

Then, the CPU 10 calculates the holding posture possibility Ks using expression 8 (Ks=Sw×Sa×St) (step S154). Thus, the holding posture possibility Ks calculation processing is finished.

Returning to FIG. 49, the CPU 10 causes the guide display counter C to count up using expression 9 (C=C+Kr×Ks) based on the necessity degree Kr and the holding posture possibility K (step S136).

Next, the CPU 10 determines whether or not the value of the guide display counter C has exceeded 30 (step S137). When it is determined that the value of the hold display counter C has exceeded 30 (YES in step S137), the CPU 10 executes the processing of displaying the re-hold guide 105 shown in FIG. 10 (step S138). By contrast, when it is determined that the value of the guide display counter C has not exceeded 30 (NO in step S137), the CPU 10 terminates the re-hold guide processing.

Returning to FIG. 37, after the re-hold guide processing, the CPU 10 executes the other game processing (step S19). Namely, the CPU 10 executes the processing on the golf game which is not related to the essence of the present invention. Then, the processing in steps S20 and thereafter is executed.

Now, processing executed when it is determined in step S3 in FIG. 35 that the in-flight flag 162 is on (YES in step S3) will be described. In this case, the current state is after the impact, namely, after a shot is made. Therefore, the CPU 10 executes the ball moving processing (step 4). By this processing, processing of moving the struck ball and processing regarding the backspin are executed.

Figure 52:
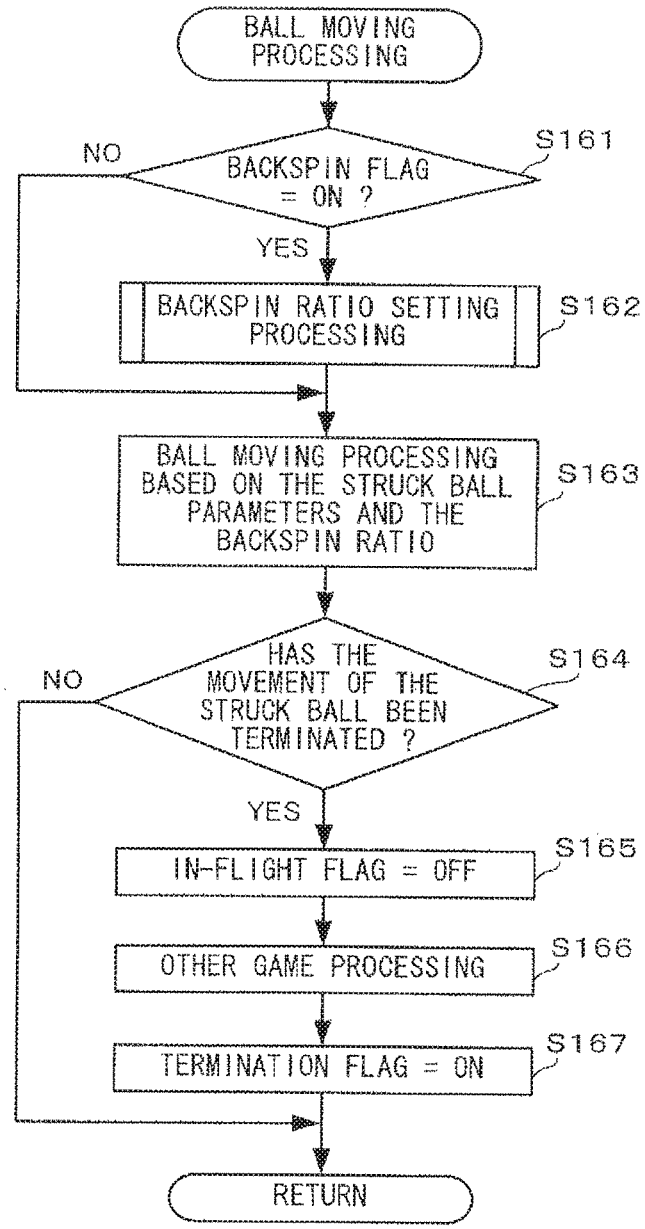
FIG. 52 is a flowchart showing the details of ball moving processing shown in step S4 in FIG. 35.

FIG. 52 is a flowchart showing the details of the ball moving processing. As shown in FIG. 52, the CPU 10 first determines whether the backspin flag is on or not (step S161). When it is determined that the backspin flag is on (YES in S161), the CPU 10 executes backspin ratio setting processing (step S162) and advances to step S163. When it is determined that the backspin flag is off (NO in S161), the CPU 10 advances to step S163 without executing the processing in step S162.

Figure 53:
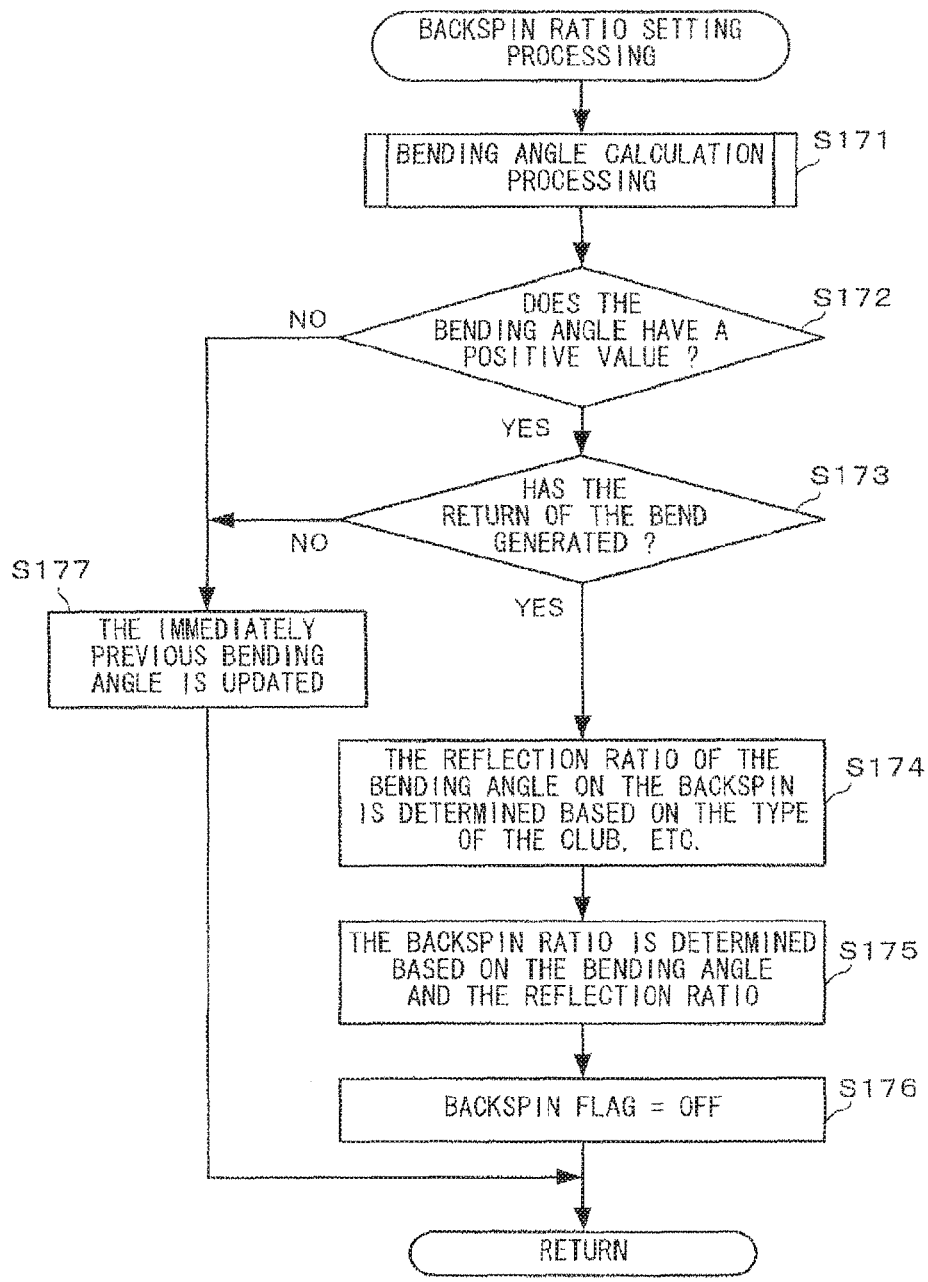
FIG. 53 is a flowchart showing the details of backspin setting processing shown in step S162 in FIG. 52.

FIG. 53 is a flowchart showing the details of the backspin ratio setting processing. This processing detects the maximum value of the forward bending angle of the club head and causes the obtained maximum value to be reflected on the backspin ratio. As shown in FIG. 53, the CPU 10 first executes bending angle calculation processing for calculating the bending angle $\phi$ (S171). This processing is the same as that executed in step S54 in FIG. 41 and will not be described again.

Next, the CPU 10 determines whether or not the calculated bending angle $\phi$ has a positive value (step S172). When it is determined that the bending angle $\phi$ does not have a positive value (NO in step S172), the CPU 10 updates the immediately previous bending angle data 154 with the calculated bending angle (step S177) and terminates the backspin ratio setting processing.

By contrast, when it is determined that the calculated bending angle $\phi$ has a positive value (YES in step S172), the CPU 10 determines whether or not a return of the bend has been generated (step S173). The "return of the bend" means that after the head of the golf club is bent forward by a swing provided with a backspin, the head returns rearward by repulsion. For example, when the bending angle represented by the immediately previous bending angle data 154 is larger than the bending angle $\phi$ calculated in step S171, the CPU 10 determines that the return of the bend has been generated. When it is determined that the return of the bend has not been generated (NO in step S173), it is considered that the forward bend is still continued. Therefore, the CPU 10 executes the processing in step S177 and terminates the backspin ratio setting processing.

By contrast, when it is determined that the return of the bend has been generated (YES in step S173), the CPU 10 executes processing of determining the reflection ratio of the bending angle on the backspin, based on the type of the golf club currently selected or the like (step S174). For example, when the type of the club is driver, the CPU 10 sets a low value as the reflection ratio such that the backspin is unlikely to be applied.

Next, the CPU 10 determines the backspin ratio based on the reflection ratio determined above and the bending angle represented by the immediately previous bending angle data 154 (i.e., the maximum value of the forward bend) (step S175). The determined backspin ratio is stored on the external main memory 12 as the backspin ratio data 157.

Next, the CPU 10 sets the backspin flag 163 to be off (step S176). Thus, the backspin ratio setting processing is finished.

Returning to FIG. 52, after the backspin ratio setting processing, the CPU 10 moves the struck ball (the ball 103) based on the struck ball parameters 158. After the backspin ratio is determined, the CPU 10 moves the struck ball also based on the backspin ratio (step S163). Namely, immediately after the shot, the backspin ratio is not yet determined. Therefore, the stuck ball is moved only based on the struck ball parameters 158 (with no backspin). Then, once the backspin ratio is determined (after the backspin flag 163 is set to be off), the struck ball is moved based on the backspin ratio data 157 as well as the struck ball parameters 158. In general, a struck ball with a backspin has a trajectory of flying high. Therefore, where the struck ball is moved with the backspin ratio being applied in the middle of the way, the struck ball can have a trajectory of rapidly rising midway. At this point, for example, a virtual camera may be set as necessary so as to provide camerawork following the struck ball.

The backspin ratio may be caused to be reflected on the behavior of the struck ball, for example, as follows, instead of using the above-described method. Even after the backspin ratio is determined, the struck ball is moved only based on the struck ball parameters 158 until the struck ball makes a landing, and after that, the backspin ratio is caused to be reflected on the behavior of the struck ball. For example, at the timing when the struck ball makes a landing, an orbit of the struck ball from the time of impact in the state where the backspin ratio is applied is re-calculated. This provides the final position of the struck ball in consideration of the backspin. Therefore, the behavior of the struck ball after the ball makes a landing can be controlled such that the ball is located at this position.

Next, the CPU 10 determines whether or not the movement of the struck ball has been finished (step S164). When it is determined that the movement of the struck ball has not been finished (NO in step S164), the CPU 10 terminates the ball moving processing. When it is determined that the movement of the struck ball has been finished (YES in step S164), the CPU 10 sets the in-flight flag 162 to be off (step S165) and executes the other game processing to be executed after the shot is made (step S166). Such game processing is, for example, score calculation or the like. Then, the CPU 10 sets the termination flag 164 to be on (step S167). Thus, the ball moving processing is finished.

Returning to FIG. 35, after the ball moving processing, processing after the drawing processing in step S20 is executed. It is determined whether the termination flag 164 is set to be on or not (step S21). When the termination flag 164 is set to be on in the ball moving processing, the processing in this embodiment, namely, the processing for each shot is terminated as a result of the determination in step S21. Thus, the detailed description of the processing in this embodiment is finished.

As described above, in this embodiment, one power gauge 104 presents the player with information on two different elements of the twisting angle and the swing-up amount (providing an estimate on the struck ball power). This allows the player to intuitively perceive the opening angle of the face, the strength of the shot he/she can make, and the like.

In this embodiment, the calculation for finding the reference plane for "re-hold" is avoided from becoming unstable due to the difference in the manner in which the player holds the input device 8 when pressing the B button 32*i*. This allows the reference plane to be calculated more appropriately. As a result, a more appropriate determination on the impact can be made.

Regarding the timing at which the "re-hold" operation is to be made, a more appropriate timing is obtained by use of the necessity degree Kr of re-hold and the holding posture possibility Ks. This avoids having the player make a re-hold operation unnecessarily, and allows the player make a re-hold operation when necessary.

Regarding the swing operation, the particulars of the motion of swinging down (swing-down strength) is caused to be reflected on the struck ball power P. Therefore, the player can feel that his/her motion of moving the input device 8 is strongly associated with the movement of the golf club, which makes the game more entertaining. Since the struck ball power P is determined using the acceleration, the following effects are provided. In addition to a simply rapid down swing made after the player swings up the input device 8, a down swing by which the angle is changed slowly along with time but a large acceleration (i.e., centrifugal force) is generated is also regarded as, and is reflected on the struck ball power as, a strong swing. Such a swing is made when, for example, a player having a long arm reach makes a big swing.

A backspin can be applied on the struck ball by the manner of swing instead of the button operation. Therefore, a golf game operable with a higher degree of reality can be provided to the player.

In the above embodiment, the "re-hold" operation is performed when the B button 32*i* is pressed. Alternatively, in the case where the input device 8 is kept still for a predetermined time period at a posture expected for "re-hold", it may be considered that the B button 32*i* is pressed and the processing for "re-hold" may be executed even though the button input is not actually made.

In the above embodiment, the re-hold guide 105 is displayed in order to urge the player to make a re-hold operation. The re-hold operation may be urged by, for example, outputting a predetermined audio guide instead of displaying the re-hold guide 105.

The power gauge 104 is curved in accordance with the twisting angle. The power gauge 104 may be curved in additional consideration of an element of the location at which the ball is hit (topography). Namely, information on a change in the outgoing direction or the orbit (trajectory) caused depending on the location at which the ball is hit may be presented by the change in the shape of the power gauge 104. FIG. 54 shows examples of shapes of the power gauge 104 different by the location at which the ball is hit. FIG. 54(*a*) shows the case where the ball is hit in the fairway, and FIG. 54(*b*) shows the case where the ball is hit in, for example, the bunker. The power gauge 104 in FIG. 54(*a*) indicates that the outgoing direction of the ball is straight forward (namely, the ball is output straight and then is sliced rightward). By contrast, the power gauge 104 in FIG. 54(*b*) is slightly inclined rightward from the base thereof, which indicates that the outgoing direction is right forward (the ball flies right forward from the beginning and then is sliced further rightward). FIG. 54 also indicates that the power gauge is not inclined from the base thereof in the fairway, and is inclined from the base thereof in the bunker. Namely, the power gauge may be inclined from the base thereof when the ball is hit at a location of particular topography.

In the above embodiment, the power gauge 104 is curved. Alternatively, the power gauge 104 may be displayed with different colors. For example, the power gauge 104 may be usually displayed with a white frame, and with a red frame when the curving degree is equal to or greater than a predetermined value. Similarly, the swing bar 106 and the power bar 107 may be displayed with different colors in accordance with the swing-up amount H, the twisting angle, the struck ball power P or the like.

In the above embodiment, the struck ball power P and the twisting angle results in being determined at the same time, i.e., at the time of impact. The struck ball power P and the twisting angle do not need to be determined at the same time.

One of the two may be determined first and the other may be determined later. For example, in the case where the twisting angle is determined before the struck ball power P, the swing bar 106 and the power gauge 104 may be controlled as follows: until the twisting angle is determined, the swing bar 106 is moved and the power gauge 104 is curved at the same time; and after the twisting angle is determined, the curving state of the power gauge 104 is fixed and only the swing bar 106 is moved. Alternatively, at the time when either the struck ball power P or the twisting angle is determined, the curving state of the power gauge 104 and the position of the swing bar 106 (i.e., only the display states) may be fixed. For example, this may be done as follows. At the moment when a shot is made, the curving state of the power gauge 104 and the position of the swing bar 106 are fixed (the display states are fixed at the same time) and also the manner of curving the struck ball relating to the curving state is determined (one of the parameters is determined), but the struck ball power is determined after the player swings the input device 8 all the way through (the other parameter is determined at a later timing).

In the reference plane setting processing in the above embodiment, the reference plane is updated by replacing the current reference plane with a newly calculated reference plane. Alternatively, for example, the posture of the golf club 102 may be adjusted while the position of the reference plane is fixed. The reference plane includes the gravity direction (is parallel to the gravity direction). Therefore, the correction of the reference plane corresponds to an operation of rotating the current reference plane around the gravity direction. Accordingly, even where the golf club (the posture of the input device 8) is rotated oppositely around the gravity direction while the current reference plane is fixed, substantially the same effect is provided. For example, an angle between the first candidate plane and the reference plane at a certain time is calculated. Assuming that, for example, the angle is 30°, the posture of the golf club may be rotated by 30°.

Figure 30:
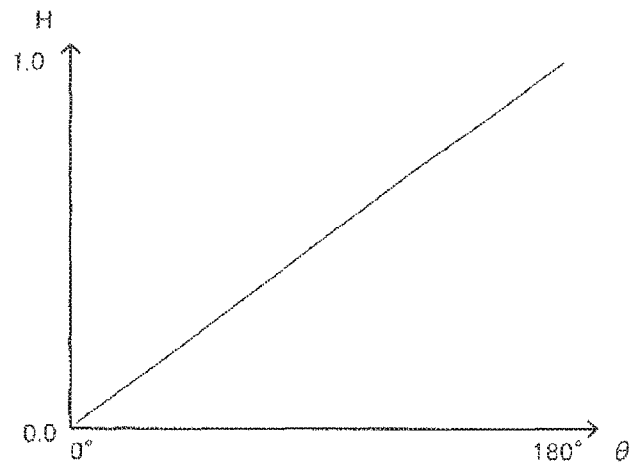
FIG. 30 is an exemplary graph usable for converting an absolute value of a swing-up angle into the swing-up amount H.
Figure 55:
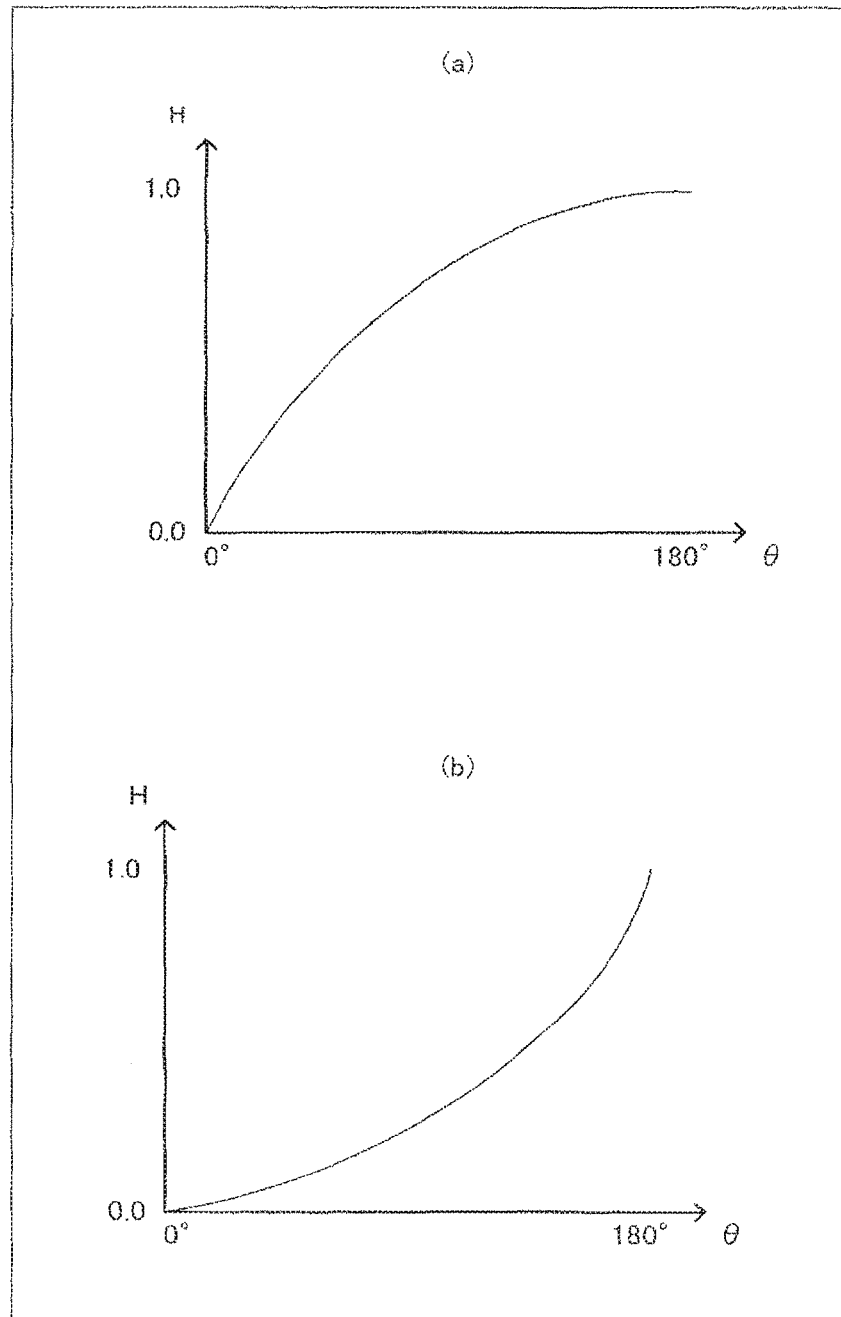
FIG. 55 provides exemplary graphs usable for converting the swing-up angle into the swing-up amount H.

In the above embodiment, the conversion of the swing-up angle θ into the swing-up amount H is performed so as to provide a line graph (see FIG. 30). Alternatively, the swing-up angle θ may be converted into the swing-up amount H so as to provide a nonlinear graph as shown in FIG. 55. In FIG. 55, the rightward direction of the horizontal axis represents the positive direction of θ, and the upward direction of the vertical axis represents the positive direction of H. In FIG. 55(*a*), the graph is of a curve expanding upward. In this case, as the player swings up the club more widely (as H is closer to 1.0), detailed adjustment can be made more easily. In FIG. 55(*b*), the graph is of a curve expanding downward. In this case, as the player swings up the club less widely (as H is closer to 0.0), detailed adjustment can be made more easily.

Figure 56:
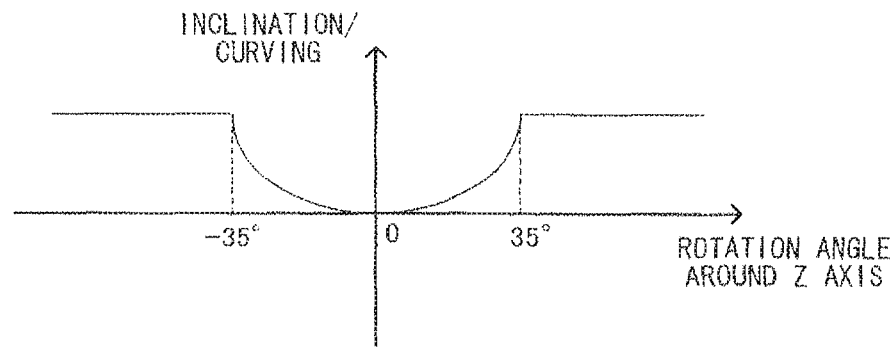
FIG. 56 shows an exemplary graph usable for converting the twisting angle into the curving degree of the power gauge 104.
Figure 57:
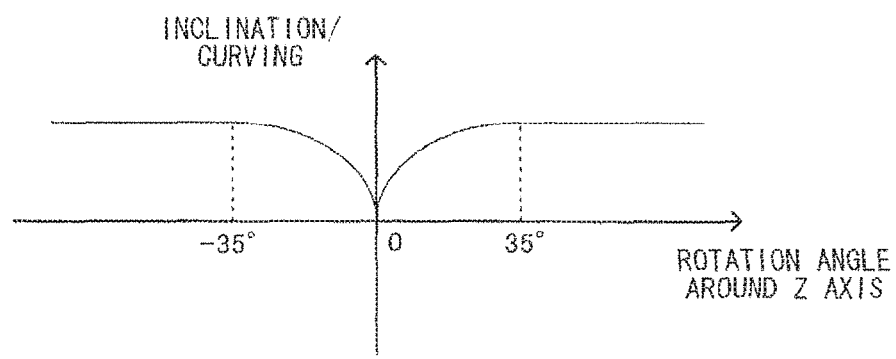
FIG. 57 shows an exemplary graph usable for converting the twisting angle into the curving degree of the power gauge 104.
Figure 58:
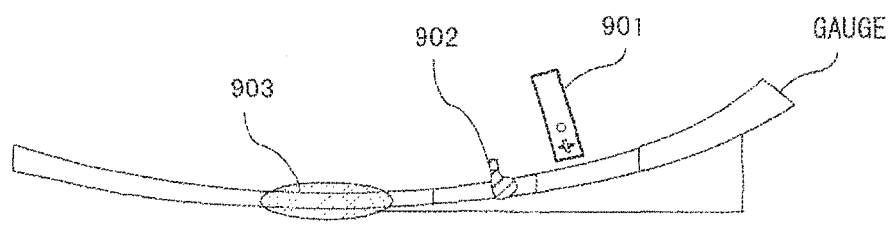
FIG. 58 shows an example of a gauge in a conventional golf game.

The twisting angle and the curving degree of the power gauge 104 may also be caused to correspond to each other so as to provide a nonlinear graph. Linear or nonlinear graphs may be used in accordance with the difficulty degree of the game. For setting the difficulty level, a setting screen which allows the player to select the difficulty level of the game may be prepared. For example, three difficulty levels of "easy", "medium" and "difficult" are prepared. When "easy" is selected, the curving degree is converted so as to provide a downward curve as shown in FIG. 56. When "medium" is selected, the curving degree is converted so as to provide a line graph as shown in FIG. 28. When "difficult" is selected, the curving degree is converted so as to provide an upward curve as shown in FIG. 57. Regarding the conversion into the swing-up amount H also, different graphs may be used in accordance with the difficulty level in this manner.

Regarding the calculation of the struck ball power P, the following technique may be used in addition to the method described in the above embodiment. A time period from when the player swings up the input device 8 until he/she swings down the input device 8 (until an impact is generated) is measured, and the struck ball power P is corrected in accordance with the time period. The struck ball power P may be set to be stronger when the input device 8 is swung down quickly (when the time period from when the input device 8 is swung up until the input device 8 is swung down and impacts the ball is relatively short) than when the input device 8 is swung down slowly. For example, the following processing may be executed. In the struck ball power calculation processing (step S53), the struck ball power P is once determined based only on the swing-up amount H without using the follow-up amount T; then, in the shot processing (step S115), the struck ball power P is corrected to be increased or decreased in accordance with the time period required for the swing-down (e.g., the struck ball power P is increased when the time period required for the swing-down is relatively short, whereas the struck ball power P is decreased when the time period required for the swing-down is relatively long).

For determining the struck ball power P, a "shot with too much force (excessively forceful shot)" may be reflected. For example, a predetermined value is preset as the "upper limit" of the struck ball power. When the calculated struck ball power P exceeds the "upper limit", the shot is considered to be "with too much force" and, for example, the direction in which the ball is to fly may be varied randomly. For example, when the struck ball power is equal to or less than the "upper limit", the struck ball flies straight forward; whereas when the shot is "with too much force", the trajectory of the struck ball is slightly sliced rightward, or output left forward or the like. In this case, it may be visually shown to the player that the shot is "with too much force" by changing the color of the power bar 107 and providing a visual effect of swinging the power bar 107 right and left.

For determining the struck ball power P, the maximum value of the swing-up amount (the maximum swing-up amount) may be simply used as the struck ball power P without using the follow-up amount T or the excessive swing strength S. This is done as follows specifically. The maximum swing-up amount is stored on the external main memory 12. When an impact is generated, the struck ball power P is determined based on the maximum swing-up amount, and is displayed as the power bar 107. This is advantageous in alleviating the processing load although the motion of swinging down the input device 8 is not reflected on the struck ball power. In this case, it is still possible to present the player with information on the opening angle of the face and the struck ball power by the position of the swing bar 106 and the curving of the power gauge 104 so that the player can intuitively perceive these elements.

Regarding the backspin ratio calculation processing, in the above information, the "bend" is simulated based on a model using a spring and a damper. Alternatively, the following processing may be executed without using such a model. For example, a change in the angular velocity in each frame is monitored. When the angular velocity is rapidly decreased, it is determined that a sudden brake (braking force) has been applied to the swing, namely, a swing with a backspin as shown in FIG. 22 has been made, and thus the backspin ratio is determined.

For calculating the backspin ratio, it may be determined that a braking power has been generated using the acceleration instead of the above-described change in the angular velocity. For example, when an operation of suddenly stopping the swing is made as described above, an acceleration is generated in the opposite direction as a reaction to the sudden stop. Using this, a change in the acceleration in the opposite direction (corresponding to the forward bend) may be monitored and processing of determining the backspin ratio may be executed based on such a change.

Regarding the impact-related processing described above with reference to FIG. 47, it is determined in this embodiment that an impact has been generated using the swing-up angle θ. As an example, it is determined whether or not an impact has been generated by determining whether or not the sign of the swing-up angle θ has been inverted (step S111). Also using the swing-up angle θ, it may be determined whether or not an impact has been generated by determining whether or not the posture of the input device 8 in the Z-axis direction and the reference plane have become horizontal. When both are horizontal (i.e., the swing-up angle θ is 0°), it may be determined that an impact has been generated.

In the above embodiment, the posture of the input device 8 is detected using the gyrosensor unit 7 or the acceleration sensor 37. Alternatively, an image of the input device 8 may be taken by a predetermined camera and the posture of the input device 8 may be calculated based on the obtained data. This may be performed as follows, for example. An image of the input device 8 is taken by a predetermined camera and data on the taken image is supplied to the game apparatus 3. The CPU 10 identifies the input device 8 in the image and distinguishes the posture thereof to execute processing such as, for example, detecting the motion of the input device 8.

While the invention has been described in detail, the foregoing description is in all aspects illustrative and not restrictive. It is understood that numerous other modifications and variations can be devised without departing from the scope of the invention.

What is claimed is:

1. An apparatus comprising a processing system, including at least one hardware processor, the processing system being operationally coupled to an input device operated in an actual space and including a sensor configured to detect posture and/or motion of the input device, the processing system being configured to control the apparatus to perform operations comprising:
   obtain input device posture and/or motion information detected by the sensor;
      calculate the posture of the input device in the actual space based on the input device posture and/or motion information;
   set a virtual reference plane in the actual space, the virtual reference plane having an orientation that the processing system sets based on the calculated posture of the input device at a predetermined timing;
      obtain additional input device posture and/or motion information detected by the sensor;
      calculate a further posture of the input device in the actual space based on the additional input device posture and/or motion information detected by the sensor; and
      perform an operation in a virtual space in accordance with the calculated further posture of the input device relative to the set virtual reference plane in the actual space.

2. The apparatus of claim 1, wherein the predetermined timing is defined by a user input received on the input device.

3. The apparatus of claim 1, wherein the processing system is further configured to control the apparatus to:
   calculate an angle made by the set virtual reference plane and the further posture of the input device, and
   determine whether the angle made by the virtual reference plane and the further posture of the input device satisfies a predetermined condition, and
   wherein the operation is performed in the virtual space when the predetermined condition is determined to be satisfied.

4. A non-transitory computer readable storage medium having stored thereon a program to be executed by a computer operationally coupled to an input device operated by a user in an actual space, the input device further being operationally coupled to a sensor configured to detect posture and/or motion of the input device, the computer executing the program to perform one or more operations in a virtual space based on the posture and/or motion information obtained from the sensor, the program, when executed by the computer, causing the computer to at least:
   obtain input device posture and/or motion information detected by the sensor;
   calculate the posture of the input device in the actual space based on the input device posture and/or motion information;
   set a virtual reference plane in the actual space, the virtual reference plane having an orientation that the computer sets based on the calculated posture of the input device at a predetermined timing;
   obtain additional input device posture and/or motion information detected by the sensor;
   calculate a further posture of the input device in the actual space based on the additional input device posture and/or motion information detected by the sensor; and
   perform an operation in the virtual space in accordance with the calculated further posture of the input device relative to the set virtual reference plane in the actual space.

5. The non-transitory computer readable storage medium having the program stored thereon according to claim 4, wherein the predetermined timing is defined by a user input received on the input device.

6. The non-transitory computer readable storage medium having the program stored thereon according to claim 4, wherein the program, when executed by the computer, further causes the computer to:
   calculate an angle made by the set virtual reference plane and the further posture of the input device, and
   determine whether the angle made by the virtual reference plane and the further posture of the input device satisfies a predetermined condition, and
   wherein the operation is performed in the virtual space when the predetermined condition is determined to be satisfied.

7. A game apparatus for controlling an object in a virtual space, the game apparatus comprising:
   an input device operated by a user in an actual space, the input device being operationally coupled to a sensor configured to detect posture and/or motion of the input device;
   a computer processing system, including at least one processor, the computer processing system being operationally coupled to the input device and being configured to control the game apparatus to perform operations comprising:

obtaining input device posture and/or motion information detected by the sensor;

calculating the posture of the input device in the actual space based on the input device posture and/or motion information;

setting a virtual reference plane in the actual space, the virtual reference plane having an orientation that the computer processing system sets based on the calculated posture of the input device at a predetermined timing;

obtaining additional input device posture and/or motion information detected by the sensor;

calculating a further posture of the input device in the actual space based on the additional input device posture and/or motion information detected by the sensor; and displaying the object controlled in accordance with the calculated further posture of the input device relative to the set virtual reference plane.

8. The game apparatus of claim 7, wherein the predetermined timing is defined by a user input received on the input device.

9. The game apparatus of claim 7, wherein the sensor includes a motion sensor included in the input device.

10. The game apparatus of claim 7, wherein the processing system is further configured to control the apparatus to:

calculate an angle made by the set virtual reference plane and the further posture of the input device, and determine whether the angle made by the virtual reference plane and the further posture of the input device satisfies a predetermined condition, and wherein the object is controlled in the virtual space when the predetermined condition is determined to be satisfied.

11. A non-transitory computer readable storage medium having stored thereon a game program to be executed by a computer operationally coupled to an input device operated by a user in an actual space, the input device further being operationally coupled to a sensor configured to detect posture and/or motion of the input device, the computer executing the game program to control an object in a virtual space based on the posture and/or motion information obtained from the sensor, the game program, when executed by the computer, causing the computer to at least:

obtain input device posture and/or motion information detected by the sensor;

calculate the posture of the input device in the actual space based on the input device posture and/or motion information;

set a virtual reference plane in the actual space, the virtual reference plane having an orientation that the computer sets based on the calculated posture of the input device at a predetermined timing;

obtain additional input device posture and/or motion information detected by the sensor;

calculate a further posture of the input device in the actual space based on the additional input device posture and/or motion information detected by the sensor; and display the object controlled in accordance with the calculated further posture of the input device relative to the set virtual reference plane in the actual space.

12. The non-transitory computer readable storage medium having the game program stored thereon according to claim 11, wherein the sensor includes a motion sensor included in the input device.

13. The non-transitory computer readable storage medium having the game program stored thereon according to claim 11, wherein the virtual reference plane is set based on the posture of the input device obtained when a user input is received on the input device.

14. A game processing method of a game system for controlling an object in a virtual space based on posture and/or motion information of an input device operated by a user in an actual space, the input device being operationally coupled to a sensor configured to detect posture and/or motion of the input device, the game processing method comprising:

obtaining input device posture and/or motion information detected by the sensor;

calculating the posture of the input device in the actual space based on the input device posture and/or motion information;

setting a virtual reference plane in the actual space, the virtual reference plane having an orientation that the computer sets based on the calculated posture of the input device at a predetermined timing;

obtaining additional input device posture and/or motion information detected by the sensor;

calculating a further posture of the input device in the actual space based on the additional input device posture and/or motion information detected by the sensor; and displaying the object controlled in accordance with the calculated further posture of the input device relative to the set virtual reference plane in the actual space.

15. A game apparatus for controlling an object in a virtual space, the game apparatus comprising:

an input device operated by a user in an actual space, the input device being operationally coupled to a sensor configured to detect posture and/or motion of the input device;

a computer processing system, including at least one processor, the computer processing system being operationally coupled to the input device and being configured to control the game apparatus to perform operations comprising:

obtaining input device posture and/or motion information detected by the sensor;

calculating the posture of the input device in the actual space based on the input device posture and/or motion information;

calculating a posture correction value based on the posture and/or motion of the input device detected by the sensor at a predetermined timing;

correcting the calculated posture of the input device with the calculated posture correction value;

setting a virtual reference plane in the actual space, the virtual reference plane having an orientation that the computer processing system sets based on the corrected posture of the input device;

calculating an angle made by the set virtual reference plane and a posture of the input device after the predetermined timing; and display the object controlled in the virtual space based on the calculated angle.

16. The game apparatus of claim 15, wherein the predetermined timing is defined by a user input received on the input device.

17. The game apparatus of claim 15, wherein the sensor includes a motion sensor included in the input device.

18. The game apparatus of claim 15, wherein the movement speed and/or direction of the object in the virtual space is controlled based on the calculated angle.

19. The game apparatus of claim 15, wherein the computer processing system is further configured to control the game apparatus to perform operations comprising:
obtaining additional input device posture and/or motion information detected by the sensor;
calculating the angular displacement of the obtained additional input device posture and/or motion information relative to the set virtual reference plane; and
controlling the displayed object in accordance with calculated angular displacement of the detected additional input device posture and/or motion information relative to the set virtual reference plane.

20. A non-transitory computer readable storage medium having stored thereon a game program to be executed by a computer operationally coupled to an input device operated by a user in an actual space, the input device further being operationally coupled to a sensor configured to detect posture and/or motion of the input device, the game program to control an object in a virtual space based on the posture and/or motion information obtained from the sensor, the game program, when executed by the computer, causing the computer to at least:
obtain input device posture and/or motion information detected by the sensor;
calculate the posture of the input device in the actual space based on the input device posture and/or motion information;
calculate a posture correction value based on the posture and/or motion of the input device detected by the sensor at a predetermined timing;
correct the calculated posture of the input device with the calculated posture correction value;
set a virtual reference plane in the actual space, the virtual reference plane having an orientation that the computer sets based on the corrected posture of the input device;
calculate an angle made by the set virtual reference plane and a posture of the input device after the predetermined timing; and
display the object controlled in the virtual space based on the calculated angle.

21. The non-transitory computer readable storage medium having stored thereon the game program to be executed by the computer according to claim 20, wherein the game program, when executed by the computer, further causes the computer to at least:
obtain additional input device posture and/or motion information detected by the sensor;
calculate the angular displacement of the obtained additional input device posture and/or motion information relative to the set virtual reference plane; and
control the displayed object in accordance with calculated angular displacement of the detected additional input device posture and/or motion information relative to the set virtual reference plane.

22. A game processing method of a game system for controlling an object in a virtual space based on posture and/or motion information of an input device operated by a user in an actual space, the input device being operationally coupled to a sensor configured to detect posture and/or motion of the input device, the game processing method comprising:
obtaining input device posture and/or motion information detected by the sensor;
calculating the posture of the input device in the actual space based on the input device posture and/or motion information;
calculating a posture correction value based on the posture and/or motion of the input device detected by the sensor at a predetermined timing;
correcting the calculated posture of the input device with the calculated posture correction value;
setting a virtual reference plane in the actual space, the virtual reference plane having an orientation that is set based on the corrected posture of the input device;
calculating an angle made by the set virtual reference plane and a posture of the input device after the predetermined timing; and
display the object controlled in the virtual space based on the calculated angle.

23. The game processing method of claim 22, further comprising:
obtaining additional input device posture and/or motion information detected by the sensor;
calculating the angular displacement of the obtained additional input device posture and/or motion information relative to the set virtual reference plane; and
controlling the displayed object in accordance with calculated angular displacement of the detected additional input device posture and/or motion information relative to the set virtual reference plane.

* * * * *